(12) United States Patent
Duraisingh

(10) Patent No.: US 11,368,534 B2
(45) Date of Patent: Jun. 21, 2022

(54) BUILDING MANAGEMENT SYSTEM WITH DEVICE CLOUD REGISTRATION AND DATA ADAPTOR

(71) Applicant: Johnson Controls Technology Company, Auburn Hills, MI (US)

(72) Inventor: Pravin J. Duraisingh, Mequon, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 75 days.

(21) Appl. No.: 16/153,475

(22) Filed: Oct. 5, 2018

(65) Prior Publication Data

US 2019/0109907 A1 Apr. 11, 2019

Related U.S. Application Data

(60) Provisional application No. 62/569,333, filed on Oct. 6, 2017.

(51) Int. Cl.
G06F 15/173 (2006.01)
H04L 67/125 (2022.01)
(Continued)

(52) U.S. Cl.
CPC ........ *H04L 67/125* (2013.01); *H04L 41/0816* (2013.01); *H04L 41/12* (2013.01);
(Continued)

(58) Field of Classification Search
CPC ... H04L 67/125; H04L 41/12; H04L 41/0853; H04L 41/145
(Continued)

(56) References Cited

U.S. PATENT DOCUMENTS 4,747,100 A 5/1988 Roach et al.
4,944,337 A 7/1990 Credle et al.
(Continued)

FOREIGN PATENT DOCUMENTS

WO WO-2016/201353 A1 12/2016
WO WO-2017/123674 A1 7/2017
(Continued)

OTHER PUBLICATIONS

International Search Report for International Application No. PCT/US2018/054766, dated Apr. 1, 2019, 16 pages.
(Continued)

*Primary Examiner* — Hee Soo Kim
(74) *Attorney, Agent, or Firm* — Foley & Lardner LLP

(57) ABSTRACT

A building management system includes building equipment that operate to affect a physical state or condition of a building, a system manager, and a cloud-based data platform. The system manager is coupled to the building equipment via a system bus and configured to identify the building equipment and generate a reported network tree listing the identified building equipment. The cloud-based data platform includes a data adaptor configured to receive the reported network tree from the system manager, identify an equipment model template for the building equipment listed in the reported network tree, identify a set of points defined by the equipment model template, and generate a list of reported points for the building equipment based on set of points defined by the equipment model template.

20 Claims, 37 Drawing Sheets

(51) Int. Cl.
*H04L 41/0816* (2022.01)
*H04L 41/14* (2022.01)
*H04L 67/55* (2022.01)
*H04L 41/12* (2022.01)
*H04L 41/0853* (2022.01)
*G05B 15/02* (2006.01)

(52) U.S. Cl.
CPC ............ *H04L 41/145* (2013.01); *H04L 67/26* (2013.01); *G05B 15/02* (2013.01); *H04L 41/0853* (2013.01)

(58) Field of Classification Search
USPC ........................................................ 709/224
See application file for complete search history.

(56) References Cited

U.S. PATENT DOCUMENTS

| | | | |
|---|---|---|---|
| 6,400,103 | B1 | 6/2002 | Adamson |
| 6,487,457 | B1 | 11/2002 | Hull et al. |
| 6,639,917 | B1 | 10/2003 | Ellington et al. |
| 9,866,635 | B2 | 1/2018 | Maturana et al. |
| 2003/0174162 | A1 | 9/2003 | Wu |
| 2007/0204156 | A1 | 8/2007 | Jeghers |
| 2008/0115129 | A1* | 5/2008 | Hintermeister ..... G06F 16/9566 718/100 |
| 2009/0057427 | A1 | 3/2009 | Geadelmann et al. |
| 2009/0287736 | A1 | 11/2009 | Shike et al. |
| 2010/0114383 | A1 | 5/2010 | Rosca et al. |
| 2011/0077779 | A1* | 3/2011 | Fuller .................... G05B 15/02 700/276 |
| 2011/0088000 | A1* | 4/2011 | Mackay .............. H04L 12/2823 715/853 |
| 2012/0022698 | A1* | 1/2012 | Mackay ................ G06Q 10/06 700/275 |
| 2012/0192210 | A1 | 7/2012 | Turk |
| 2013/0086066 | A1 | 4/2013 | Anderson et al. |
| 2013/0238795 | A1 | 9/2013 | Geffin et al. |
| 2014/0031992 | A1* | 1/2014 | Bergman ................. F24F 11/62 700/276 |
| 2014/0072059 | A1 | 3/2014 | Krishnan et al. |
| 2014/0277760 | A1 | 9/2014 | Marik et al. |
| 2014/0316581 | A1 | 10/2014 | Fadell et al. |
| 2014/0336795 | A1* | 11/2014 | Asenjo ............... G05B 19/4083 700/86 |
| 2015/0293508 | A1 | 10/2015 | Piaskowski et al. |
| 2016/0072924 | A1 | 3/2016 | Jaber et al. |
| 2016/0086138 | A1 | 3/2016 | Lee et al. |
| 2016/0105456 | A1 | 4/2016 | Thakkar et al. |
| 2016/0246292 | A1* | 8/2016 | Lawson ............... G06F 16/248 |
| 2016/0313751 | A1 | 10/2016 | Risbeck et al. |
| 2017/0322530 | A1 | 11/2017 | Al-Mohssen et al. |
| 2017/0357607 | A1 | 12/2017 | Cayemberg et al. |
| 2018/0061212 | A1 | 3/2018 | Dayalan et al. |
| 2018/0173551 | A1 | 6/2018 | Dunn et al. |
| 2018/0278434 | A1 | 9/2018 | Maseng et al. |
| 2019/0026175 | A1 | 1/2019 | Shelke et al. |
| 2019/0129706 | A1 | 5/2019 | Vangeel et al. |
| 2019/0171477 | A1 | 6/2019 | Caradonna et al. |
| 2019/0364098 | A1 | 11/2019 | Singh |

FOREIGN PATENT DOCUMENTS

| | | | |
|---|---|---|---|
| WO | WO-2017/173167 A1 | 10/2017 | |
| WO | WO-2017173167 A1 * | 10/2017 | ......... G05B 19/0426 |

OTHER PUBLICATIONS

Kevin Walsh, A New Take on the Digital Twin—Bsquare IoT, dated Mar. 1, 2017, 2 pages.
Johnson Controls, Commercial Comfort System (CCS) Product Bulletin, Jun. 16, 2015, 23 pages.
Office Action for U.S. Appl. No. 15/179,894, dated May 11, 2018, 12 pages.
Office Action for U.S. Appl. No. 15/179,894, dated Sep. 21, 2018, 11 pages.
Search Report for International Application No. PCT/US2017/030909, dated Aug. 11, 2017, 15 pages.
"What is DataAdapter, Net-informations.com" (Year: 2020).

* cited by examiner

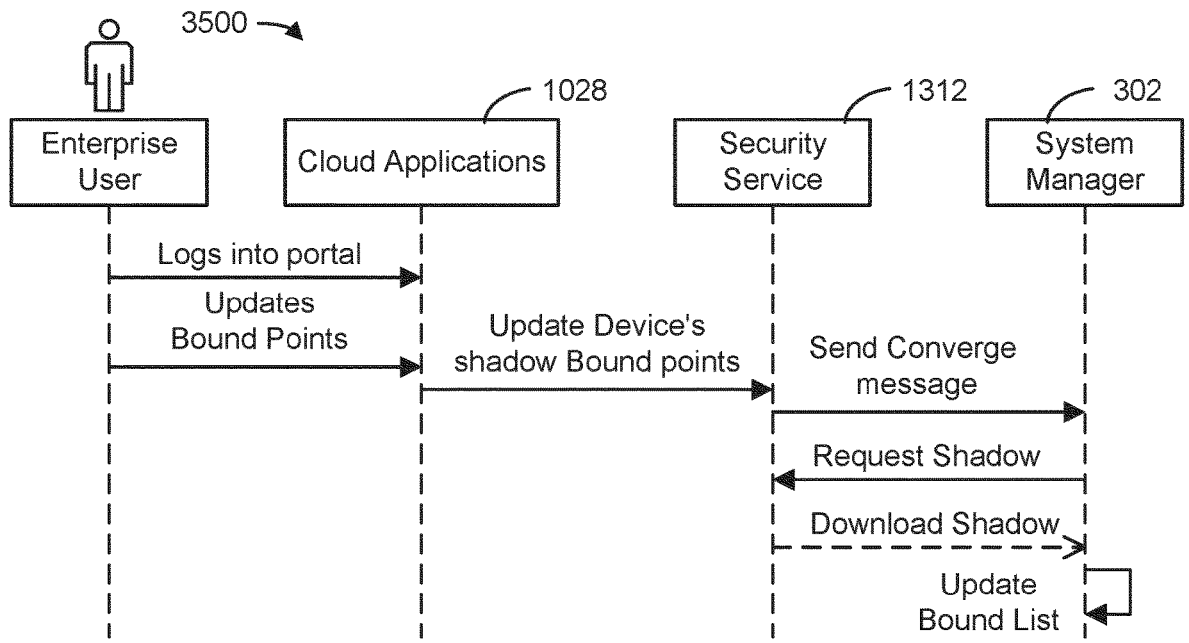
FIG. 35
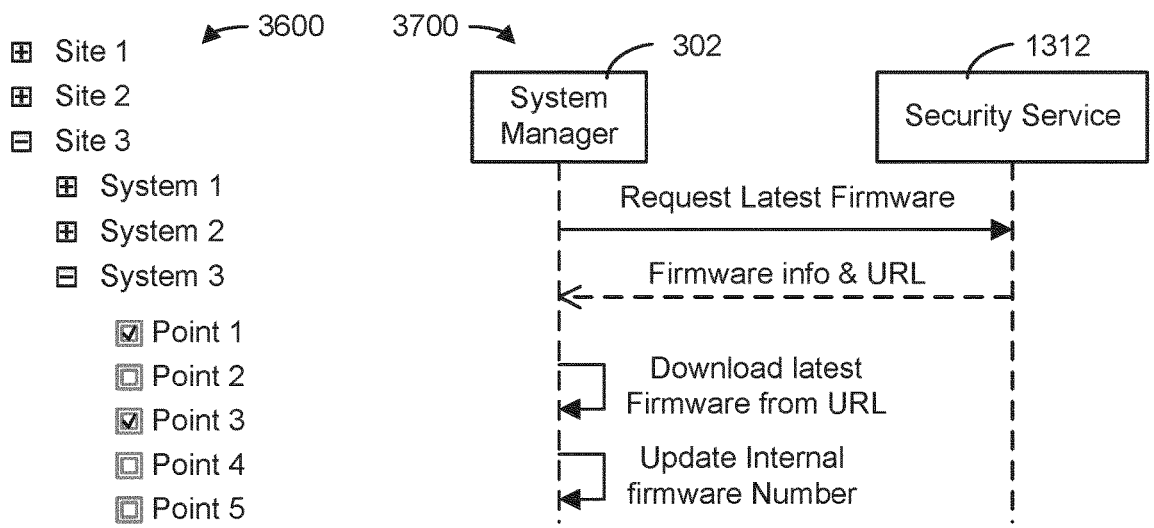
FIG. 36
FIG. 37

BUILDING MANAGEMENT SYSTEM WITH DEVICE CLOUD REGISTRATION AND DATA ADAPTOR

CROSS-REFERENCE TO RELATED PATENT APPLICATION

This application claims the benefit of and priority to U.S. Provisional Patent Application No. 62/569,333 filed Oct. 6, 2017, the entire disclosure of which is incorporated by reference herein.

BACKGROUND

The present disclosure relates generally to building management systems. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

SUMMARY

One implementation of the present disclosure is a building management system including building equipment operable to affect a physical state or condition of a building, a system manager, and a cloud-based data platform. The system manager is coupled to the building equipment via a system bus and configured to identify the building equipment and generate a reported network tree listing the identified building equipment. The cloud-based data platform includes a data adaptor configured to receive the reported network tree from the system manager, identify an equipment model template for the building equipment listed in the reported network tree, identify a set of points defined by the equipment model template, and generate a list of reported points for the building equipment based on set of points defined by the equipment model template.

In some embodiments, the data adaptor is configured to identify a subset of the reported points as bound points and update the bound points in a device shadow for the system manager.

In some embodiments, the cloud-based data platform is configured to receive a device identifier of the system manager via a device registration portal and automatically create the device shadow for the system manager in response to receiving the device identifier via the device registration portal.

In some embodiments, the system manager is configured to read the bound points in the device shadow and create a list of bound points based on the device shadow. In some embodiments, the system manager is configured to use the list of bound points to determine whether to send updates to the cloud-based data platform for each of the reported points.

In some embodiments, the system manager is configured to send updates to the cloud-based data platform for only a first subset of the reported points listed as bound points and not for a second subset of the reported points not listed as bound points.

In some embodiments, the system manager is configured to receive a change of value (COV) notification from the building equipment for one of the reported points, use the list of bound points to determine whether the point associated with the COV notification is listed as a bound point, and send a timeseries data sample comprising an updated value of the point associated with the COV notification to the cloud-based data platform in response to a determination that the point associated with the COV notification is listed as a bound point.

In some embodiments, the system manager is configured to receive a change of value (COV) notification from the building equipment for one of the reported points, use the list of bound points to determine whether the point associated with the COV notification is listed as a bound point, and determine that an updated value of the point associated with the COV notification will not be sent to the cloud-based data platform in response to a determination that the point associated with the COV notification is not listed as a bound point.

In some embodiments, the system manager is configured to determine whether any of the points listed as bound points do not exist in the building equipment and send a list of non-existent points to the data adaptor, the list of non-existent points identifying the points listed as bound points that do not exist in the building equipment. In some embodiments, the data adaptor is configured to remove any points identified as non-existent points from the device shadow.

Another implementation of the present disclosure is a method for monitoring and controlling building equipment in a building management system. The method includes operating building equipment to affect a physical state or condition of a building, identifying the building equipment at a system manager coupled to the building equipment via a system bus, and generating a reported network tree listing the building equipment identified at the system manager. The method includes, at a cloud-based data platform communicably coupled to the system manager, receiving the reported network tree from the system manager, identifying an equipment model template for the building equipment listed in the reported network tree, identifying a set of points defined by the equipment model template, and generating a list of reported points for the building equipment based on set of points defined by the equipment model template.

In some embodiments, the method includes identifying a subset of the reported points as bound points and updating the bound points in a device shadow for the system manager.

In some embodiments, the method includes receiving a device identifier of the system manager via a device registration portal of the at the cloud-based data platform and automatically creating the device shadow for the system manager in response to receiving the device identifier via the device registration portal.

In some embodiments, the method includes the system manager reading the bound points in the device shadow and creating a list of bound points based on the device shadow. In some embodiments, the method includes using the list of bound points at the system manager to determine whether to send updates to the cloud-based data platform for each of the reported points.

In some embodiments, the method includes sending updates from the system manager to the cloud-based data platform for only a first subset of the reported points listed as bound points and not for a second subset of the reported points not listed as bound points.

In some embodiments, the method includes the system manager receiving a change of value (COV) notification from the building equipment for one of the reported points, using the list of bound points to determine whether the point associated with the COV notification is listed as a bound point, and sending a timeseries data sample comprising an updated value of the point associated with the COV notification to the cloud-based data platform in response to a determination that the point associated with the COV notification is listed as a bound point.

In some embodiments, the method includes the system manager receiving a change of value (COV) notification from the building equipment for one of the reported points, using the list of bound points to determine whether the point associated with the COV notification is listed as a bound point, and determining that an updated value of the point associated with the COV notification will not be sent to the cloud-based data platform in response to a determination that the point associated with the COV notification is not listed as a bound point.

In some embodiments, the method includes the system manager determining whether any of the points listed as bound points do not exist in the building equipment and sending a list of non-existent points to the cloud-based data platform, the list of non-existent points identifying the points listed as bound points that do not exist in the building equipment. In some embodiments, the method includes removing, by cloud-based data platform, any points identified as non-existent points from the device shadow.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 35 is a sequence diagram illustrating a process for updating bound points in the BMS of FIG. 9, according to some embodiments.

FIG. 36 is an example of a user interface for selecting bound points in the BMS of FIG. 9, according to some embodiments.

FIG. 37 is a sequence diagram illustrating a process for updating the software or firmware of the system manager of FIG. 9, according to some embodiments.

DETAILED DESCRIPTION

Referring generally to the FIGURES, a building management system (BMS) with automatic equipment discovery and equipment model distribution is shown, according to some embodiments. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

In brief overview, the BMS described herein provides a system architecture that facilitates automatic equipment discovery and equipment model distribution. Equipment discovery can occur on multiple levels of the BMS across multiple different communications busses (e.g., a system bus, zone buses, a sensor/actuator bus, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, the BMS can begin interacting with the new device (e.g., sending control signals, using data from the device) without user interaction.

Some devices in the BMS present themselves to the network using equipment models. An equipment model defines equipment object attributes, view definitions, schedules, trends, and the associated BACnet value objects (e.g., analog value, binary value, multistate value, etc.) that are used for integration with other systems. Some devices in the BMS store their own equipment models. Other devices in the BMS have equipment models stored externally (e.g., within other devices). For example, a zone coordinator can store the equipment model for a bypass damper. In some embodiments, the zone coordinator automatically creates the equipment model for the bypass damper and/or other devices on the zone bus. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below. Throughout this disclosure, the terms "equipment model," "equipment model template," and "equipment template" are used interchangeably.

Building and HVAC System

Figure 1:
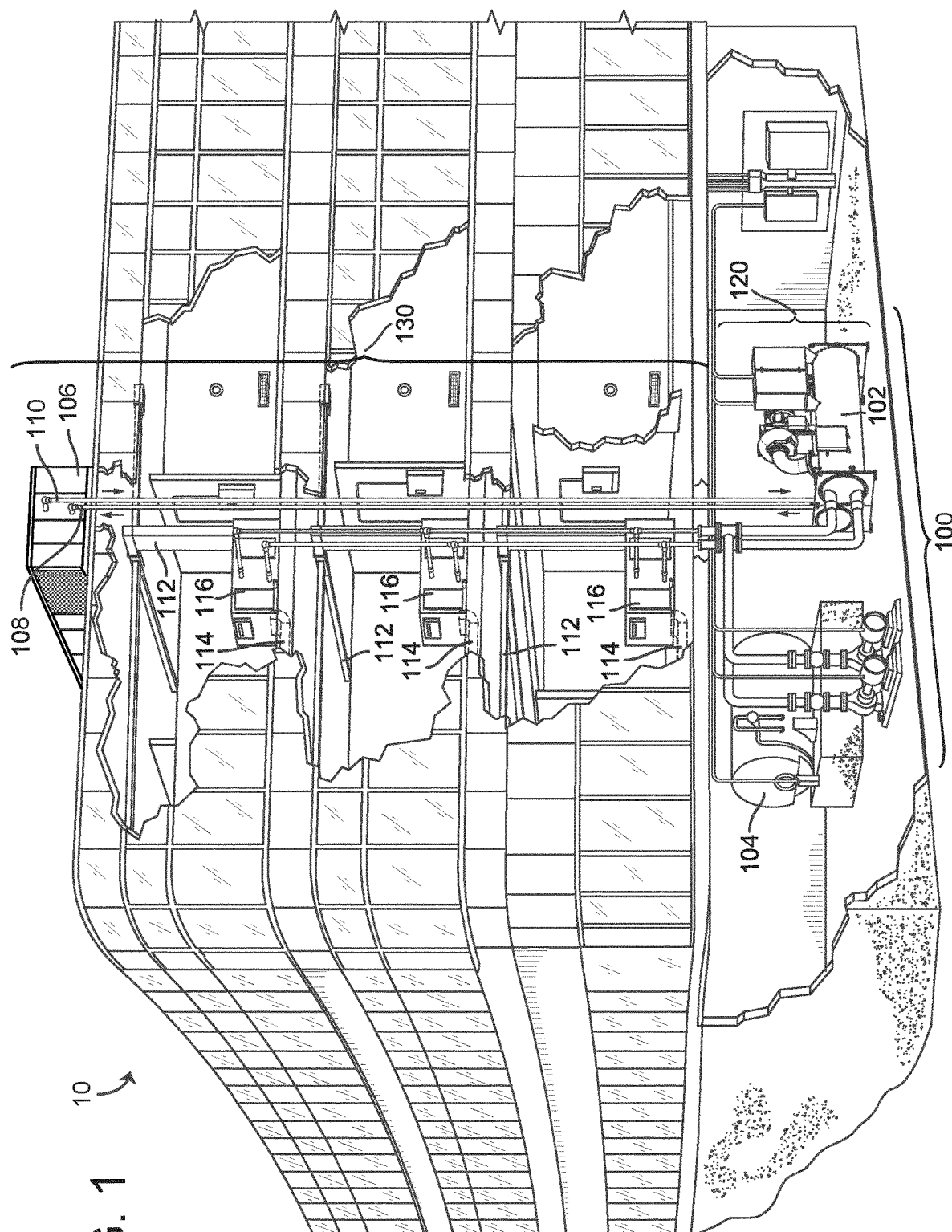
FIG. 1 is drawing of a building equipped with a heating, ventilating, and air conditioning (HVAC) system, according to some embodiments.

Referring now to FIG. 1, an exemplary building and HVAC system in which the systems and methods of the present invention can be implemented are shown, according to an exemplary embodiment. In FIG. 1, a perspective view of a building 10 is shown. Building 10 is served by a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary airside system which can be used in HVAC system 100 are described in greater detail with reference to FIG. 3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements.

AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Building Management System

Figure 2A:
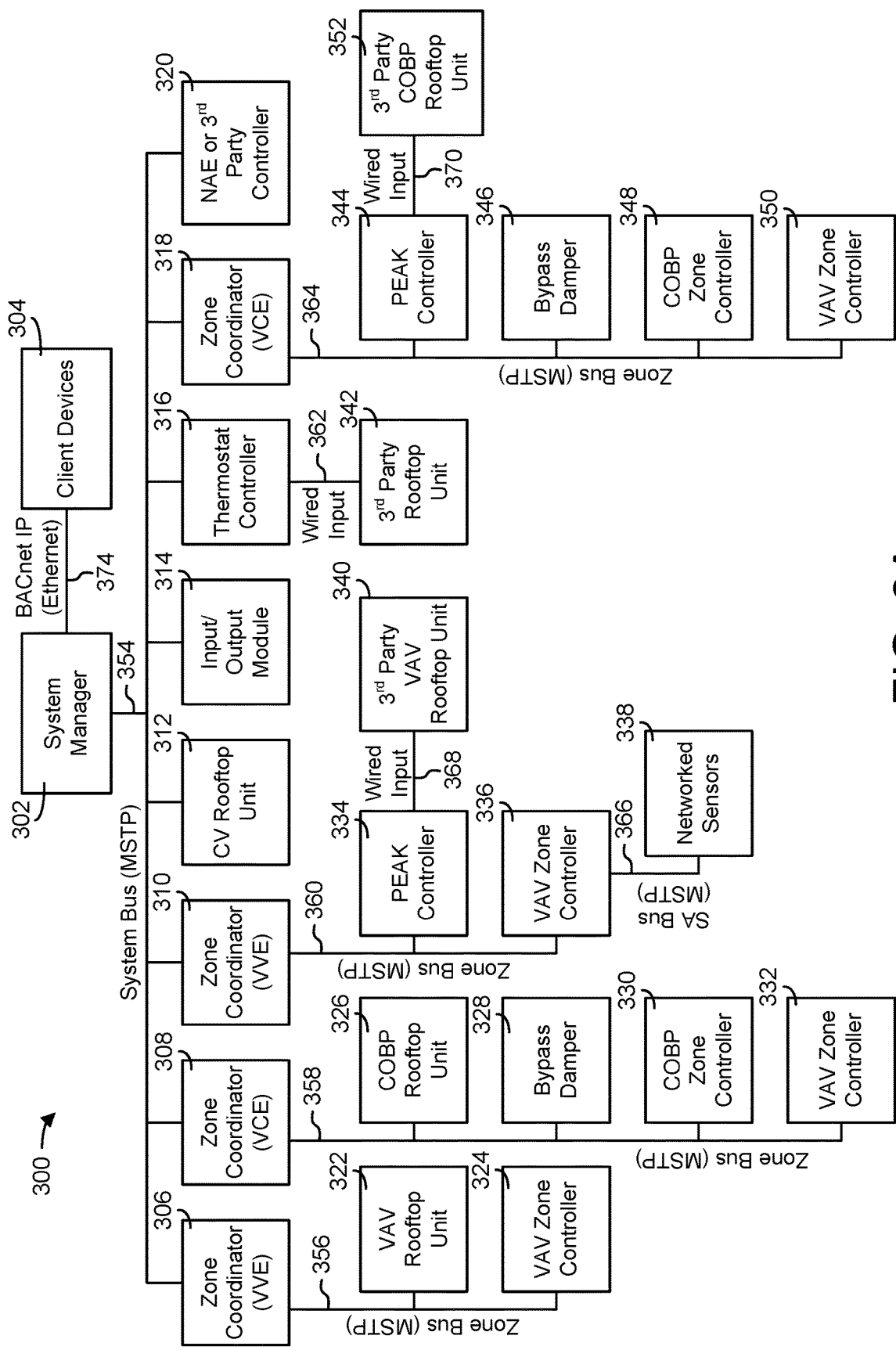
FIG. 2A is a block diagram of a building management system (BMS) which can be used to monitor and control the building and HVAC system of FIGS. 1-2, according to some embodiments.

Referring now to FIG. 2A, a block diagram of a building management system (BMS) 300 is shown, according to an exemplary embodiment. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. BMS 300 can be used to monitor and control the devices of HVAC system 100 and/or airside system 200 (e.g., HVAC equipment) as well as other types of BMS devices (e.g., lighting equipment, security equipment, etc.).

In brief overview, BMS 300 provides a system architecture that facilitates automatic equipment discovery and equipment model distribution. Equipment discovery can occur on multiple levels of BMS 300 across multiple different communications busses (e.g., a system bus 354, zone buses 356-360 and 364, sensor/actuator bus 366, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 300 can begin interacting with the new device (e.g., sending control signals, using data from the device) without user interaction.

Some devices in BMS 300 present themselves to the network using equipment models. An equipment model defines equipment object attributes, view definitions, schedules, trends, and the associated BACnet value objects (e.g., analog value, binary value, multistate value, etc.) that are used for integration with other systems. An equipment model for a device can include a collection of point objects that provide information about the device (e.g., device name, network address, model number, device type, etc.) and store present values of variables or parameters used by the device. For example, the equipment model can include point objects (e.g., standard BACnet point objects) that store the values of input variables accepted by the device (e.g., setpoint, control parameters, etc.), output variables provided by the device (e.g., temperature measurement, feedback signal, etc.), configuration parameters used by the device (e.g., operating mode, actuator stroke length, damper position, tuning parameters, etc.). The point objects in the equipment model can be mapped to variables or parameters stored within the device to expose those variables or parameters to external systems or devices.

Some devices in BMS 300 store their own equipment models. Other devices in BMS 300 have equipment models stored externally (e.g., within other devices). For example, a zone coordinator 308 can store the equipment model for a bypass damper 328. In some embodiments, zone coordinator 308 automatically creates the equipment model for bypass damper 328 or other devices on zone bus 358. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 2A, BMS 300 is shown to include a system manager 302 (i.e., a smart building hub); several zone coordinators 306, 308, 310 and 318; and several zone controllers 324, 330, 332, 336, 348, and 350. System manager 302 can communicate with client devices 304 (e.g., user devices, desktop computers, laptop computers, mobile devices, etc.) via a data communications link 374 (e.g., BACnet IP, Ethernet, wired or wireless communications, etc.). System manager 302 can provide a user interface to client devices 304 via data communications link 374. The user interface may allow users to monitor and/or control BMS 300 via client devices 304.

In some embodiments, system manager 302 is connected with zone coordinators 306-310 and 318 via a system bus 354. System bus 354 can include any of a variety of communications hardware (e.g., wire, optical fiber, terminals, etc.) configured to facilitate communications between system manager and other devices connected to system bus 354. Throughout this disclosure, the devices connected to system bus 354 are referred to as system bus devices. System manager 302 can be configured to communicate with zone coordinators 306-310 and 318 via system bus 354 using a master-slave token passing (MSTP) protocol or any other communications protocol. System bus 354 can also connect system manager 302 with other devices such as a constant volume (CV) rooftop unit (RTU) 312, an input/output module (TOM) 314, a thermostat controller 316 (e.g., a TEC3000 series thermostat controller), and a network automation engine (NAE) or third-party controller 320. RTU 312 can be configured to communicate directly with system manager 302 and can be connected directly to system bus 354. Other RTUs can communicate with system manager 302 via an intermediate device. For example, a wired input 362 can connect a third-party RTU 342 to thermostat controller 316, which connects to system bus 354.

System manager 302 can provide a user interface for any device containing an equipment model. Devices such as zone coordinators 306-310 and 318 and thermostat controller 316 can provide their equipment models to system manager 302 via system bus 354. In some embodiments, system manager 302 automatically creates equipment models for connected devices that do not contain an equipment model (e.g., IOM 314, third party controller 320, etc.). For example, system manager 302 can create an equipment model for any device that responds to a device tree request. The equipment models created by system manager 302 can be stored within system manager 302. System manager 302 can then provide a user interface for devices that do not contain their own equipment models using the equipment models created by system manager 302. In some embodiments, system manager 302 stores a view definition for each type of equipment connected via system bus 354 and uses the stored view definition to generate a user interface for the equipment.

Each zone coordinator 306-310 and 318 can be connected with one or more of zone controllers 324, 330-332, 336, and 348-350 via zone buses 356, 358, 360, and 364. Zone busses 356, 358, 360, and 364 can include any of a variety of communications hardware (e.g., wire, optical fiber, terminals, etc.) configured to facilitate communications between a zone coordinator and other devices connected to the corresponding zone bus. Throughout this disclosure, the devices connected to zone busses 356, 358, 360, and 364 are referred to as zone bus devices. Zone coordinators 306-310 and 318 can communicate with zone controllers 324, 330-332, 336, and 348-350 via zone busses 356-360 and 364 using a MSTP protocol or any other communications protocol. Zone busses 356-360 and 364 can also connect zone coordinators 306-310 and 318 with other types of devices such as variable air volume (VAV) RTUs 322 and 340, changeover bypass (COBP) RTUs 326 and 352, bypass dampers 328 and 346, and PEAK controllers 334 and 344.

Zone coordinators 306-310 and 318 can be configured to monitor and command various zoning systems. In some embodiments, each zone coordinator 306-310 and 318 monitors and commands a separate zoning system and is connected to the zoning system via a separate zone bus. For example, zone coordinator 306 can be connected to VAV RTU 322 and zone controller 324 via zone bus 356. Zone coordinator 308 can be connected to COBP RTU 326, bypass damper 328, COBP zone controller 330, and VAV zone controller 332 via zone bus 358. Zone coordinator 310 can be connected to PEAK controller 334 and VAV zone controller 336 via zone bus 360. Zone coordinator 318 can be connected to PEAK controller 344, bypass damper 346, COBP zone controller 348, and VAV zone controller 350 via zone bus 364.

A single model of zone coordinator 306-310 and 318 can be configured to handle multiple different types of zoning systems (e.g., a VAV zoning system, a COBP zoning system, etc.). Each zoning system can include a RTU, one or more zone controllers, and/or a bypass damper. For example, zone coordinators 306 and 310 are shown as Verasys VAV engines (VVEs) connected to VAV RTUs 322 and 340, respectively. Zone coordinator 306 is connected directly to VAV RTU 322 via zone bus 356, whereas zone coordinator 310 is connected to a third-party VAV RTU 340 via a wired input 368 provided to PEAK controller 334. Zone coordinators 308 and 318 are shown as Verasys COBP engines (VCEs) connected to COBP RTUs 326 and 352, respectively. Zone coordinator 308 is connected directly to COBP RTU 326 via zone bus 358, whereas zone coordinator 318 is connected to a third-party COBP RTU 352 via a wired input 370 provided to PEAK controller 344.

Zone controllers 324, 330-332, 336, and 348-350 can communicate with individual BMS devices (e.g., sensors, actuators, etc.) via sensor/actuator (SA) busses. For example, VAV zone controller 336 is shown connected to networked sensors 338 via SA bus 366. Networked sensors 338 can include, for example, temperature sensors, humidity sensors, pressure sensors, lighting sensors, security sensors, or any other type of device configured to measure and/or provide an input to zone controller 336. Zone controller 336 can communicate with networked sensors 338 using a MSTP protocol or any other communications protocol. Although only one SA bus 366 is shown in FIG. 2A, it should be understood that each zone controller 324, 330-332, 336, and 348-350 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 324, 330-332, 336, and 348-350 can be configured to monitor and control a different building zone. Zone controllers 324, 330-332, 336, and 348-350 can use the inputs and outputs provided via their SA busses to monitor and control various building zones. For example, a zone controller 336 can use a temperature input received from networked sensors 338 via SA bus 366 (e.g., a measured temperature of a building zone) as feedback in a temperature control algorithm. Zone controllers 324, 330-332, 336, and 348-350 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Figure 2B:
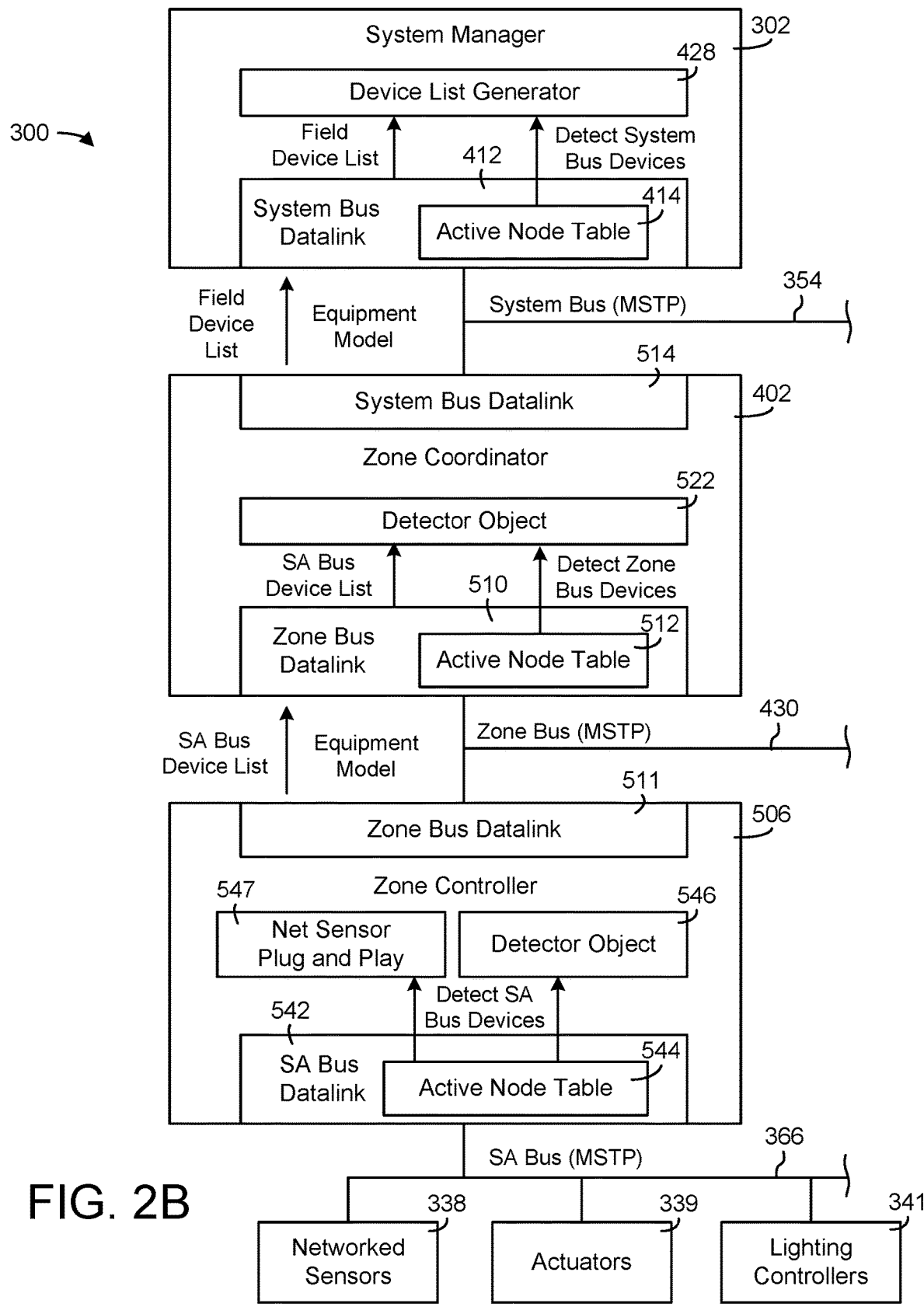
FIG. 2B is a block diagram illustrating a system manager, zone coordinator, and zone controller of the BMS of FIG. 2A in greater detail, according to some embodiments.

Referring now to FIG. 2B, a block diagram illustrating a portion of BMS 300 in greater detail is shown, according to an exemplary embodiment. BMS 300 is shown to include system manager 302, a zone coordinator 402, and a zone controller 506. Zone coordinator 402 can be any of zone coordinators 306-310 or 318. Zone controller 506 can be any of zone controllers 324, 330, 332, 336, 348, or 350. Zone coordinator 402 can be connected with system manager via system bus 354. For example, system bus 354 is shown connecting a first system bus datalink 412 within system manager 302 with a second system bus datalink 514 within zone coordinator 402. Zone coordinator 402 can connected with zone controller 506 via a zone bus 430. For example, zone bus 430 is shown connecting a first zone bus datalink 510 within zone coordinator 402 with a second zone bus datalink 511 within zone controller 506. Zone bus 430 can be any of zone busses 356-360 or 364. Zone controller 506 is connected with networked sensors 338 and actuators 339 via a SA bus 366.

BMS 300 can automatically discover new equipment connected to any of system bus 354, zone bus 430, and SA bus 366. Advantageously, the equipment discovery can occur automatically (e.g., without user action) without requiring the equipment to be placed in discovery mode and without sending a discovery command to the equipment. In some embodiments, the automatic equipment discovery is based on active node tables for system bus 354, zone bus 430, and SA bus 366. Each active node table can provide status information for the devices communicating on a particular bus. For example, the active node table 414 for system bus 354 can indicate which MSTP devices are participating in the token ring used to exchange information via system bus 354. Active node table 414 can identify the devices communicating on system bus 354 by MAC address or other device identifier. Devices that do not participate in the token ring (e.g., MSTP slave devices) can be automatically discovered using a net sensor plug and play (described in greater detail below).

The active node table for each communications bus can be stored within one or more devices connected to the bus. For example, active node table 414 can be stored within system manager 302. In some embodiments, active node table 414 is part of a system bus datalink 412 (e.g., a MSTP datalink) used by system manager 302 to communicate via system bus 354. System manager 302 can subscribe to changes in value of active node table 414 and can receive a notification (e.g., from system bus datalink 412) when a change in active node table 414. In response to a notification that a change in active node table 414 has occurred, system manager 302 can read active node table 414 to detect and identify the devices connected to system bus 354.

In some embodiments, a device list generator 428 within system manager 302 generates a list of the devices connected to system bus 354 (i.e., a device list) based on active node table 414 and stores the device list within system manager 302. The device list generated by system manager 302 can include information about each device connected to system bus 354 (e.g., device type, device model, device ID, MAC address, device attributes, etc.). When a new device is detected on system bus 354, system manager 302 can automatically retrieve the equipment model from the device if the device stores its own equipment model. If the device does not store its own equipment model, system manager 302 can retrieve a list of point values provided by the device. System manager 302 can then use the equipment model and/or list of point values to present information about the connected system bus devices to a user.

The active node tables for each zone bus can be stored within the zone coordinator connected to the zone bus. For example, the active node table 512 for zone bus 430 can be stored within zone coordinator 402. In some embodiments, active node table 512 is part of a zone bus datalink 510 (e.g., a MSTP datalink) used by the zone coordinator 402 to communicate via zone bus 430. Zone coordinator 402 can subscribe to changes in value of active node table 512 and can receive a notification (e.g., from zone bus datalink 510) when a change in active node table 512 occurs. In response to a notification that a change to active node table 512 has occurred, zone coordinator 402 can read active node table 512 to identify the devices connected to zone bus 430.

In some embodiments, a detector object 522 of zone coordinator 402 generates a list of the devices communicating on zone bus 430 (i.e., a device list) based on active node table 512 and stores the device list within zone coordinator 402. Each zone coordinator in BMS 300 can generate a list of devices on the connected zone bus. The device list generated by each zone coordinator 402 can include information about each device connected to zone bus 430 (e.g., device type, device model, device ID, MAC address, device attributes, etc.). When a new device is detected on zone bus 430, the connected zone coordinator 402 can automatically retrieve the equipment model from the device if the device stores its own equipment model. If the device does not store its own equipment model, the connected zone coordinator 402 can retrieve a list of point values provided by the device.

Zone coordinator 402 can incorporate the new zone bus device into the zoning logic and can inform system manager 302 that a new zone bus device has been added. For example, zone coordinator 402 is shown providing a field device list to system manager 302. The field device list can include a list of devices connected to zone bus 430 and/or SA bus 366. System manager 302 can use the field device list and the list of system bus devices to generate a device tree including all of the devices in BMS 300. In some embodiments, zone coordinator 402 provides an equipment model for a connected zone bus device to system manager 302. System manager 302 can then use the equipment model and/or list of point values for the new zone bus device to present information about the new zone bus device to a user.

In some embodiments, the device list generated by each zone coordinator 402 indicates whether system manager 302 should communicate directly with the listed zone bus device (e.g., VAV RTU 322, VAV zone controller 324, etc.) or whether system manager 302 should communicate with the intermediate zone coordinator 402 on behalf of the zone bus device. In some embodiments, system manager 302 communicates directly with zone bus devices that provide their own equipment models, but communicates with the intermediate zone coordinator 402 for zone bus devices that do not provide their own equipment model. As discussed above, the equipment models for zone bus devices that do not provide their own equipment model can be generated by the connected zone coordinator 402 and stored within the zone coordinator 402. Accordingly, system manager 302 may communicate directly with the device that stores the equipment model for a connected zone bus device (i.e., the zone bus device itself or the connected zone coordinator 402).

The active node table 544 for SA bus 366 can be stored within zone controller 506. In some embodiments, active node table 544 is part of the SA bus datalink 542 (e.g., a MSTP datalink) used by zone controller 506 to communicate via SA bus 366. Zone controller 506 can subscribe to changes in value of the active node table 544 and can receive a notification (e.g., from SA bus datalink 542) when a change in active node table 544 occurs. In response to a notification that a change to active node table 544 has occurred, zone controller 506 can read active node table 544 to identify some or all of the devices connected to SA bus 366. In some embodiments, active node table 544 identifies only the SA bus devices participating in the token passing ring via SA bus 366 (e.g., MSTP master devices). Zone controller 506 can include an additional net sensor plug and play (NsPnP) 547 configured to detect SA bus devices that do not participate in the token passing ring (e.g., MSTP slave devices).

In some embodiments, NsPnP 547 is configured to actively search for devices connected to SA bus 366 (e.g., networked sensors 338, actuators 339, lighting controllers 341, etc.). For example, NsPnP 547 can send a "ping" to a preconfigured list of MSTP slave MAC addresses. For each SA bus device that is discovered (i.e. responds to the ping), NsPnP 547 can dynamically bring it online. NsPnP 547 can bring a device online by creating and storing an instance of a SA bus device object representing the discovered SA bus device. NsPnP 547 can automatically populate the SA bus device object with all child point objects needed to collect and store point data (e.g., sensor data) from the newly-discovered SA bus device. In some embodiments, NsPnP 547 automatically maps the child point objects of the SA bus device object to attributes of the equipment model for zone controller 506. Accordingly, the data points provided by the SA bus devices can be exposed to zone coordinator 402 and other devices in BMS 300 as attributes of the equipment model for zone controller 506.

In some embodiments, a detector object 546 of zone controller 506 generates a list of the devices connected to SA bus 366 (i.e., a device list) based on active node table 544 and stores the device list within zone controller 506. NsPnP 547 can update the device list to include any SA bus devices discovered by NsPnP 547. The device list generated by zone controller 506 can include information about each device connected to SA bus 366 (e.g., device type, device model, device ID, MAC address, device attributes, etc.). When a new device is detected on SA bus 366, zone controller 506 can automatically retrieve the equipment model from the device if the device stores its own equipment model. If the device does not store its own equipment model, zone controller 506 can retrieve a list of point values provided by the device.

Zone controller 506 can incorporate the new SA bus device into the zone control logic and can inform zone coordinator 402 that a new SA bus device has been added. Zone coordinator 402 can then inform system manager 302 that a new SA bus device has been added. For example, zone controller 506 is shown providing a SA device list to zone coordinator 402. The SA device list can include a list of devices connected to SA bus 366. Zone coordinator 402 can use the SA device list and the detected zone bus devices to generate the field device list provided to system manager 302. In some embodiments, zone controller 506 provides an equipment model for a connected SA bus device to zone coordinator 402, which can be forwarded to system manager 302. System manager 302 can then use the equipment model and/or list of point values for the new SA bus device to present information about the new SA bus device to a user. In some embodiments, data points provided by the SA bus device are shown as attributes of the zone controller 506 to which the SA bus device is connected.

Airside System

Figure 3:
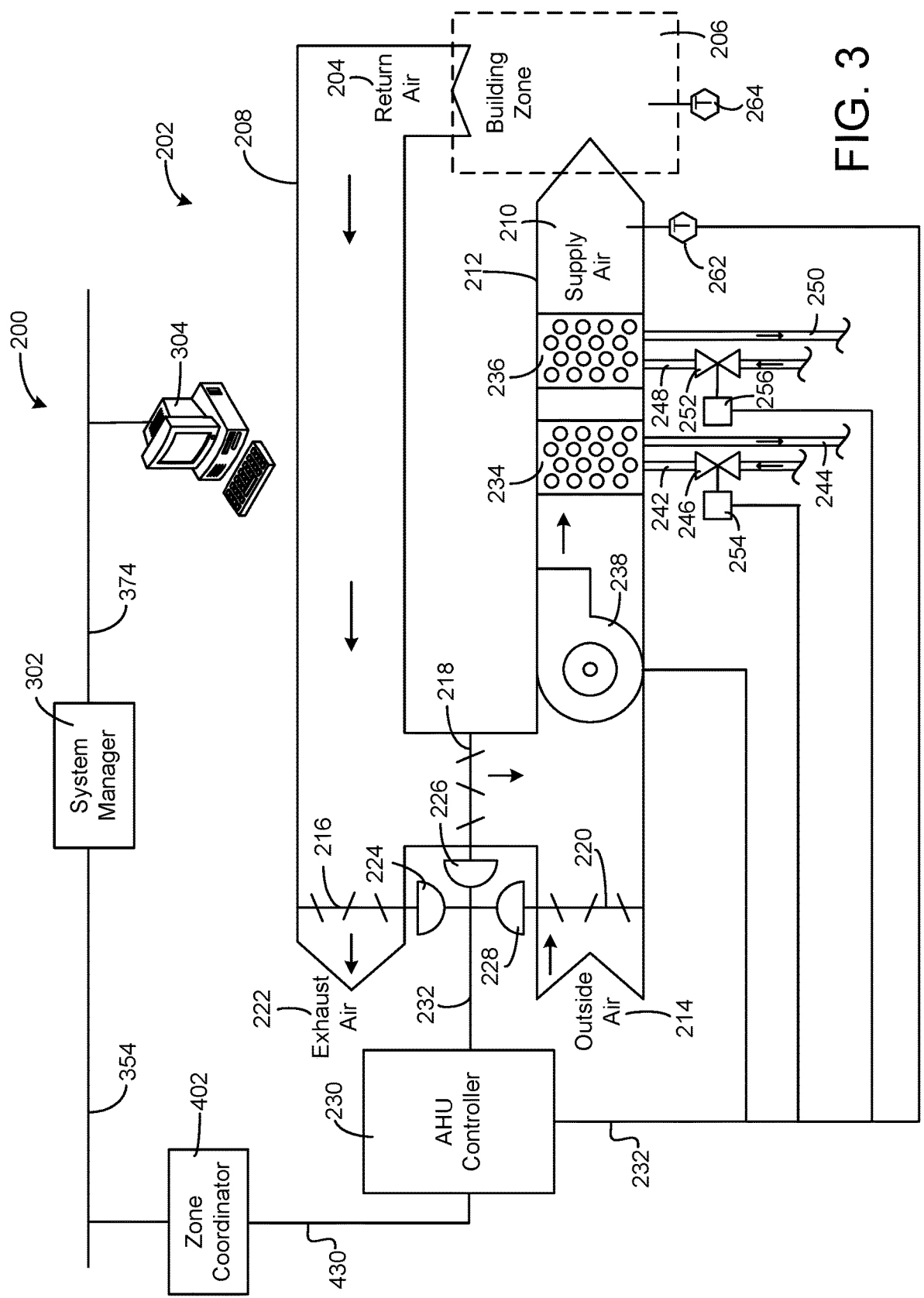
FIG. 3 is a block diagram of an airside system which can be used in the HVAC system of FIG. 1, according to some embodiments.

Referring now to FIG. 3, a block diagram of an airside system 200 is shown, according to an exemplary embodiment. In various embodiments, airside system 200 can supplement or replace airside system 130 in HVAC system 100 or can be implemented separate from HVAC system 100. When implemented in HVAC system 100, airside system 200 can include a subset of the HVAC devices in HVAC system 100 (e.g., AHU 106, VAV units 116, ducts 112-114, fans, dampers, etc.) and can be located in or around building 10. In some embodiments, airside system 200 can be used in BMS 300 as a VAV rooftop unit 322 or 340 and/or as a COBP rooftop unit 326 or 352. Airside system 200 can operate to heat or cool an airflow provided to building 10.

Airside system 200 is shown to include an economizer-type air handling unit (AHU) 202. Economizer-type AHUs vary the amount of outside air and return air used by the air handling unit for heating or cooling. For example, AHU 202 can receive return air 204 from building zone 206 via return air duct 208 and can deliver supply air 210 to building zone 206 via supply air duct 212. In some embodiments, AHU 202 is a rooftop unit located on the roof of building 10 (e.g., AHU 106 as shown in FIG. 1) or otherwise positioned to receive both return air 204 and outside air 214. AHU 202 can be configured to operate exhaust air damper 216, mixing damper 218, and outside air damper 220 to control an amount of outside air 214 and return air 204 that combine to form supply air 210. Any return air 204 that does not pass through mixing damper 218 can be exhausted from AHU 202 through exhaust damper 216 as exhaust air 222.

Each of dampers 216-220 can be operated by an actuator. For example, exhaust air damper 216 can be operated by actuator 224, mixing damper 218 can be operated by actuator 226, and outside air damper 220 can be operated by actuator 228. Actuators 224-228 can communicate with an AHU controller 230 via a sensor/actuator (SA) bus 232. Actuators 224-228 can receive control signals from AHU controller 230 and can provide feedback signals to AHU controller 230. Feedback signals can include, for example, an indication of a current actuator or damper position, an amount of torque or force exerted by the actuator, diagnostic information (e.g., results of diagnostic tests performed by actuators 224-228), status information, commissioning information, configuration settings, calibration data, and/or other types of information or data that can be collected, stored, or used by actuators 224-228. AHU controller 230 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 224-228.

Still referring to FIG. 3, AHU 202 is shown to include a cooling coil 234, a heating coil 236, and a fan 238 positioned within supply air duct 212. Fan 238 can be configured to force supply air 210 through cooling coil 234 and/or heating coil 236 and provide supply air 210 to building zone 206. AHU controller 230 can communicate with fan 238 via SA bus 232 to control a flow rate of supply air 210. In some embodiments, AHU controller 230 controls an amount of heating or cooling applied to supply air 210 by modulating a speed of fan 238.

Cooling coil 234 can receive a chilled fluid from waterside system 120 via piping 242 and can return the chilled fluid to waterside system 120 via piping 244. Valve 246 can be positioned along piping 242 or piping 244 to control a flow rate of the chilled fluid through cooling coil 234. In some embodiments, cooling coil 234 includes multiple stages of cooling coils that can be independently activated and deactivated (e.g., by AHU controller 230) to modulate an amount of cooling applied to supply air 210.

Heating coil 236 may receive a heated fluid from waterside system 120 via piping 248 and can return the heated fluid to waterside system 120 via piping 250. Valve 252 can be positioned along piping 248 or piping 250 to control a flow rate of the heated fluid through heating coil 236. In some embodiments, heating coil 236 includes multiple stages of heating coils that can be independently activated and deactivated (e.g., by AHU controller 230) to modulate an amount of heating applied to supply air 210.

Each of valves 246 and 252 can be controlled by an actuator. For example, valve 246 can be controlled by actuator 254 and valve 252 can be controlled by actuator 256. Actuators 254-256 can communicate with AHU controller 230 via SA bus 232. Actuators 254-256 can receive control signals from AHU controller 230 and can provide feedback signals to AHU controller 230. In some embodiments, AHU controller 230 receives a measurement of the supply air temperature from a temperature sensor 262 positioned in supply air duct 212 (e.g., downstream of cooling coil 234 and/or heating coil 236).

In some embodiments, AHU controller 230 operates valves 246 and 252 via actuators 254-256 to modulate an amount of heating or cooling provided to supply air 210 (e.g., to achieve a setpoint temperature for supply air 210 or to maintain the temperature of supply air 210 within a setpoint temperature range). The positions of valves 246 and 252 affect the amount of heating or cooling provided to supply air 210 by cooling coil 234 or heating coil 236 and may correlate with the amount of energy consumed to achieve a desired supply air temperature. In some embodiments, AHU controller 230 receives a measurement of the zone temperature from a temperature sensor 264 positioned within building zone 206. AHU controller 230 can control the temperature of supply air 210 and/or building zone 206 by activating or deactivating coils 234-236, adjusting a speed of fan 238, or a combination of both.

Still referring to FIG. 3, AHU controller 230 can be connected to zone coordinator 402 via zone bus 430 (e.g., a MSTP communications bus). Similarly, zone coordinator 402 can be connected to system manager 302 via system bus 354 (e.g., another MSTP communications bus). Zone bus 430 and system bus 354 can include any of a variety of communications hardware (e.g., wires, optical fiber, terminals, etc.) and/or communications software configured to facilitate communications between AHU controller 230, zone coordinator 402, and system manager 302. System manager 302 can communicate with client device 304 via data communications link 374 (e.g., BACnet IP, Ethernet, wired or wireless communications, etc.).

Client device 304 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, airside system 200, BMS 300, and/or the various subsystems, and devices thereof. Client device 304 can be a computer workstation, a client terminal, a remote or local interface, or any other type of user interface device. Client device 304 can be a stationary terminal or a mobile device. For example, client device 304 can be a desktop computer, a computer server with a user interface, a laptop computer, a tablet, a smartphone, a PDA, or any other type of mobile or non-mobile device.

System Manager

Figure 4:
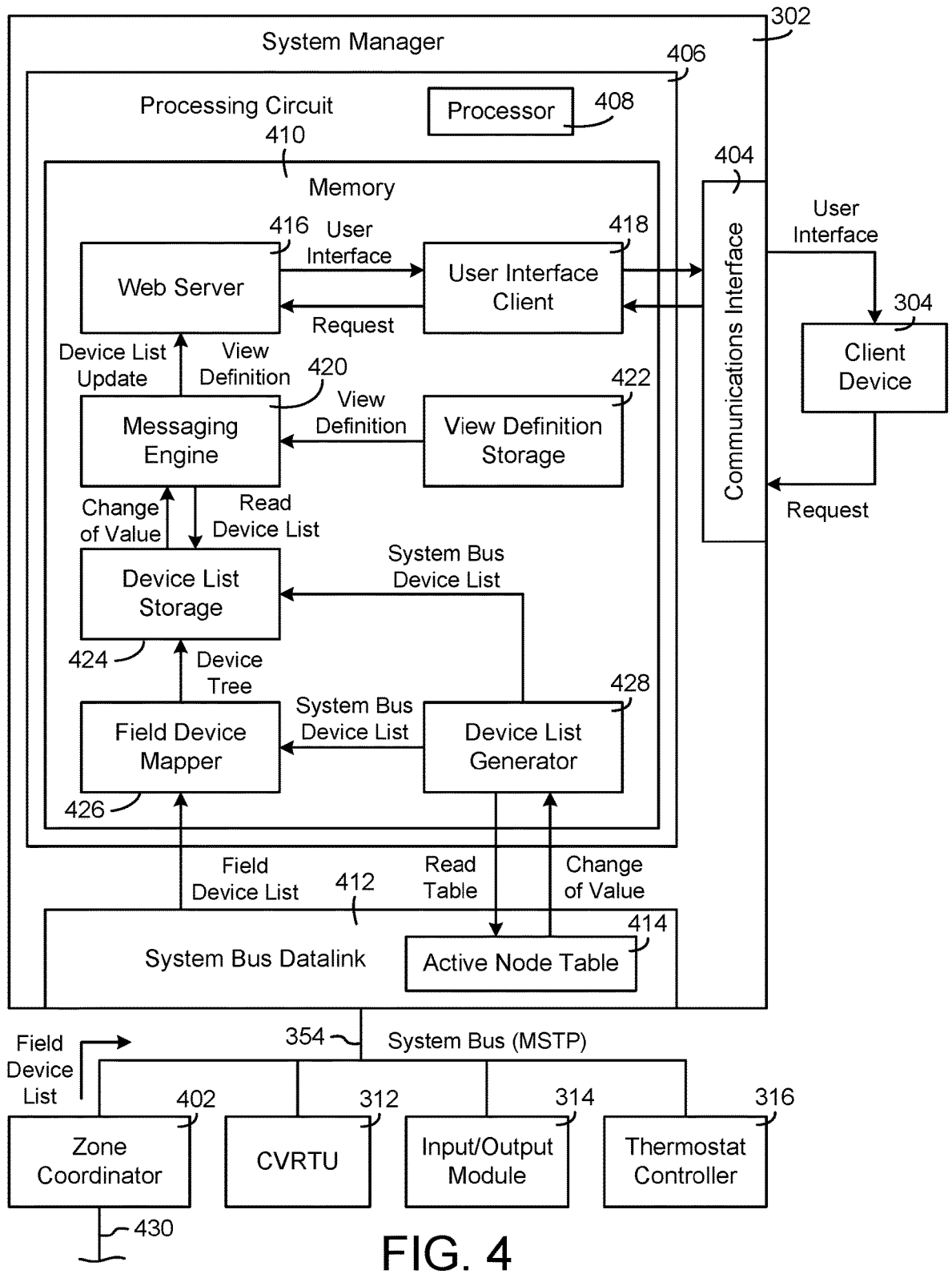
FIG. 4 is a block diagram illustrating the system manager of FIG. 2B in greater detail, according to some embodiments.

Referring now to FIG. 4, a block diagram illustrating system manager 302 in greater detail is shown, according to an exemplary embodiment. System manager 302 is shown to include a system bus datalink 412, a communications interface 404, and a processing circuit 406. System bus datalink 412 connects to system bus 354 and can be used by system manager 302 to communicate with various other devices connected to system bus 354. For example, system bus datalink 412 can be used to communicate with zone coordinator 402 (i.e., any of zone coordinators 306-310 and 318), CVRTU 312, IOM 314, and/or thermostat controller 316.

System bus datalink 412 is shown to include an active node table 414. Active node table 414 provides status information for the devices connected to system bus 354. For example, active node table 414 can indicate which MSTP devices are participating in the token ring used to exchange information via system bus 354. In some embodiments, active node table 414 is a table in the form of an array of bytes. The location of each byte in active node table 414 may represent the token ring participation status of a particular node or device connected to system bus 354. Devices connected to system bus 354 can be identified by MAC address (or any other device identifier) in active node table 414. Advantageously, active node table 414 can list the MAC addresses of the devices connected to system bus 354 without requiring the devices to be placed in discovery mode.

In some embodiments, active node table 414 includes a change counter attribute. Each time a change to active node table 414 occurs (e.g., a new device begins communicating on system bus 354), the change counter attribute can be incremented by system bus datalink 412. Other objects or devices interested in the status of active node table 414 can subscribe to a change of value (COV) of the change counter attribute. When the change counter attribute is incremented, system bus datalink 412 can report the COV to any object or device that has subscribed to the COV. For example, device list generator 428 can subscribe to the COV of the change counter attribute and can be automatically notified of the COV when a change to active node table 414 occurs. In response to receiving the COV notification, device list generator 428 can read active node table 414. Device list generator 428 can use the information from active node table 414 to generate a list of devices connected to system bus 354. Device list generator 428 is described in greater detail below.

Communications interface 404 can facilitate communications between system manager 302 and external systems, devices, or applications. For example, communications interface 404 can be used by system manager 302 to communicate with client device 304 (e.g., a tablet, a laptop computer, a smartphone, a desktop computer, a computer workstation, etc.), monitoring and reporting applications, enterprise control applications, remote systems and applications, and/or other external systems or devices for allowing user control, monitoring, and adjustment to BMS 300 and/or system manager 302.

Communications interface 404 can include wired or wireless communications interfaces (e.g., jacks, antennas, transmitters, receivers, transceivers, wire terminals, etc.) for conducting data communications with client device 304 or other external systems or devices. In various embodiments, communications conducted via interface 404 can be direct (e.g., local wired or wireless communications) or via a communications network (e.g., a WAN, the Internet, a cellular network, etc.). For example, communications interface 404 can include an Ethernet card and port for sending and receiving data via an Ethernet-based communications link or network. In another example, communications interface 404 can include a WiFi transceiver for communicating via a wireless communications network. In another example, communications interface 404 can include cellular or mobile phone communications transceivers. In one embodiment, communications interface 404 is a power line communications interface and/or an Ethernet interface.

Processing circuit 406 is shown to include a processor 408 and memory 410. Processor 408 can be a general purpose or specific purpose processor, an application specific integrated circuit (ASIC), one or more field programmable gate arrays (FPGAs), a group of processing components, or other suitable processing components. Processor 408 is configured to execute computer code or instructions stored in memory 410 or received from other computer readable media (e.g., CDROM, network storage, a remote server, etc.).

Memory 410 can include one or more devices (e.g., memory units, memory devices, storage devices, etc.) for storing data and/or computer code for completing and/or facilitating the various processes described in the present disclosure. Memory 410 can include random access memory (RAM), read-only memory (ROM), hard drive storage, temporary storage, non-volatile memory, flash memory, optical memory, or any other suitable memory for storing software objects and/or computer instructions. Memory 410 can include database components, object code components, script components, or any other type of information structure for supporting the various activities and information structures described in the present disclosure. Memory 410 can be communicably connected to processor 408 via processing circuit 406 and can include computer code for executing (e.g., by processor 408) one or more processes described herein. When processor 408 executes instructions stored in memory 410, processor 408 generally configures system manager 302 (and more particularly processing circuit 406) to complete such activities.

Still referring to FIG. 4, system manager 302 is shown to include a device list generator 428 and a field device mapper 426. Device list generator 428 can sign up or subscribe to a change in value (COV) of the change counter attribute of active node table 414. When a change to active node table 414 occurs, system bus datalink 412 can provide a COV notification to device list generator 428. In response to receiving the COV notification, device list generator 428 can read active node table 414. Device list generator 428 can use the information from active node table 414 to generate a list of devices connected to system bus 354. The system bus device list can be stored in device list storage 424 and/or provided to filed device mapper 426.

Field device mapper 426 can sign up or subscribe to a COV of a field device list maintained by zone coordinator 402. Field devices can include any device connected to zone bus 430 (i.e., one of zone busses 356-360 or 364) either directly or via an intermediate device such as a PEAK controller or zone controller. Zone coordinator 402 can maintain a list of the field devices connected to zone bus 430 in the same way that system manager 302 maintains the list of system bus devices connected to system bus 354. In some embodiments, the list of field devices maintained by zone coordinator 402 includes a change counter attribute. When a change to the list of field bus devices occurs, zone coordinator 402 can provide a COV notification to field device mapper 426. In response to receiving the COV notification, field device mapper 426 can read the list of field devices maintained by zone coordinator 402 to identify the field devices connected to zone bus 430.

Field device mapper 426 can use the list of devices from zone coordinator 402 to generate a device tree including both the devices connected to system bus 354 and the field devices connected to zone bus 430. The device tree can be a hierarchy of devices in BMS 300. For example, the list of system bus devices can be updated to include the list of field devices associated with each zone coordinator hierarchically below the associated zone coordinator in the system bus device list. In this way, the list of devices can be updated to include hierarchical information with system bus devices at a first level of the hierarchy and zone bus devices at a lower level of the hierarchy (e.g., hierarchically below each zone coordinator in the list of system bus devices). In some embodiments, device list storage 424 includes a device list change counter attribute. The change counter attribute can be incremented each time an update to the stored device lists occurs.

Still referring to FIG. 4, system manager 302 is shown to include a messaging engine 420. Messaging engine 420 can sign up or subscribe to a COV in the device list stored in device list storage 424. When a change to the stored device list occurs, device list storage 424 can provide a COV notification to messaging engine 420. In response to receiving the COV notification, messaging engine 420 can read the device list stored in device list storage 424 to identify all of the devices connected to system bus 354, any of zone busses 356-360 or 364, and/or SA bus 366. In some embodiments, messaging engine 420 translates the list of devices into format which can be presented to a user. For example, messaging engine 420 can translate the list of devices into a JavaScript object notation, HTML format, or any other format that facilitates presentation to a user. Messaging engine 420 can provide the updated and translated device list to web server 416.

In some embodiments, messaging engine 420 receives a request for a view definition from web server 416. The view definition may identify a set of attributes for a particular device that are core to the functionality of the device. Each device or type of device in BMS 300 may have a different view definition. For example, the view definition for a chiller controller may identify the chiller outlet temperature as an important data point; however, the view definition for a valve controller may not identify such a data point as important to the operation of the valve. In some embodiments, the view definition for a device identifies a subset of the data objects defined by the equipment model for the device. Web server 416 may use the view definition to dynamically select a subset of the stored data objects for inclusion in a web interface (e.g., a webpage) generated by web server 416.

In some embodiments, view definitions for all the devices in BMS 300 are stored in view definition storage 422 within system manager 302. In other embodiments, view definitions can be stored in the devices themselves (e.g., within zone coordinators, VAV zone controllers, RTUs, etc.). In some embodiments, the view definition for a device is a component of the device's equipment model and is provided to system manager 302 by connected devices along with the equipment models. For example, the devices connected to system bus 354 and/or zone busses 356-360 and 364 can provide their own view definitions to system manager 302.

If a device does not provide its own view definition, system manager 302 can create or store view definitions for the device. If the view definition provided by a particular device is different from an existing view definition for the device stored in system manager 302, the system manager's view definition may override or supersede the view definition provided by the device. In some embodiments, the view definition for a device includes the device's user name and description. Accordingly, the web interface generated by web server 416 can include the device's user name and description when the web interface is generated according to the view definition.

Still referring to FIG. 4, system manager 302 is shown to include a web server 416 and a user interface (UI) client 418. Web server 416 can receive a request for a device list from UI client 418 and can generate a web interface that includes the requested device list. In some embodiments, web server 416 uses the updated device list from messaging engine 420 (i.e., the device tree) to generate the web interface. Web server 416 can use the view definition for each device in the device list to determine which attributes of the devices to include in the web interface. In some embodiments, web server 416 generates a home page for each type of equipment based on a home page view definition for the equipment type. The home page view definition can be stored in system manager 302 (e.g., in view definition storage). Other view definitions can be stored in system manager 302 or received from the equipment at runtime.

The view definition file may identify a subset of the data objects listed in the equipment model (e.g., equipment attributes, data points, etc.). The data objects listed in the view definition may be included in the web interface generated by web server 416 and provided to client device 304. The view definition may group the data objects differently than the equipment model. For example, the view definition may group the data objects in a manner that is intuitive for a user attempting to commission, monitor, or control the device via the web interface. Web server 416 may use the view definition to dynamically select a subset of the stored data objects for inclusion in the web interface generated by web server 416.

In some embodiments, web server 416 is a modified Unison HTTP server. Web server 416 may include SSL support for secure connections and the ability for CGI scripts to define their own HTTP status codes. Web server 416 may include support for HTTP authentication (e.g., using a Unison security/login module) as well as support for HTTP 0.9, 1.0, and 1.1. Web server 416 may support dynamic content via CGI scripts (e.g., written in C or any other scripting language) and may support multiple and simultaneous connections by clients.

Web server 416 may be configured to interface with the other components of system manager 302 (e.g., natively or via CGI scripts). For example, web server 416 may be configured to read data objects from messaging engine 420, device list storage 424, and/or view definition storage 422 and use the data to generate the web interface provided to client device 304. Web server 416 may be configured to receive data from client device 304 and write data to the data objects based on the input received from client device 304.

Web server 416 may be configured to access the equipment model and/or the view definition to determine which of the data objects to include in the generated web interface. Web server 416 may dynamically generate the web interface based on the information provided in the equipment model and/or the view definition.

In some embodiments, web server 416 uses Common Gateway Interface (CGI) scripts to perform some or all of the functions described herein. The CGI scripts may be stored within the memory of system manager 302 and provided to client device 304 in conjunction with the web interface generated by the web server 416. In some embodiments, web server 416 integrates the CGI scripts with the web interface and provides the integrated web interface (e.g., with embedded CGI scripts) to client device 304. A web browser running on client device 304 may run the CGI scripts to request various types of data from system manager 302 via web server 416.

UI client 418 receives the web interface from web server 418 and provides the web interface as a user interface to client device 304. In some embodiments, the web interface includes the updated list of devices received from messaging engine 420. The web interface can include attributes or data points associated with each listed device. For example, the web interface can include analog inputs or outputs, binary inputs or outputs, enumerated value inputs or outputs, multistate inputs or outputs, string inputs or outputs, or any other type of or value associated with a particular device (e.g., device name, measured values, operating mode, etc.).

In some embodiments, the web interface is interactive and allows a user to modify or write various object attributes. The modified object attributes can be provided to system manager 302 via user interface client 418 and used by system manager 302 to update attributes in the equipment models for the listed devices. If the equipment models are stored within zone coordinator 402 or other devices in BMS 300, the updated attribute values can be distributed to such devices via system bus 354 and used to update the equipment models stored in such devices. An example of an interactive web interface that can be generated by web server 416 based on a stored view definition and/or device list is described in detail in U.S. patent application Ser. No. 15/146,660 titled "HVAC Equipment Providing a Dynamic Web Interface Systems and Methods" and filed May 4, 2016, the entire disclosure of which is incorporated by reference herein.

Zone Coordinator

Figure 5:
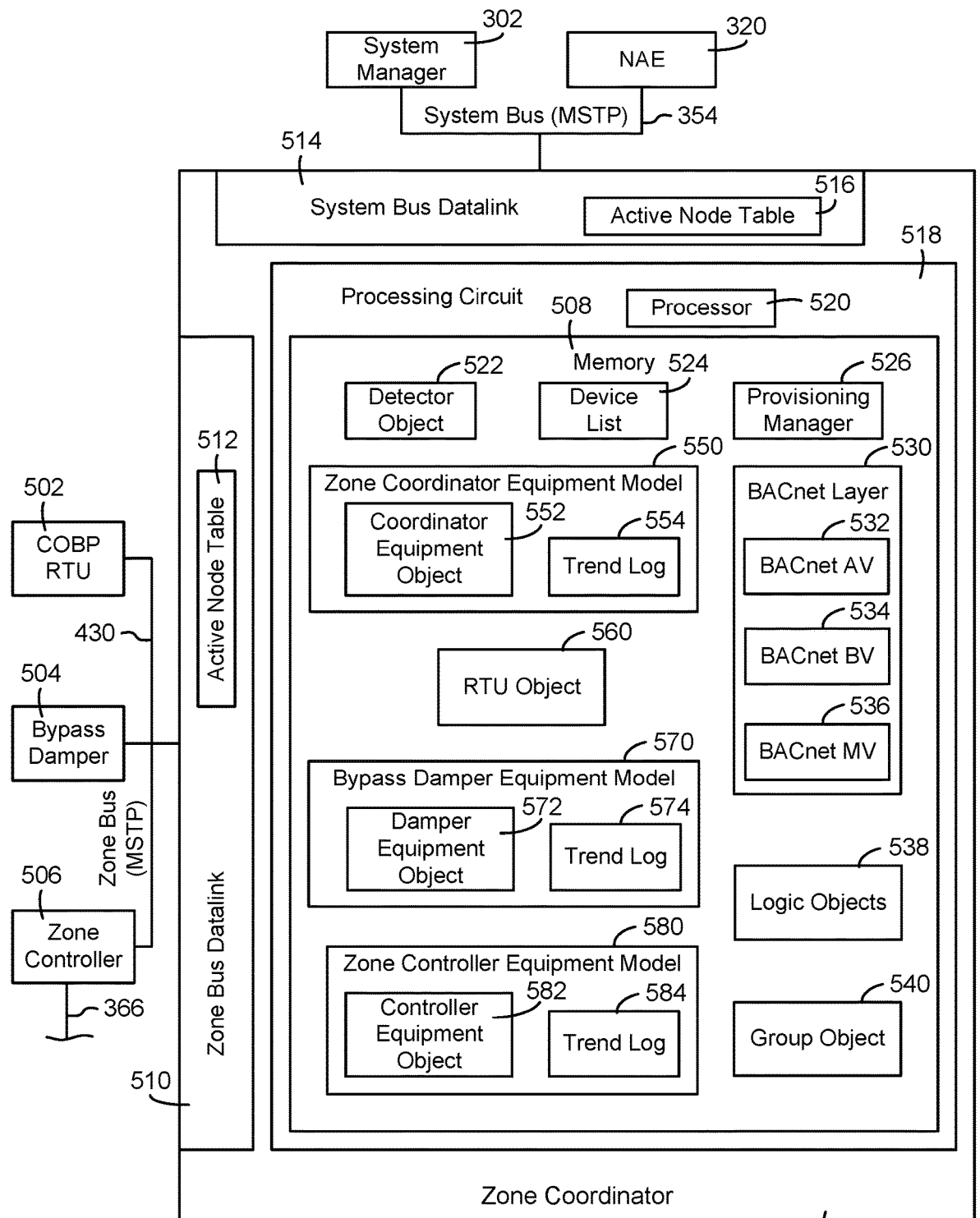
FIG. 5 is a block diagram illustrating the zone coordinator of FIG. 2B in greater detail, according to some embodiments.

Referring now to FIG. 5, a block diagram illustrating zone coordinator 402 in greater detail is shown, according to an exemplary embodiment. Zone coordinator 402 can be any zone coordinator in BMS 300 (e.g., one of zone coordinators 306-310 or 318). In FIG. 5, zone coordinator 402 is shown as a Verasys COBP engine (VCE) connected with a COBP zoning system via a zone bus 430. The COBP zoning system is shown to include a COBP RTU 502, a bypass damper 504, and a zone controller 506. However, zone coordinator 402 can also function as a Verasys VAV engine (VVE) if connected with a VVE zoning system via zone bus 430. For example, COBP RTU 502 can be replaced with a VAV RTU and bypass damper 504 can be removed to allow zone coordinator 402 to function as a VVE. A single model of zone coordinator 402 can be configured to handle multiple different types of zoning systems (e.g., a VAV zoning system, a COBP zoning system, etc.).

Zone coordinator 402 is shown to include a system bus datalink 514, a zone bus datalink 510, and a processing circuit 518. System bus datalink 514 may be the same or similar to system bus datalink 412, as described with reference to FIG. 4. For example, system bus datalink 514 can be used to communicate with system manager 302, NAE 320, and/or any other system or device connected to system bus 354 (e.g., CVRTU 312, IOM 314, thermostat controller 316, etc.). System bus datalink 514 is shown to include an active node table 516. Active node table 516 provides status information for the devices connected to system bus 354. For example, active node table 516 can indicate which MSTP devices are participating in the token ring used to exchange information via system bus 354.

Similarly, zone bus datalink 510 can be used to communicate with COBP RTU 502, bypass damper 504, zone controller 506, and/or any other devices connected to zone bus 430. Zone bus datalink 510 is shown to include an active node table 512. Active node table 512 provides status information for the devices connected to zone bus 430. For example, active node table 512 can indicate which MSTP devices are participating in the token ring used to exchange information via zone bus 430. In some embodiments, active node table 512 is a table in the form of an array of bytes. The location of each byte in active node table 512 may represent the token ring participation status of a particular node or device connected to zone bus 430. Devices connected to zone bus 430 can be identified by MAC address (or any other device identifier) in active node table 512. Advantageously, active node table 512 can list the MAC addresses of the devices connected to zone bus 430 without requiring the devices to be placed in discovery mode.

In some embodiments, active node table 512 includes a change counter attribute. Each time a change to active node table 512 occurs (e.g., a new device begins communicating on zone bus 430), the change counter attribute can be incremented by zone bus datalink 510. Other objects or devices interested in the status of active node table 512 can subscribe to a change of value (COV) of the change counter attribute. When the change counter attribute is incremented, zone bus datalink 510 can report the COV to any object or device that has subscribed to the COV. For example, detector object 522 can subscribe to the COV of the change counter attribute and can be automatically notified of the COV when a change to active node table 512 occurs. In response to receiving the COV notification, detector object 522 can read active node table 512. Detector object 522 can use the information from active node table 512 to generate a list of devices connected to zone bus 430. Detector object 522 is described in greater detail below.

Still referring to FIG. 5, processing circuit 518 is shown to include a processor 520 and memory 508. Processor 520 can be a general purpose or specific purpose processor, an application specific integrated circuit (ASIC), one or more field programmable gate arrays (FPGAs), a group of processing components, or other suitable processing components. Processor 520 is configured to execute computer code or instructions stored in memory 508 or received from other computer readable media (e.g., CDROM, network storage, a remote server, etc.).

Memory 508 can include one or more devices (e.g., memory units, memory devices, storage devices, etc.) for storing data and/or computer code for completing and/or facilitating the various processes described in the present disclosure. Memory 508 can include random access memory (RAM), read-only memory (ROM), hard drive storage, temporary storage, non-volatile memory, flash memory, optical memory, or any other suitable memory for storing software objects and/or computer instructions. Memory 508 can include database components, object code components, script components, or any other type of information structure for supporting the various activities and information structures described in the present disclosure. Memory 508 can be communicably connected to processor 520 via processing circuit 518 and can include computer code for executing (e.g., by processor 520) one or more processes described herein. When processor 520 executes instructions stored in memory 508, processor 520 generally configures zone coordinator 402 (and more particularly processing circuit 518) to complete such activities.

Still referring to FIG. 5, zone coordinator 402 is shown to include a detector object 522. Detector object 522 is configured to detect equipment connected to zone bus 430. In some embodiments, detector object 522 maintains a device list 524 that system manager 302 uses to construct a device tree. Detector objet 522 can generate the device list using information from active node table 512. For example, detector object 522 can sign up or subscribe to a change in value (COV) of the change counter attribute of active node table 512. When a change to active node table 512 occurs, zone bus datalink 510 can provide a COV notification to detector object 522. In response to receiving the COV notification, detector object 522 can read active node table 512. Detector object 522 can use the information from active node table 512 to generate a list of devices connected to zone bus 430. Zone bus device list 524 can be stored in zone coordinator 402.

Zone bus device list 524 can provide information about each of the devices that are currently connected to zone bus 430. In some embodiments, zone bus device list 524 specifies whether system manager 302 should talk directly to each connected zone bus device, or whether system manager 302 should communicate with zone coordinator 402 to interact with the zone bus device. In some embodiments, zone bus device list 524 specifies that system manager 302 should communicate directly with devices that store their own equipment model, but should communicate with zone coordinator 402 to interact with devices having equipment models stored within zone coordinator 402. In some embodiments, zone bus device list 524 stores detailed information for devices that have equipment models stored within zone coordinator 402. For example, zone bus device list 524 can store a user name, description, MAC address, online/offline status, number of active critical alarms, an equipment view version, a top level equipment model, a view definition, and/or model attributes for one or more connected zone bus devices.

Zone bus device list 524 can specify the network address of each connected zone bus device. In some embodiments, the zone bus device list stores a null network address (e.g., network address=0) for a connected zone bus device if the equipment model for the zone bus device is stored within zone coordinator 402. However, if the zone bus device stores its own equipment model, the actual network address of the zone bus device can be provided in zone bus device list 524. System manager 302 can read zone bus device list 524 and use the network address obtained from zone bus device list 524 to communicate directly with connected zone bus devices.

Detector object 522 can communicate with connected zoning system devices in response to a determination that a change to active node table 512 has occurred (e.g., a COV notification from zone bus datalink 510). Upon receiving the COV notification from zone bus datalink 510, detector object 522 can read model attributes of the various zoning system devices coordinated by zone coordinator 402. Such devices can include zone bus devices connected to zone bus 430. For example, detector object 522 can read model attributes from a wired zone controller 506, bypass damper 504, COBP RTU 502, and/or any other device connected to zone bus 430. Detector object 522 can also read model attributes from other zoning system devices, which can be connected to zone coordinator 402 via a wired or wireless communications link. For example, detector object 522 can read model attributes from a Zigbee coordinator device, a wireless zone controller, or any other zoning system device. Detector object 522 can use the model attributes to populate the information stored in zone bus device list 524.

In some embodiments, detector object 522 is configured to provide COV notifications to system manager 302 when zone bus device list 524 is updated. For example, system manager 302 can subscribe to changes in zone bus device list 524 maintained by detector object 522. When zone bus device list 524 changes, detector object 522 can notify system manager 302 of the change. In response to receiving a COV notification from detector object 522, system manager 302 can read zone bus device list 524 from zone coordinator 402. System manager 302 can then use the updated zone bus device list 524 to update the master device list stored in system manager 302 (e.g., in device list storage 424).

In some embodiments, detector object 522 compares the updated zone bus device list 524 with a previous version of zone bus device list 524 when an update to zone bus device list 524 occurs. If a MAC address was added to zone bus device list 524, detector object 522 can create or update an equipment object corresponding to the MAC address (e.g., a zone controller equipment object 582, a bypass damper equipment object 572, etc.). If a MAC address was deleted from zone bus device list 524, detector object 522 can remove the corresponding equipment object or can take no action. If an equipment model has changed for an existing MAC address in zone bus device list 524, detector object can delete and re-add the associated equipment object. Detector object 522 can merge the updates to zone bus device list 524 into the previous version of zone bus device list 524 and can update the online/offline status for each zone bus device. In some embodiments, detector object 522 deletes offline devices in response to receiving a relearn command from system manager 302.

Still referring to FIG. 5, zone coordinator 402 is shown to include a zone coordinator equipment model 550 having a zone coordinator equipment object 552. Zone coordinator equipment object 552 can configure connected zone bus devices. For example, when zone coordinator 402 receives an update to a time zone parameter or unit set parameter, zone coordinator equipment object 552 can pass the updated values to each of the zone bus devices. In some embodiments, zone coordinator equipment object 552 receives an updated value for the RTU type attribute of COBP RTU 502. The updated value can be received from a user or read from the model attributes of COBP RTU 502. Zone coordinator equipment object 552 can determine whether the updated RTU type is compatible with zone controller 506. If the RTU type is not compatible, zone coordinator equipment object 552 can remove details from zone controller equipment model 580 so that minimal details are shown via the web interface. In some embodiments, zone coordinator equipment object 552 receives a relearn command from system manager 302 and commands detector object 522 to delete offline system bus devices in response to receiving the relearn command.

Zone coordinator 402 is shown to include a bypass damper equipment model 570 and a zone controller equipment model 580. Bypass damper equipment model 570 and zone controller equipment model 580 represent bypass damper 504 and zone controller 506, respectively. Although only one zone controller equipment model 580 is shown in FIG. 5, it should be understood that any number of zone controller equipment objects can be included, based on the number of zone controllers connected to zone coordinator 402 via zone bus 430. For example, if two zone controllers are connected to zone bus 430, zone coordinator 402 can include two zone controller equipment models (i.e., one zone controller equipment model for each zone controller).

Equipment models 570 and 580 can include a set of data points or attributes that define bypass damper 504 and zone controller 506. Zone coordinator 402 can interact with bypass damper 504 and zone controller 506 by reading and writing values to equipment models 570 and 580. In some embodiments, equipment models 570 and 580 are created automatically by zone coordinator 402. For example, zone controller equipment model 580 can be created or deleted by detector object 522 when zone controller 506 is added or removed from the network.

Bypass damper equipment model 570 is shown to include a damper equipment object 572. Similarly, zone controller equipment model 580 is shown to include a controller equipment object 582. Equipment objects 572 and 582 can communicate with bypass damper 504 and zone controller 506 via zone bus 430. For example, damper equipment object 572 can receive data from bypass damper 504 and update bypass damper equipment model 570 with the data values from bypass damper 504. Similarly, zone controller equipment object 582 can receive data from zone controller 506 and can update zone controller equipment model 580 with the data values from zone controller 506. Equipment objects 572 and 582 can also send data to bypass damper 504 and zone controller 506 based on the data values stored in equipment models 570 and 580.

Equipment objects 572 and 582 can create BACnet objects for damper 504 and zone controller 506. For example, equipment objects 572 and 582 can create BACnet analog value (AV) objects 532, BACnet binary value (BV) objects 534, and/or BACnet multistate value (MV) objects 536 representing various data points defined by equipment models 570 and 580. The BACnet objects 532-536 created by equipment objects 572 and 582 can be stored in BACnet layer 530 and exposed to system bus devices (e.g., system manager 302) via system bus 354. System manager 302 can interact with bypass damper 504 and zone controller 506 by reading and writing data values to BACnet objects 532-536. Equipment objects 572 and 582 can be configured to synchronize BACnet objects 532-536 with the data values stored in equipment models 570 and 580 to bridge communications between system manager 302 and zone bus devices such as bypass damper 504 and zone controller 506.

In some embodiments, zone controller equipment object 582 can sign up or subscribe to a COV of a SA device list maintained by zone controller 506. SA devices can include any device connected to zone controller 506 via a sensor/actuator (SA) bus (e.g., SA bus 366). Zone controller 506 can maintain a list of the SA devices connected to the SA bus in the same way that zone coordinator 402 maintains the list of zone bus devices connected to zone bus 430. In some embodiments, the list of SA bus devices maintained by zone controller 506 includes a change counter attribute. When a change to the list of SA bus devices occurs, zone controller 506 can provide a COV notification to zone controller equipment object 582. In response to receiving the COV notification, zone controller equipment object 582 can read the list of SA bus devices maintained by zone controller 506 to identify the devices connected to zone controller 506 via the SA bus.

Zone controller equipment object 582 can use the list of SA bus devices to update zone bus device list 524. For example, zone bus device list 524 can be updated to include the list of SA bus devices associated with each zone controller in the zone bus device list. As described above, system manager 302 can use the zone bus device list 524 to update the list of devices in BMS 300. In this way, the list of devices can be updated to include hierarchical information with system bus devices at a first level of the hierarchy, zone bus devices at a second level of the hierarchy (e.g., hierarchically below each zone coordinator in the list of system bus devices), and SA bus devices at a third level of the hierarchy (e.g., hierarchically below each zone controller in the list of system bus devices).

Still referring to FIG. 5, zone coordinator 402 is shown to include an RTU object 560. RTU object 560 represents COBP RTU 502. In some embodiments, RTU 502 stores its own equipment model within RTU 502. Accordingly, RTU object 560 may not include an equipment model for RTU 502. However, RTU object 560 can behave like an equipment object. For example, RTU object 560 can create a set of BACnet objects for RTU 502. The set of BACnet objects created by RTU object 560 can be a subset of the BACnet objects exposed directly by RTU 502 on zone bus 430 and can be stored in BACnet layer 530. The BACnet objects created by RTU object 560 provides a local representation of RTU 502 within zone coordinator 402. The BACnet objects created by RTU object 560 can be exposed to system manager 302 and other system bus devices via system bus 354.

In some embodiments, zone coordinator equipment model 550, bypass damper equipment model 570, and zone controller equipment model 580 include trend logs 554, 574, and 584. Trend logs 554, 574, and 584 can store trend data for various data points associated with zone coordinator equipment object 552, bypass damper equipment object 572, and zone controller equipment object 582. Similarly, RTU object 560 can cache data from RTU 502 for use by other objects within zone coordinator 402.

In some embodiments, zone controller equipment object 582 and trend logs 554, 574, and 584 are created/deleted at runtime and may not be part of the provisioned archive. For example, zone controller equipment object 582 can be created in response to a determination by detector object 522 that a new zone controller 506 is connected to zone bus 430. Zone controller equipment object 582 can be deleted by detector object 522 is the corresponding zone controller is offline or disconnected when a relearn command is received by the zone coordinator 402.

In some embodiments, zone controller equipment object 582 and trend logs 554, 574, and 584 are archived at runtime in a separate archive file. Detector object 522 can initiate the archive process when a zone is added or deleted. In some embodiments, the archive process only archives zone objects and trend log objects. During subsequent startups, this separate archive can be loaded immediately after the provisioned archive is loaded. Persisted values and trend samples from the separate archive can be retrieved and applied during normal operation. In some embodiments, the provisioning manager 526 does not delete or replace the separate archive during provisioning.

Still referring to FIG. 5, zone coordinator 402 is shown to include logic objects 538 and a group object 540. Group object 540 can maintain a list of the zones managed by zone coordinator 402. In some embodiments, the zone list is automatically updated when zones are added or deleted. For example, zone controller equipment object 582 can be configured to automatically add a zone to the zone list when zone controller equipment model 580 is created. In some embodiments, group object 540 distributes commands or data to the listed zones. For example, group object 540 can receive an occupancy command or occupancy data (e.g., from logic objects 538) and can distribute the occupancy command or occupancy data to the various zone controllers connected to zone bus 430.

Logic objects 538 can interact with the collection of zones and the zoning system. Logic objects 538 can retrieve the zone list from group object 540 and perform logic on the collection. Each logic object 538 can have different functionality. For example, logic objects 538 can be configured to perform zone control (e.g. zoning system balancing, mode selection, shutdown determination, system mode determination, etc.), reset control (e.g., discharge air temperature setpoint reset, duct pressure setpoint reset, etc.), occupancy determination, data processing (e.g., data tagging, outlier detection, etc.), fault detection, or other logic-based functions.

In some embodiments, logic objects 538 are configured to perform weighted voting for the zones listed by group object 540. Different building zones can have different conditions (e.g., different air temperatures, different setpoints, etc.) and therefore may require different control actions to be performed. For example, one building zone may require heating, whereas another building zone may require cooling. If multiple building zones are served by a single RTU, zone coordinator 402 can determine whether the RTU should operate in a heating mode (e.g., providing warm air) or a cooling mode (e.g., providing chilled air) to serve the connected building zones. Zone coordinator 402 can determine which control action to provide based on votes provided by each zone controller.

Each zone's vote can have an associated weight (e.g., from zero to three) that reflects the zone's importance. For example if a zone has a weight of three, it can vote three times, whereas a zone with a weight of one can only vote one time. A weight of zero may indicate that the zone does not vote. Zone controller equipment model 580 can include the weight associated with the zone controlled by zone controller 506. Other zone controller equipment models stored within zone coordinator 402 can include weights for other zones managed by zone coordinator 402 (e.g., if multiple zone controllers are connected to zone bus 430). A user can modify the zone weights through system manager 302. Zone coordinator 402 can use the weights and the votes provided by each zone controller to determine how to best operate the RTU that serves the building zones.

Automatic Equipment Discovery and Equipment Model Distribution

Figure 6:
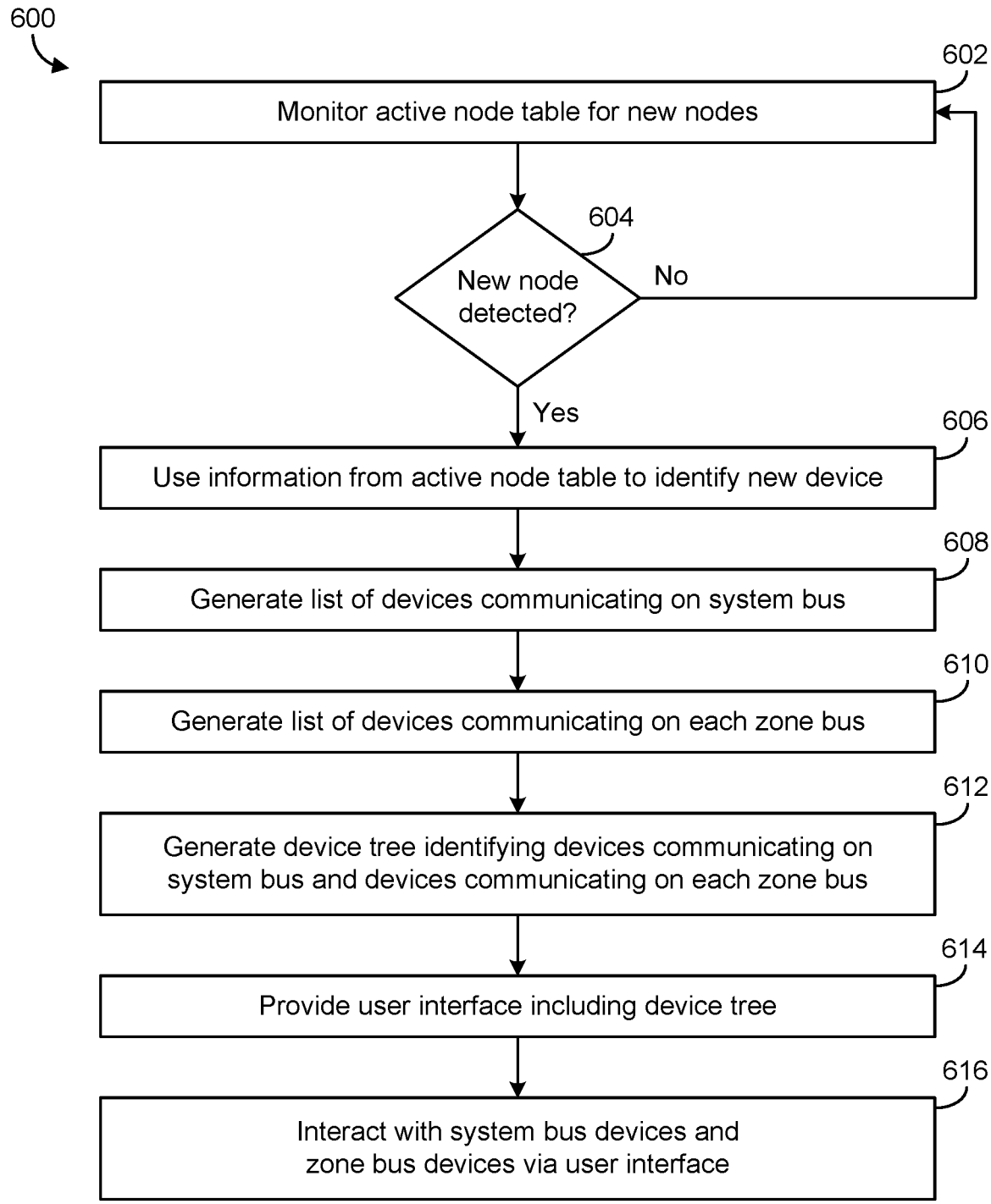
FIG. 6 is a flow diagram illustrating a technique which can be used by the BMS of FIGS. 2A-2B to automatically discover and interact with BMS equipment, according to some embodiments.

Referring now to FIG. 6, a flowchart of a process 600 for automatically discovering and interacting with equipment in a building management system is shown, according to an exemplary embodiment. Process 600 can be performed by one or more components of BMS 300. In some embodiments, process 600 is be performed by system manager 302 and/or zone coordinator 402 as described with reference to FIGS. 3-5. Process 600 can be used to automatically discover devices communicating on system bus 354, any of zone busses 356-360 and 364, and/or SA bus 366. Once the devices have been discovered, process 600 can be used to generate a user interface (e.g., a web interface) which provides information about the devices and allows a user to monitor and control the devices.

Process 600 is shown to include monitoring an active node table for new nodes (step 602). In some embodiments, step 602 is performed by system manager 302. For example, system manager 302 can monitor active node table 414 for new nodes. Each node in active node table 414 can represent a device communicating on system bus 354. In some embodiments, system manager 302 monitors active node table 414 for new nodes by subscribing to a change of value (COV) of a change counter attribute for active node table 414. Each time a change to active node table 414 occurs (e.g., a new device begins communicating on system bus 354), the change counter attribute can be incremented by system bus datalink 412. When the change counter attribute is incremented, system bus datalink 412 can report the COV to device list generator 428.

In some embodiments, step 602 is performed by zone coordinator 402. For example, zone coordinator 402 can monitor active node table 512 for new nodes. Each node in active node table 512 can represent a device communicating on zone bus 430. In some embodiments, zone coordinator 402 monitors active node table 512 for new nodes by subscribing to COV of a change counter attribute for active node table 512. Each time a change to active node table 512 occurs (e.g., a new device begins communicating on zone bus 430), the change counter attribute can be incremented by zone bus datalink 510. When the change counter attribute is incremented, zone bus datalink 510 can report the COV to detector object 522.

In some embodiments, step 602 is performed by a zone controller (e.g., zone controller 506). For example, zone controller 506 can monitor an active node table within a SA bus datalink for new nodes. The SA bus datalink can be used by zone controller 506 to communicate on a SA bus (e.g., SA bus 366). Each node in the active node table for the SA bus datalink can represent a device communicating on the SA bus. In some embodiments, zone controller 506 monitors the active node table for new nodes by subscribing to COV of a change counter attribute for the active node table. Each time a change to the active node table occurs (e.g., a new device begins communicating on the SA bus), the change counter attribute can be incremented by the SA bus datalink. When the change counter attribute is incremented, the SA bus datalink can report the COV to zone controller 506.

In some embodiments, system manager 302 monitors the active node table 414 within system bus datalink 412 for new nodes. However, system manager 302 can also monitor the active node table 512 within zone bus datalink 510 and/or the active node table within the SA bus datalink for new nodes. For example, zone bus datalink 510 can send COV notifications to system manager 302 when a change to active node table 512 occurs. Similarly, zone controller 506 can send COV notifications to system manager 302 when a change to the active node table for the SA bus occurs. In this way, system manager 302 can monitor not only the active node table 414 within system bus datalink 412, but also the active node tables within zone bus datalink 510 and the SA bus datalink.

Still referring to FIG. 6, process 600 is shown to include determining whether a new node is detected (step 604). In some embodiments, step 604 is performed by system manager 302. For example, device list generator 428 can read active node table 414 in response to receiving a COV notification indicating that active node table 414 has been updated. Device list generator 428 can compare the data from active node table 414 to a previous (e.g., cached)

version of active node table 414 to determine whether any new nodes have been added. If a new node has been added to active node table 414, device list generator 428 can determine that a new node is detected (i.e., the result of step 604 is "yes") and process 600 can proceed to step 606. If a new node has not been added, process 600 can return to step 602.

In some embodiments, step 604 is performed by zone coordinator 402. For example, detector object 522 can read active node table 512 in response to receiving a COV notification indicating that active node table 512 has been updated. Detector object 522 can compare the data from active node table 512 to a previous (e.g., cached) version of active node table 512 to determine whether any new nodes have been added. If a new node has been added to active node table 512, detector object 522 can determine that a new node is detected (i.e., the result of step 604 is "yes") and process 600 can proceed to step 606. If a new node has not been added, process 600 can return to step 602.

In some embodiments, step 604 is performed by zone controller 506. For example, zone controller 506 can read the active node table for the SA bus in response to receiving a COV notification indicating that the active node table for the SA bus has been updated. Zone controller 506 can compare the data from the active node table to a previous (e.g., cached) version of the active node table to determine whether any new nodes have been added. If a new node has been added to the active node table for the SA bus, zone controller 506 can determine that a new node is detected (i.e., the result of step 604 is "yes") and process 600 can proceed to step 606. If a new node has not been added, process 600 can return to step 602.

Still referring to FIG. 6, process 600 is shown to include using information from the active node table to identify the new device (step 606). In some embodiments, step 606 is performed by system manager 302. For example, device list generator 428 can use address information (e.g., MAC addresses, network addresses, etc.) from active node table 414 to send a request for information to a new system bus device. The request can include a request for an equipment model stored within the new system bus device and/or a request for point values provided by the new system bus device (e.g., a get device tree request). In response to the request, the new system bus device may provide information that can be used to identify the device (e.g., device type, model number, types of data points, etc.). System manager 302 can identify the new system bus device based on such information.

In some embodiments, step 606 is performed by zone coordinator 402. For example, detector object 522 can use address information (e.g., MAC addresses, network addresses, etc.) from active node table 512 to send a request for information to a new zone bus device. The request can include a request for an equipment model stored within the new zone bus device and/or a request for point values provided by the new zone bus device (e.g., a get device tree request). In response to the request, the new zone bus device may provide information that can be used to identify the device (e.g., device type, model number, types of data points, etc.). Zone coordinator 402 can identify the new zone bus device based on such information.

In some embodiments, step 606 is performed by zone controller 506. For example, zone controller 506 can use address information (e.g., MAC addresses, network addresses, etc.) from the active node table for the SA bus to send a request for information to a new SA bus device. The request can include a request for an equipment model stored within the new SA bus device and/or a request for point values provided by the new SA bus device (e.g., a get device tree request). In response to the request, the new SA bus device may provide information that can be used to identify the device (e.g., device type, model number, types of data points, etc.). Zone controller 506 can identify the new SA bus device based on such information.

Still referring to FIG. 6, process 600 is shown to include generating a list of devices communicating on the system bus (step 608) and generating a list of devices communicating on each zone bus (step 610). Step 608 can be performed by device list generator 428 using information obtained from active node table 414 and/or information received from identified system bus devices. Similarly, step 610 can be performed by each zone coordinator 402 using information obtained from active node table 512 and/or information received from identified zone bus devices. In some embodiments, step 610 includes providing the lists of zone bus devices from each zone coordinator 402 to system manager 302.

Process 600 is shown to include generating a device identifying devices communicating on the system bus and devices communicating on each zone bus (step 612). In some embodiments, step 612 is performed by system manager 302. For example, system manager 302 can use the lists of zone bus devices from each zone coordinator 402 to construct the device tree. The device tree can be a hierarchy of devices in BMS 300. For example, the list of system bus devices can be updated to include the list of field devices associated with each zone coordinator hierarchically below the associated zone coordinator in the system bus device list. In this way, the combined list of devices (i.e., the device tree) can include hierarchical information with system bus devices at a first level of the hierarchy and zone bus devices at a lower level of the hierarchy (e.g., hierarchically below the corresponding zone coordinator in the list of system bus devices).

Process 600 is shown to include providing a user interface including the device tree (step 614). In some embodiments, step 614 is performed by web server 416 and/or user interface client 418 of system manager 302. For example, web server 416 can use the device tree generated in step 612 to build a web interface. In some embodiments, web server 416 uses a view definition for each device in the device list to determine which attributes of the devices to include in the web interface. In some embodiments, web server 416 generates a home page for each type of equipment based on a home page view definition for the equipment type. The home page view definition can be stored in system manager 302 (e.g., in view definition storage). Other view definitions can be stored in system manager 302 or received from other devices at runtime.

Process 600 is shown to include interacting with the system bus devices and the zone bus devices via the user interface (step 616). Step 616 can include accessing the equipment models for the system bus devices and the zone bus devices to obtain data values for display in the user interface. In some embodiments, step 616 includes receiving input from a user via the user interface. The user input can change an attribute of a device (e.g., device name, setpoint, device type, etc.) presented in the user interface. System manager 302 can use the updated value of the device attribute to update the value in the equipment model for the device and/or to provide a control signal to the device. In some embodiments, step 616 includes providing the updated value to zone coordinator 402 and/or zone controller 506

(e.g., if the equipment model for the device is stored in zone coordinator 402 or zone controller 506).

Figure 7:
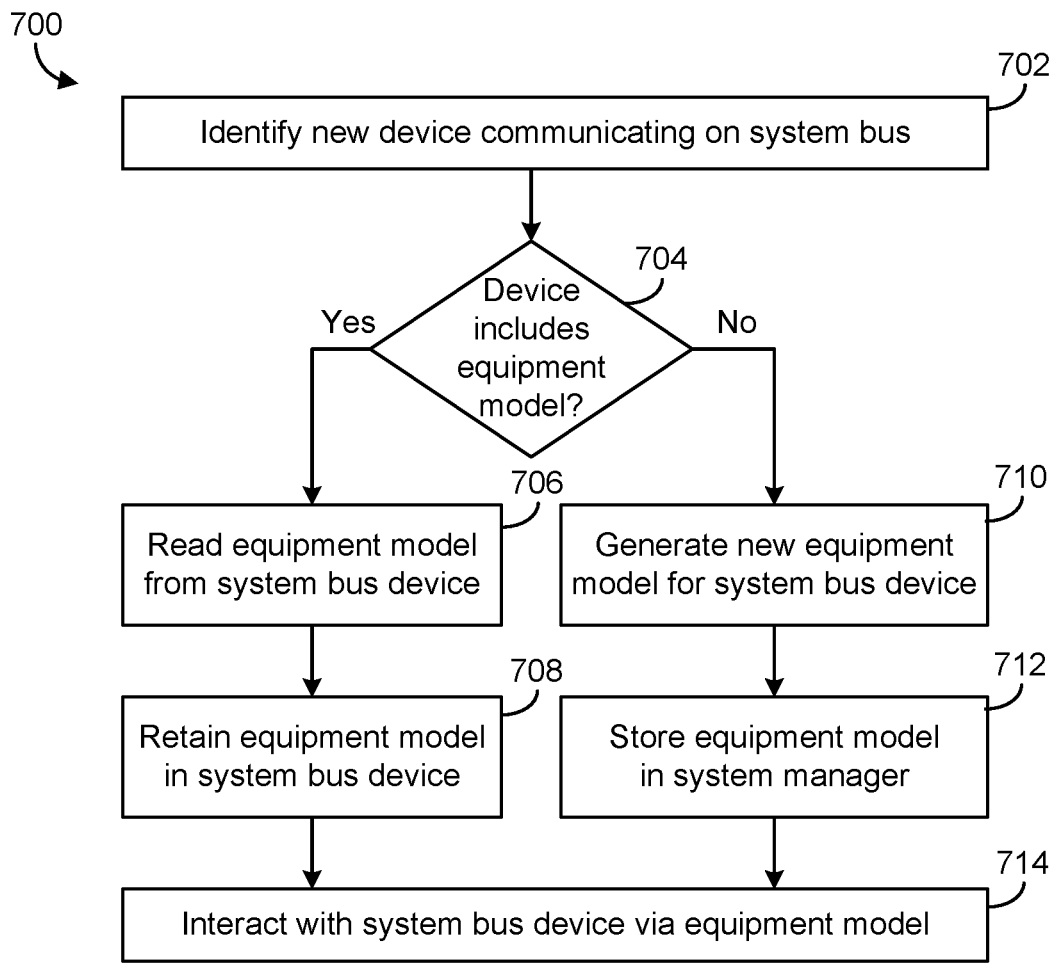
FIG. 7 is a flow diagram illustrating a technique which can be used by the BMS of FIGS. 2A-2B to create and use equipment models for system bus devices, according to some embodiments.

Referring now to FIG. 7, a flowchart of a process 700 for automatically creating and using equipment models for system bus devices is shown, according to an exemplary embodiment. Process 700 can be performed by one or more components of system manager 302, as described with reference to FIGS. 3-4. In some embodiments, process 700 is performed by system manager 302 when a new system device is detected.

Process 700 is shown to include identifying a new device communicating on the system bus (step 702). Step 702 can be the same or similar to step 606 of process 600. For example, step 702 can include using address information (e.g., MAC addresses, network addresses, etc.) from active node table 414 to send a request for information to a new system bus device. The request can include a request for an equipment model stored within the new system bus device and/or a request for point values provided by the new system bus device (e.g., a get device tree request). In response to the request, the new system bus device may provide information that can be used to identify the device (e.g., device type, model number, types of data points, etc.). System manager 302 can identify the new system bus device based on such information.

Process 700 is shown to include determining whether the new system bus device includes an equipment model (step 704). Some devices in BMS 300 present themselves to system manager 302 using equipment models. An equipment model can define equipment object attributes, view definitions, schedules, trends, and the associated BACnet value objects (e.g., analog value, binary value, multistate value, etc.) that are used for integration with other systems. Some system bus devices store their own equipment models (e.g., zone coordinators 306-310 and 318, CVRTU 312, thermostat controller 316). Other devices in BMS 300 do not store their own equipment models (e.g., IOM 314, third party controller 320, etc.). Step 704 can include sending a request for an equipment model to the new system bus device or reading a list of point values provided by the new system bus device. If the new system bus device includes an equipment model, the system bus device may present an equipment model to system manager 302 in response to the request.

If the system bus device includes an equipment model (i.e., the result of step 704 is "yes"), system manager 302 can read the equipment model from the system bus device (step 706). Since the equipment model is already stored within the system bus device, the equipment model can be retained within the system bus device (step 708). However, if the system bus device does not include an equipment model (i.e., the result of step 704 is "no"), system manager 302 can automatically generate a new equipment model for the system bus device (step 710). In some embodiments, system manager 302 retrieves a list of point values provided by the device and uses the list of point values to create a new equipment model for the device. The new equipment model can be stored within system manager 302 (step 712).

Process 700 is shown to include interacting with the system bus device via the equipment model (step 714). Step 714 can include reading data values from the equipment model and writing data values to the equipment model. If the equipment model is stored in the system bus device, step 714 can include interacting directly with the system bus device. However, if the equipment model is stored in system manager 302, step 714 can include interacting with system manager 302. System manager 302 can then interact with the system bus device. System manager 302 can provide a user interface for any system bus device using the equipment models stored within the system bus devices and/or the equipment models created by system manager 302. In some embodiments, system manager 302 stores a view definition for each type of equipment connected via system bus 354 and uses the stored view definition to generate a user interface for the equipment.

Figure 8:
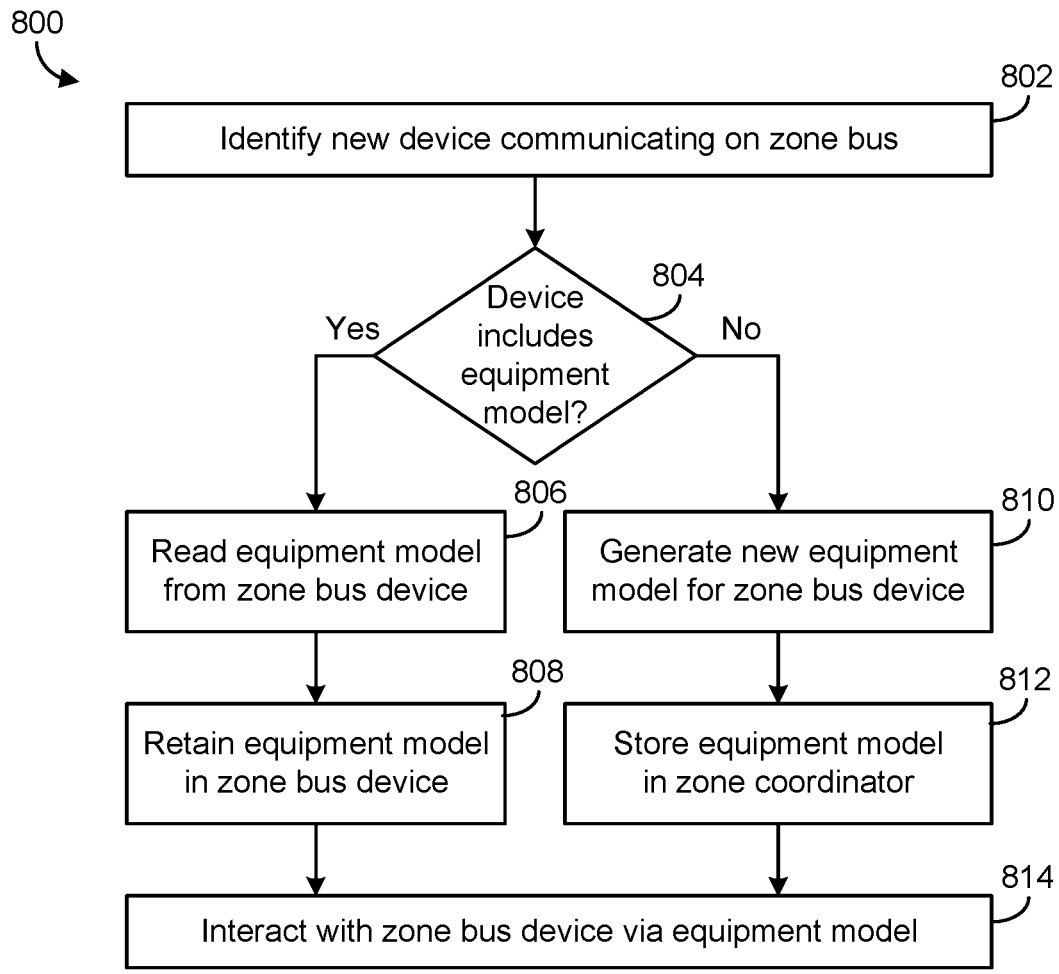
FIG. 8 is a flow diagram illustrating a technique which can be used by the BMS of FIGS. 2A-2B to create and use equipment models for zone bus devices, according to some embodiments.

Referring now to FIG. 8, a flowchart of a process 800 for automatically creating and using equipment models for zone bus devices is shown, according to an exemplary embodiment. Process 800 can be performed by one or more components of zone coordinator 402, as described with reference to FIGS. 3-5. In some embodiments, process 800 is performed by zone coordinator 402 when a new zone bus device is detected.

Process 800 is shown to include identifying a new device communicating on the zone bus (step 802). Step 802 can be the same or similar to step 606 of process 600. For example, step 802 can include using address information (e.g., MAC addresses, network addresses, etc.) from active node table 512 to send a request for information to a new zone bus device. The request can include a request for an equipment model stored within the new zone bus device and/or a request for point values provided by the new zone bus device (e.g., a get device tree request). In response to the request, the new zone bus device may provide information that can be used to identify the device (e.g., device type, model number, types of data points, etc.). Zone coordinator 402 can identify the new zone bus device based on such information.

Process 800 is shown to include determining whether the new zone bus device includes an equipment model (step 804). Some devices in BMS 300 present themselves to zone coordinator 402 using equipment models. An equipment model can define equipment object attributes, view definitions, schedules, trends, and the associated BACnet value objects (e.g., analog value, binary value, multistate value, etc.) that are used for integration with other systems. Some zone bus devices store their own equipment models (e.g., supported RTUs). Other zone bus devices do not store their own equipment models (e.g., bypass damper 504, zone controller 506). Step 804 can include sending a request for an equipment model to the new zone bus device or reading a list of point values provided by the new zone bus device. If the new zone bus device includes an equipment model, the zone bus device may present an equipment model to zone coordinator 402 in response to the request.

If the zone bus device includes an equipment model (i.e., the result of step 804 is "yes"), zone coordinator 402 can read the equipment model from the zone bus device (step 806). Since the equipment model is already stored within the zone bus device, the equipment model can be retained within the zone bus device (step 808). However, if the zone bus device does not include an equipment model (i.e., the result of step 804 is "no"), zone coordinator 402 can automatically generate a new equipment model for the zone bus device (step 810). In some embodiments, zone coordinator 402 retrieves a list of point values provided by the device and uses the list of point values to create a new equipment model for the device. The new equipment model can be stored within zone coordinator 402 (step 812).

Process 800 is shown to include interacting with the zone bus device via the equipment model (step 814). Step 814 can include reading data values from the equipment model and writing data values to the equipment model. If the equipment model is stored in the zone bus device, step 814 can include interacting directly with the zone bus device. For example, system manager 302 can communicate directly with a zone bus device that stores its own equipment model. However, if the equipment model is stored in zone coordinator 402, step 814 can include interacting with zone coordinator 402. Zone coordinator 402 can then interact with the zone bus device.

Building Management System with Cloud-Based Monitoring and Control

Figure 9:
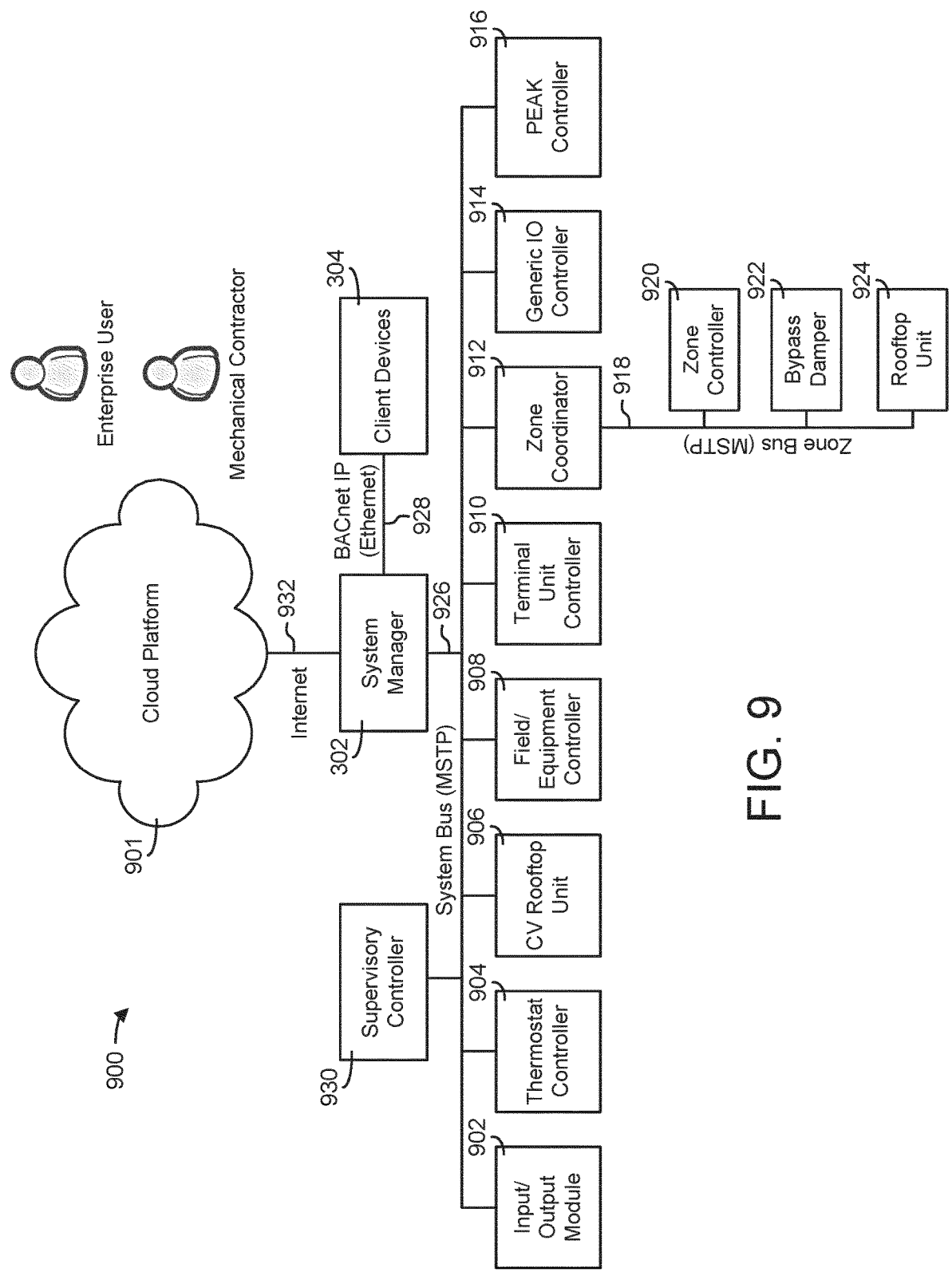
FIG. 9 is a block diagram of another BMS including a system manager and a cloud platform, according to some embodiments.

Referring now to FIG. 9, a block diagram of another building management system (BMS) 900 is shown, according to an exemplary embodiment. BMS 900 may include some or all of the features of BMS 300, as described with reference to FIGS. 2A-8. For example, BMS 900 is shown to include system manager 302 (i.e., a smart building hub), a zone coordinator 912, and a zone controller 920. System manager 302 can communicate with client devices 304 (e.g., user devices, desktop computers, laptop computers, mobile devices, etc.) via a data communications link 928 (e.g., BACnet IP, Ethernet, wired or wireless communications, etc.). System manager 302 can provide a user interface to client devices 304 via data communications link 928. The user interface may allow users to monitor and/or control BMS 900 via client devices 304.

In some embodiments, system manager 302 is connected with zone coordinator 912 via a system bus 926. System bus 926 can include any of a variety of communications hardware (e.g., wire, optical fiber, terminals, etc.) configured to facilitate communications between system manager 302 and other devices connected to system bus 926. Throughout this disclosure, the devices connected to system bus 926 are referred to as system bus devices. System manager 302 can be configured to communicate with zone coordinator 912 via system bus 926 using a master-slave token passing (MSTP) protocol or any other communications protocol. System bus 926 can also connect system manager 302 with other devices such as an input/output module (IOM) 902, a thermostat controller 904 (e.g., a TEC3000 series thermostat controller), a constant volume (CV) rooftop unit (RTU) 906, a field and equipment controller (FAC) 908, a terminal unit controller 910, a generic 10 controller 914, and a PEAK controller 916. RTU 906 can be configured to communicate directly with system manager 302 and can be connected directly to system bus 926. Other RTUs can communicate with system manager 302 via an intermediate device. For example, a zone bus 918 can connect RTU 924 to zone coordinator 912, which connects to system bus 926.

Zone coordinator 912 can be connected with zone controller 920 via zone bus 918. Zone bus 918 can include any of a variety of communications hardware (e.g., wire, optical fiber, terminals, etc.) configured to facilitate communications between a zone coordinator and other devices connected to the corresponding zone bus. Throughout this disclosure, the devices connected to zone bus 918 are referred to as zone bus devices. Zone coordinator 912 can communicate with zone controller 920 via zone bus 918 using a MSTP protocol or any other communications protocol. Zone bus 918 can also connect zone coordinator 912 with other types of devices such a bypass damper 922 and a rooftop unit 924. Zone coordinator 912 can include some or all of the features or functionality of the zone coordinators previously described with reference to FIGS. 2A-8 (e.g., zone coordinators 306-310, 318, and 402).

Still referring to FIG. 9, system manager 302 can be configured to communicate with a cloud platform 901 via an Internet communications link 932. As previously described, system manager 302 can be configured to automatically discover equipment in BMS 900 and automatically generate or obtain equipment models for the discovered equipment. System manager 302 can include various features (e.g., interlock, schedule sync, etc.) that use hard-coded references to known equipment models. System manager 302 can also be configured to gather more data from the equipment (e.g., equipment model templates), and to use the equipment model templates to drive features of system manager 302 features (instead of hard-coding references). These enhancements provide support for PEAK controllers with varying applications and other new equipment (e.g., a refrigeration controller). System manager 302 can be configured to send equipment data to cloud platform 901 for use by cloud applications.

Cloud platform 901 can include a variety of cloud-based services and/or applications configured to store, process, analyze, or otherwise consume the data collected from system manager 302. Cloud platform 901 may be accessed by various users (e.g., enterprise users, mechanical contractors, cloud application users, etc.). Some users can access and interact with system manager 302 directly via client devices 304 (e.g., via a UI provided by system manager 302), whereas other users can interact with cloud platform 901 (e.g., via a UI provided by cloud platform 901). The features of cloud platform 901 and system manager 302 are described in greater detail below.

Infrastructure Components

Figure 10:
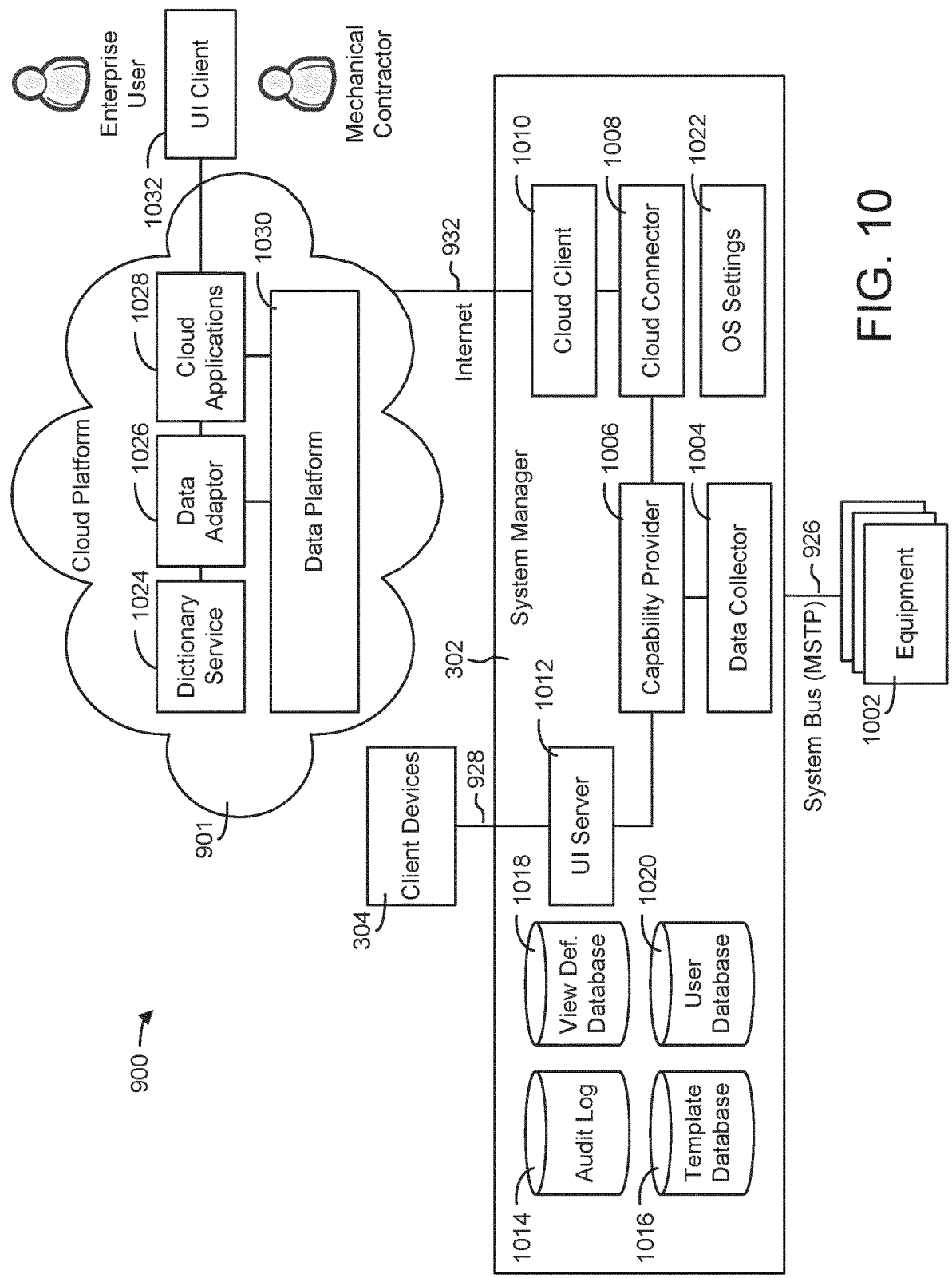
FIG. 10 is a block diagram illustrating select components of the system manager and cloud platform of FIG. 9 in greater detail, according to some embodiments.

Referring now to FIG. 10, a block diagram illustrating select components of system manager 302 and cloud platform 901 in greater detail is shown, according to an exemplary embodiment. System manager 302 is shown to include a data collector 1004, a capability provider 1006, a cloud connector 1008, a cloud client 1010, a UI server 1012, several databases (e.g., audit log 1014, template database 1016, view definition database 1018, and user database 1020), and operating system (OS) settings 1022. In some embodiments, these components of system manager 302 are components of processing circuit 406, as described with reference to FIG. 4. For example, databases 1014-1020 and OS settings 1022 can be stored in memory 410. Similarly, data collector 1004, capability provider 1006, cloud connector 1008, cloud client 1010, and UI server 1012 can be functional modules stored in memory 410 and executable by processor 408 to accomplish the functions of each module.

Data collector 1004 can be configured to perform the equipment detection and data gathering operations described with reference to FIGS. 2A-8. For example, data collector 1004 can be configured to identify equipment 1002 in BMS 900 and generate or obtain equipment models for equipment 1002. Data collector 1004 can also discover data points provided by equipment 1002 and obtain values for the data points from equipment 1002. Data collector 1004 can provide the collected data to capability provider 1006 for use in presenting the data to a user (e.g., via UI server 1012) or pushing the data to cloud platform 901 (e.g., via cloud connector 1008 and cloud client 1010).

Capability provider 1006 can be configured to function as a feature server for system manager 302. Capability provider 1006 can be connected to data collector 1004, cloud connector 1008, and UI server 1012 and can process the inputs and outputs of system manager 302 (e.g., both device- and user-oriented). Capability provider 1006 can interact with cloud platform 901 to serve various features of cloud platform 901 to system manager 302. Features of cloud platform 901 served by capability provider 1006 can include, for example, time series, alarms, schedules, write property, data model, system settings, and software update. Other features of cloud platform 901 served by capability provider 1006 may include interlock, data share, audit, and fault detection and diagnostics (FDD). The features and functionality of cloud platform 901 are described in greater detail below.

Cloud connector 1008 can be configured to interact with both capability provider 1006 and cloud client 1010. Cloud connector 1008 can translate system manager concepts (e.g., Verasys concepts) into cloud concepts to allow system manager 302 to communicate with cloud platform 901. Cloud connector 1008 can also translate cloud concepts into system manager concepts to allow data from cloud platform 901 to be received and processed by system manager 302.

Cloud client 1010 can be configured to interact with cloud platform 901. In some embodiments, cloud client 1010 includes a library that encapsulates an internet-of-things (IoT) hub SDK with a data platform wrapper. Cloud client 1010 can be configured to understand the endpoints, APIs, and other services provided by data platform 1030 and can be configured to communicate with data platform 1030. In some embodiments, cloud client 1010 is configured to exchange messages with data platform 1030 using the native messaging format of data platform 1030 (e.g., JSON).

Data Model

Figure 11:
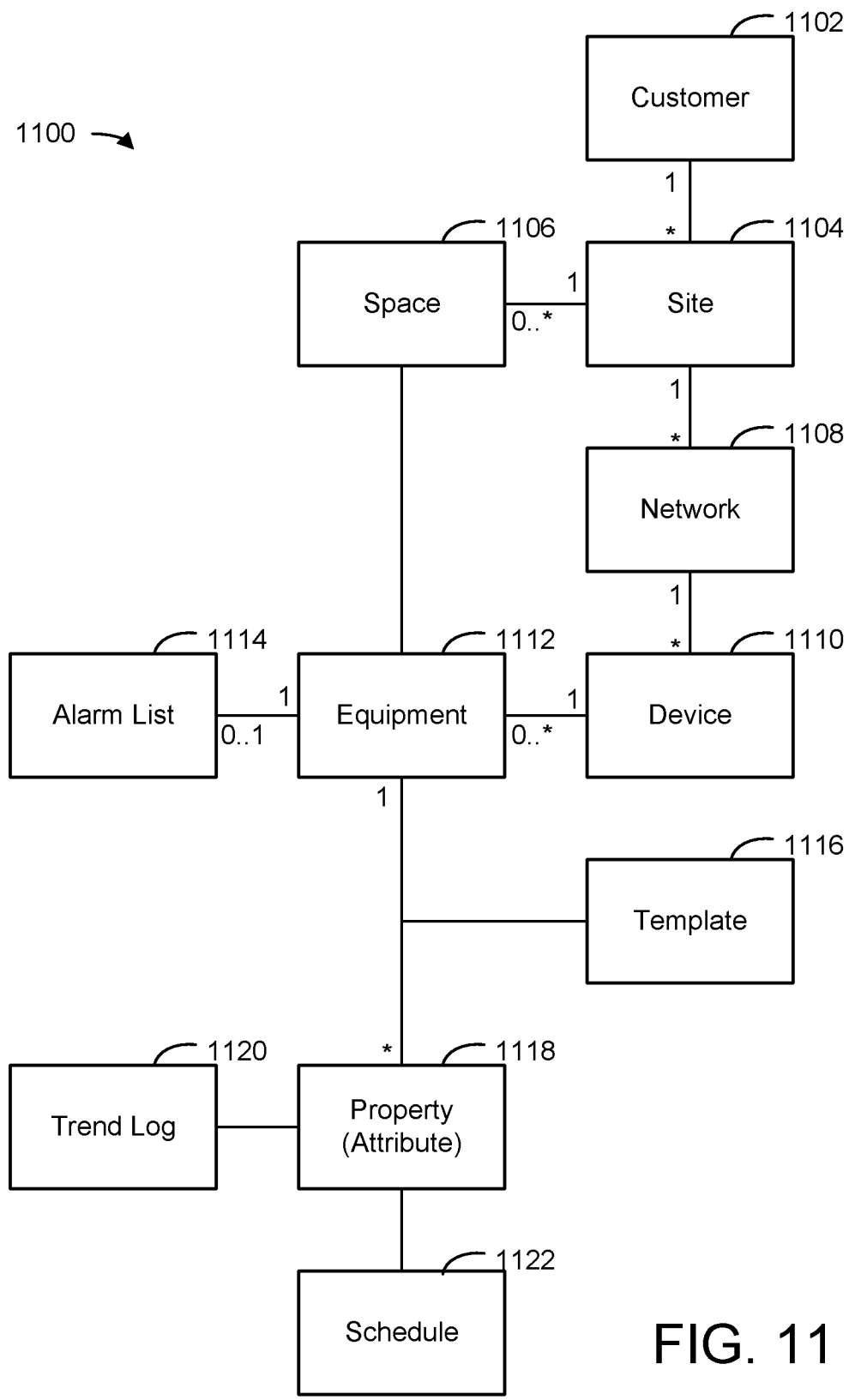
FIG. 11 is a block diagram of a data model which can be used by the system manager of FIG. 9, according to some embodiments.

Referring now to FIG. 11, a block diagram of a data model 1100 which can be used by system manager 302 is shown, according to an exemplary embodiment. Data model 1100 can be used by various components of system manager 302 to report data to cloud platform 901. Data model 1100 defines the relationships between various entities in BMS 900. For example, data model 1100 may define a customer 1102 (e.g., ABC Corporation), a site 1104 (e.g., Milwaukee Facility), a space 1106 (e.g. Conference Room A), a network 1108 (e.g., system bus), a device 1110 (e.g., UCB, SC-Equip), equipment 1112 (e.g., RTU, zone coordinator, zone controller, thermostat controller), an alarm list 1114, a template 1116, a property 1118 (e.g., an attribute or data point), a trend log 1120 for the property 1118, and a schedule 1122 for the property 1118.

Each customer 1102 may be associated with one or more sites 1104. This is denoted in data model 1100 by the "1" and "*" symbols on the connection between customer 1102 and site 1104. The "1" symbol denotes a single customer 1102 and the "*" symbol denotes one or more sites 1104. Similarly, each site 1104 can be associated with one or more networks 1108, and each network 1108 can be associated with one or more device 1110. Each device 1110 can be associated with zero or more equipment 1112, as denoted by the symbols "1" and "0..*" on the connection between device 1110 and equipment 1112. Similarly, each equipment 1112 can be associated with zero or more alarm lists 1114. Each equipment 1112 can also be associated with one or more properties 1118 (e.g., data points or attributes) and a template 1116 for that equipment. Template 1116 may define a list of all the possible properties 1118 for the given equipment 1112. Each property 1118 can be associated with a trend log 1120 and a schedule 1122 for that property 1118.

In some embodiments, data model 1100 identifies data using a URL that includes a fully qualified reference (FQR) and an attribute ID (e.g., URL=FQR:AttrID). In some embodiments, the attribute ID is only needed when property 1118 needs to be specified. For example, system manager 302 may report or use only the FQR portion of the URL when reporting alarms to cloud platform 901 since each alarm 1114 is associated with equipment 1112 in general and not a specific property 1118 of that equipment 1112. However, system manager 302 may use both the FQR and the attribute ID when reporting timeseries data values to cloud platform 901 since each timeseries is fully defined by both a FQR and the property 1118 (e.g., data point) being reported.

Reported Network Tree and Equipment Model Templates

Figure 12:
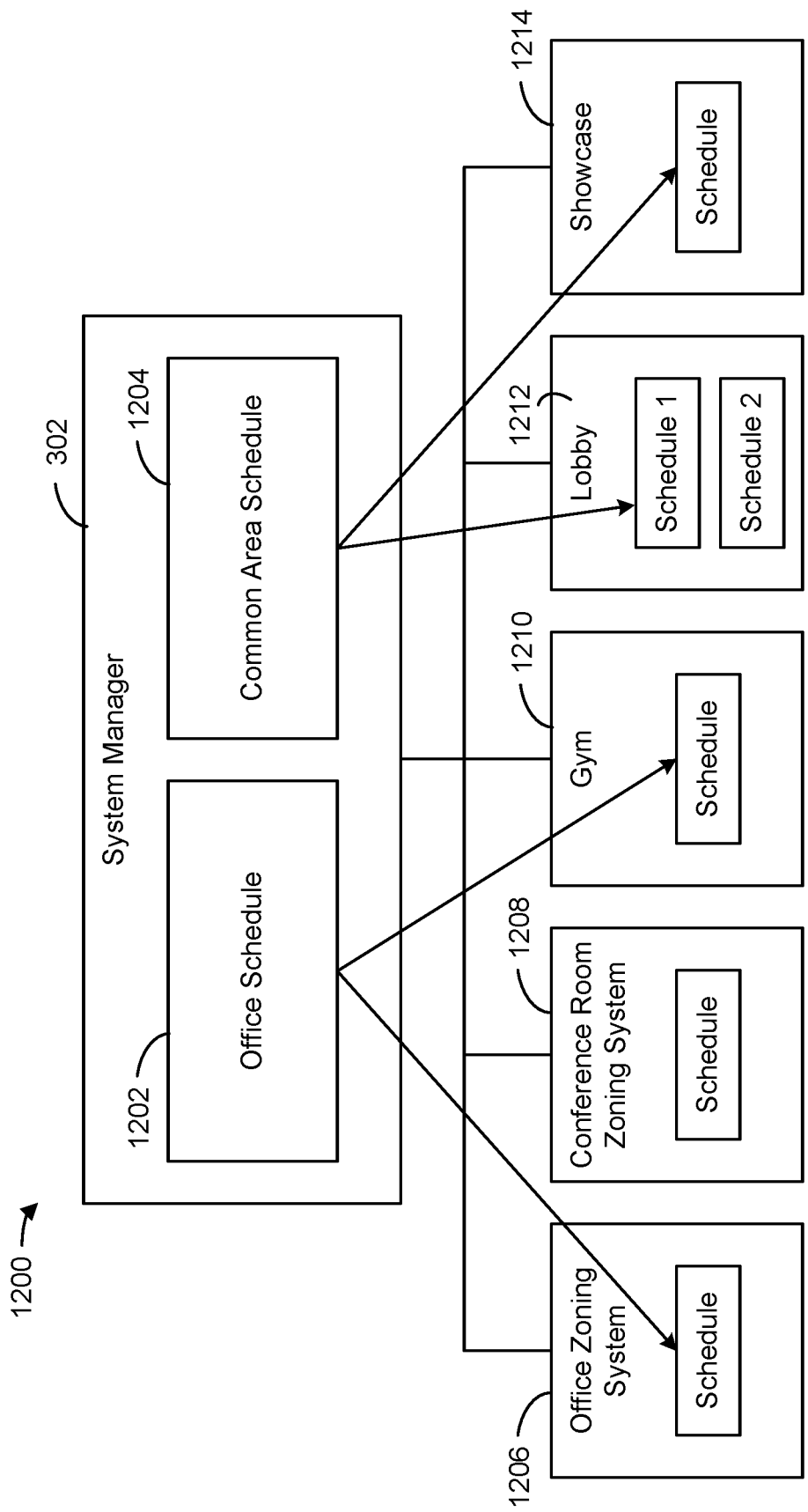
FIG. 12 is a block diagram illustrating an example of a reported network tree which can be generated by the system manager of FIG. 9, according to some embodiments.

Referring now to FIG. 12, a block diagram illustrating an example of a reported network tree 1200 is shown, according to an exemplary embodiment. System manager 302 can be configured to generate and report a network tree to cloud platform 901. Reported network tree 1200 may list all of the equipment 1002 connected with system manager 302 either directly (e.g., via system bus 926) or indirectly (e.g., via zone coordinator 912 and zone bus 918). Reported network tree 1200 may also list the device that contains each of piece of equipment 1002. For example, a chiller device may contain a compressor, a fan, multiple sensors, and/or other items of equipment 1002. Reported network tree 1200 is shown to include an office zoning system 1206, a conference room zoning system 1208, a gym 1210, a lobby 1212, and a showcase 1214. Each of devices 1206-1214 may contain one or more pieces of equipment 1002, which may be identified by reported network tree 1200.

In some embodiments, system manager 302 reports network tree 1200 to cloud platform 901 in the form of a data object. An example of a data object representing a reported network tree is as follows:

```
Reported Network Tree {
    Schedules { [ Schedule (Name, FQR ID, Schedule Config Ref) ] }
    Networks {
        [ Network (FQR ID),
            [ Device (Name, FQR ID, Model),
                [ Equipment / Control System (Name, FQR ID, Template,
                Alarm Time Series ID),
                    [ Schedule (FQR ID, Schedule Config Ref ]
                ] ] ] }
}
``` where the schedule configuration can reference an equipment specific schedule (e.g., office schedule 1202) or a global schedule (e.g., common area schedule 1204). A detailed example of a reported network tree is provided in Appendix A.

System manager 302 may report network tree 1200 to cloud platform 901 along with a set of equipment model templates 1116 for the equipment 1002 identified in the reported network tree 1200. Each equipment model template 1116 may define a set of properties 1118 associated with a given piece of equipment 1002. An example of a equipment model template is provided in Appendix C. Accordingly, the full list of points under system manager 302 can be derived from the combination of the reported network tree and the equipment model templates 1116. In some embodiments, properties 1118 are not included in reported network tree 1200. Instead, properties 1118 are defined by the template 1116 for each piece of equipment 1112 identified in the reported network tree 1200.

Cloud Platform

Referring again to FIG. 10, cloud platform 901 is shown to include a dictionary service 1024, a data adaptor 1026, cloud applications 1028, and a data platform 1030. Dictionary service 1024 can be configured to store or retrieve dictionary data that defines various strings and values used by system manager 302 and/or cloud platform 901. For example, dictionary service 1024 can be configured to lookup text strings that correspond to enumerated values. Enumerated values can be included in status messages received from system manager 302 and may be specified as a combination of an enumerated set and an enumerated value. Dictionary service 1024 can use the set and value combination to retrieve a string message that corresponds to the set and value combination.

Data adaptor 1026 can be configured to receive and translate the incoming data messages provided by system manager 302. In some embodiments, data adaptor 1026 performs various data transformations and other functions specific to system manager 302. For example, data adaptor 1026 can be configured to create entities for data platform 1030 based on the reported network tree and equipment model templates provided by system manager 302. Data adaptor 1026 can provide plug & play functionality for data platform 1030 by automatically determining which values need timeseries data. Data adaptor 1026 can automatically update the "shadow" for system manager 302 (described in greater detail below) to request values for these timeseries data. Data adaptor 1026 can translate between FQRs and entity identifiers. In some embodiments, data adaptor 1026 uses dictionary service 1024 to translate enumerated values into text strings.

Data adaptor 1026 can store the reported network tree sent by system manager 302. In some embodiments, data adaptor 1026 uses the reported network tree and equipment model templates provided by system manager 302 to extract system information, points, and create a device-system-point hierarchy. Data adaptor 1026 can store such data in cloud platform 901. Data adaptor 1026 can create reported points and get bound points for the connected systems and can update bound points in the device's shadow. Data adaptor 1026 can generate a point ID, system ID, timeseries ID, point FQR mapping for points, and system FQR mapping for systems and can store such data within cloud platform 901. Data adaptor 1026 can extract schedule information and create/update device-system-point-schedule information. Data adaptor 1026 can extract and store a system ID to alarm timeseries ID mapping.

In some embodiments, data adaptor 1026 is configured to store equipment model files received from system manager 302. If an equipment model for a new device is not found, data adaptor 1026 can request the equipment model from system manager 302 and store the received equipment model file. In some embodiments, data adaptor 1026 can manage the schedule configuration file per device in cloud platform 901. Data adaptor 1026 can store a backup file for system manager 302 so that system manager 302 can download the latest backup and restore in the event of data loss.

Cloud applications 1028 may include any of a variety of applications configured to use the data provided to cloud platform 901 by system manager 302. For example, cloud applications 1028 can include an energy management application, monitoring and reporting applications, an enterprise control application, or other cloud-based applications. In some embodiments, cloud applications 1028 exist as a separate layer of cloud platform 901 (i.e., separate from data platform 1030). This allows cloud applications 1028 to be isolated from the details of how the data from system manager 302 are collected. In other embodiments, cloud applications 1028 can exist as remote applications that run on remote systems or devices.

Cloud applications 1028 can use the data provided by system manager 302 to perform a variety data visualization, monitoring, and/or control activities. For example, cloud applications 1028 can include an energy management application and/or a monitoring and reporting application configured to generate user interfaces (e.g., charts, graphs, etc.) that present the data to a user. In some embodiments, the user interfaces present timeseries data at a variety of different levels of granularity (e.g., hourly, weekly, monthly, etc.) in a single chart or graph. For example, a dropdown selector can be provided to allow a user to select a particular level of granularity for a particular timeseries. Several examples of user interfaces that can be generated based on timeseries data are described in U.S. patent application Ser. No. 15/182,579 filed Jun. 14, 2016, and U.S. Provisional Patent Application No. 62/446,284 filed Jan. 13, 2017. The entire disclosures of both these patent applications are incorporated by reference herein.

In some embodiments, cloud applications 1028 include an enterprise control application configured to use the data provided by system manager 302 to perform various control activities. For example, the enterprise control application can use timeseries data as input to a control algorithm (e.g., a state-based algorithm, an extremum seeking control (ESC) algorithm, a proportional-integral (PI) control algorithm, a proportional-integral-derivative (PID) control algorithm, a model predictive control (MPC) algorithm, a feedback control algorithm, etc.) to generate control signals for system manager 302. In some embodiments, system manager 302 uses the control signals to operate building equipment 1002. Operating the building equipment can affect the measured or calculated values of the data samples provided by system manager 302. Accordingly, the enterprise control application can use the timeseries data as feedback to control the equipment of BMS 900.

Data platform 1030 can include a variety of services (e.g., APIs) configured to process, store, analyze, and perform other operations on the data provided by system manager 302. For example, data platform 1030 can include an identity management service, a security service, a timeseries service, an analytics service, a command and control service, a time synchronization service, an asset service, an entity service and/or other types of data platform services. Several examples of a data platform which can be used as data platform 1030 are described in detail in U.S. Provisional Patent Application No. 62/564,247 filed Sep. 27, 2017, U.S. Provisional Patent Application No. 62/457,654 filed Feb. 10, 2017, U.S. patent application Ser. No. 15/644,519 filed Jul. 7, 2017, U.S. patent application Ser. No. 15/644,560 filed Jul. 7, 2017, and U.S. patent application Ser. No. 15/644,581 filed Jul. 7, 2017. The entire disclosure of each of these patent applications is incorporated by reference herein.

Figure 13:
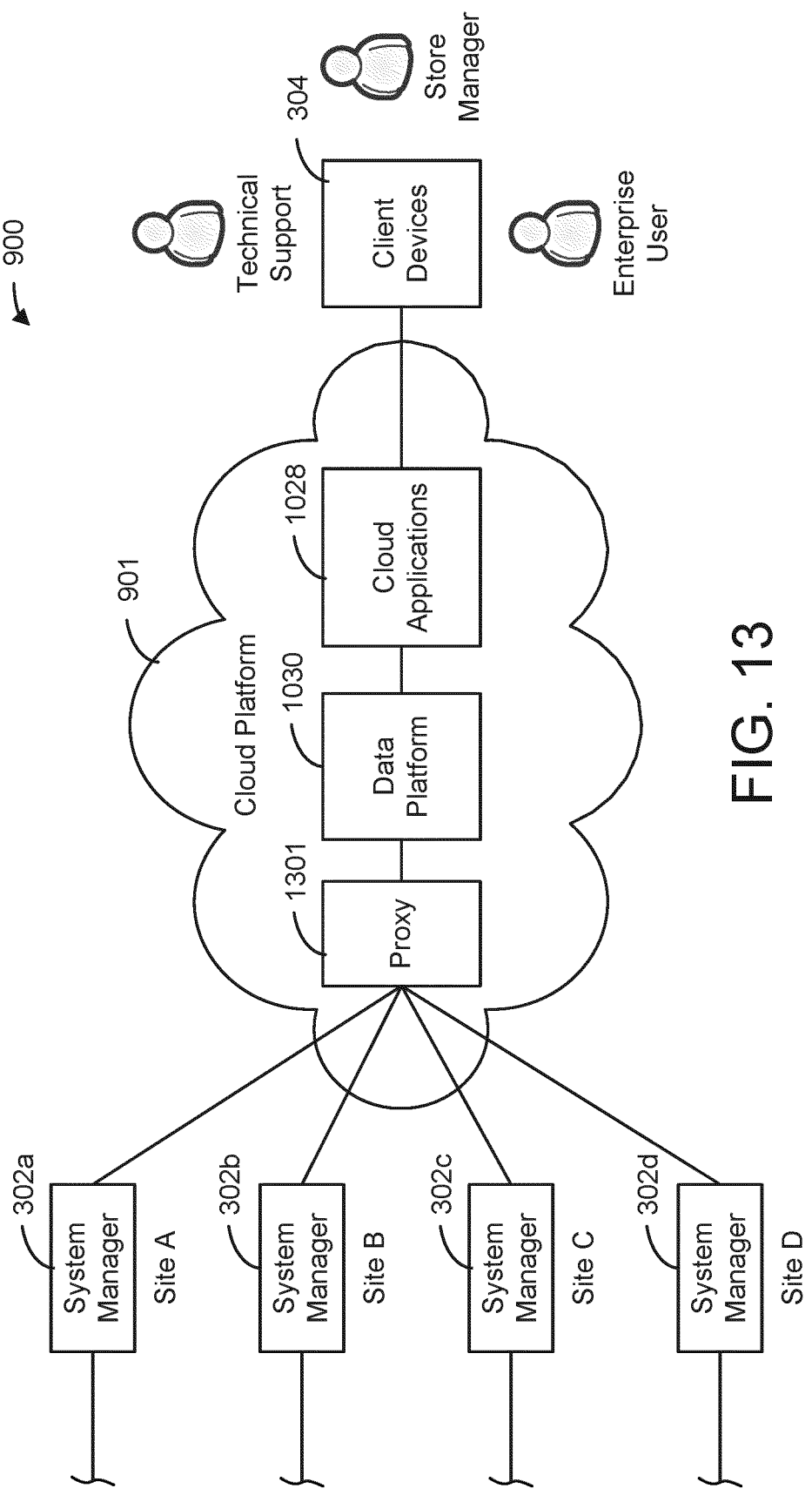
FIG. 13 is another block diagram illustrating a portion of the BMS of FIG. 9, according to some embodiments.

Referring now to FIG. 13, another block diagram illustrating BMS 900 is shown, according to an exemplary embodiment. As shown in FIG. 13, cloud platform 901 can communicate with multiple instances of system manager 302, each of which is installed at a different building site. For example, cloud platform 901 is shown receiving data from a system manager 302*a* installed at building site A, system manager 302*b* installed at building site B, system manager 302*c* installed at building site C, and system manager 302*d* installed at building site D. Each of system managers 302*a-d* may be an instance of system manager 302. In some embodiments, system manager 302 exchanges data with cloud platform 901 in a JSON format, whereas communications between cloud platform 901 and client devices 304 may use the HTTP(s) protocol. In some embodiments, cloud platform 901 includes a proxy 1301 which relays communications between system manager 302 and data platform 1030.

Data Platform

Figure 14:
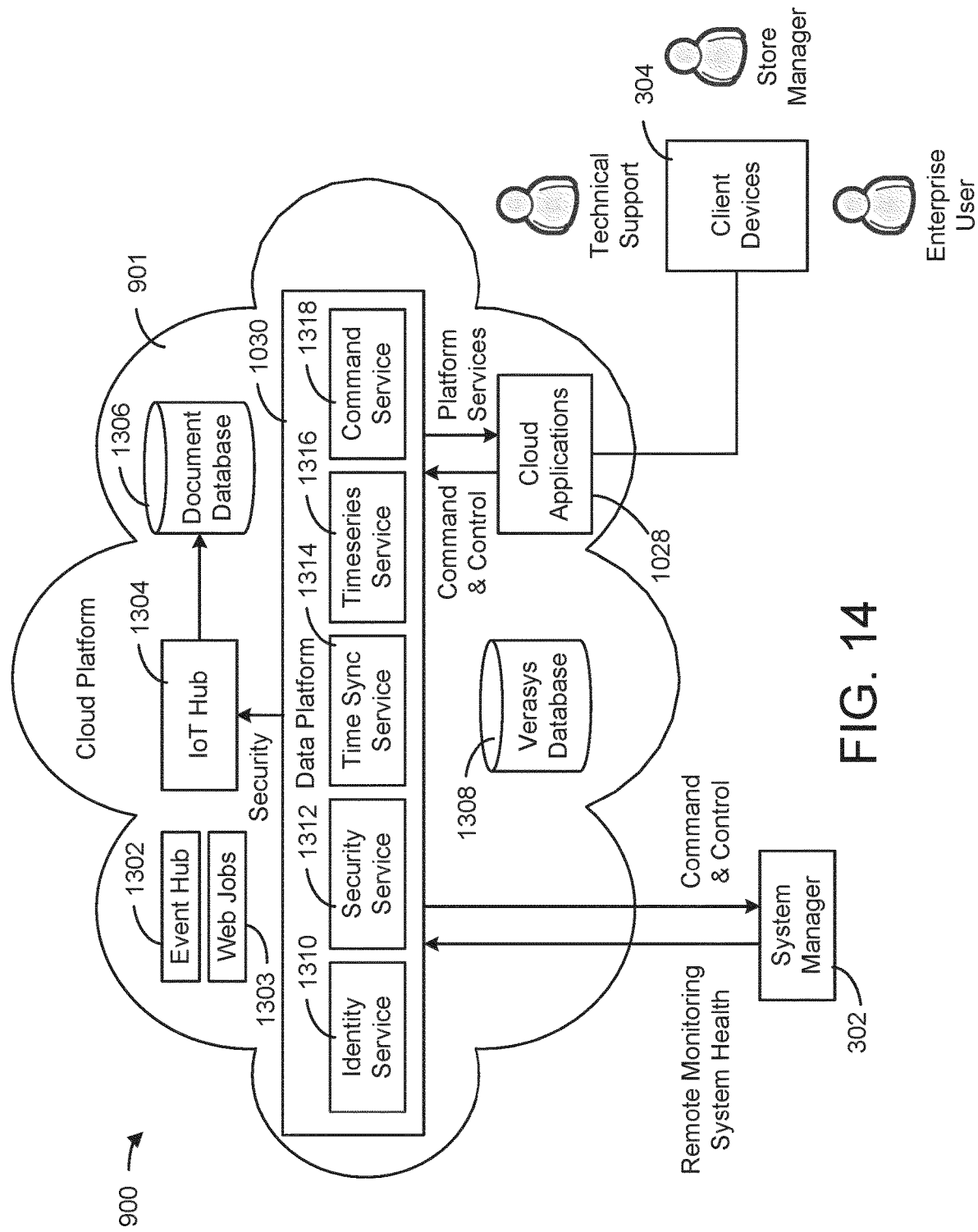
FIG. 14 is a block diagram illustrating the cloud platform and data platform of FIG. 9 in greater detail, according to some embodiments.

Referring now to FIG. 14, a block diagram illustrating cloud platform 901 and data platform 1030 in greater detail is shown, according to an exemplary embodiment. In some embodiments, cloud platform 901 is implemented using the Microsoft Azure Cloud. Cloud platform 901 is shown to include an event hub 1302, web jobs 1303, an Internet-of-Things (IoT) hub 1304, a document database 1306, a Verasys database 1308, data platform 1030, and cloud applications 1028.

IoT hub 1304 can be configured to collect data from data platform 1030 and store the collected data in document database 1306. In some embodiments, IoT hub 1304 is a fully managed service that enables reliable and secure bidirectional communications between millions of IoT devices and a solution backend. IoT hub 1304 may provide reliable device-to-cloud and cloud-to-device messaging at scale. IoT hub 1304 may enable secure communications using per-device security credentials and access control. In some embodiments, IoT hub 1304 provides extensive monitoring for device connectivity and device identity management events. IoT hub 1304 may include device libraries for the most popular languages and platforms.

Web jobs 1303 can run programs or scripts in aa web-based application on demand, continuously, or on a schedule. Event hub 1302 may include an event processing service that provides event and telemetry ingress to cloud platform 901 at massive scale, with low latency and high reliability. Document database 1306 may include a NoSQL document database service designed from to natively support JSON directly inside the database engine.

System manager 302 can interact with cloud applications 1028 via data platform 1030. As described above, data platform 1030 may include a collection of services (e.g., platform APIs) which collect and serve up building objects and time series data. For example, data platform 1030 is shown to include an identity management service 1310, a security service 1312, a time synchronization service 1314, a timeseries service 1316, and a command service 1318. In addition to the services shown in FIG. 14, data platform 1030 can include any of a variety of services configured to process, store, analyze, and perform other operations on the data provided by system manager 302. For example, data platform 1030 can include an asset service, an entity service, an analytics service, and/or other types of data platform services.

Identity service 1310 can be configured to restrict web services to authorized users and applications. In some embodiments, identity service 1310 implements the Open ID Connect protocol, which is an identity layer on top of the OAuth 2.0 protocol. Identity service 1310 can be configured to execute a variety of "Get" commands, "Post" commands, "Update" commands, "Post" commands, and other operations on stored data. For example, identity service 1310 can retrieve one or more users, groups, device associations for a group, or users associated with a group. Identity service 1310 can update user information, update group information, add users to a group, remove users from a group, and/or create a new group. Identity service 1310 can post a get user token and/or a get API token.

Security service 1312 can be configured to manage users, roles, groups, devices, and relationships between a variety of sub-services or sub-APIs. The sub-services or sub-APIs managed by security service 1312 may include an application API, a device API, a group API, an identity API, a role API, and/or a user API. The application API can be configured to perform operations based on a client_id token claim (e.g., managing application updates). The device API can be configured to interact with devices in IoT hub 1304 and/or document database 1306. The group API can be configured to interact with groups of users or devices. The identity API can be configured to perform operations based on a sub-token claim (e.g., getting a user's devices). The role API can be configured to interact with user roles. The user API can be configured to interact with users.

Time synchronization service 1314 can be configured to provide system manager 302 with the latest time in UTC format. When a device connects to time synchronization service 1314, time synchronization service 1314 may return the current UTC time in ISO 8901 format. In some embodiments, no access tokens are necessary to get the time from time synchronization service 1314.

Timeseries service 1316 can be configured to perform a variety of timeseries processing operations. In some embodiments, timeseries service 1316 is configured to perform some or all of the timeseries processing operations described in U.S. patent application Ser. No. 15/644,519 filed Jul. 7, 2017, U.S. patent application Ser. No. 15/644,560 filed Jul. 7, 2017, and U.S. patent application Ser. No. 15/644,581 filed Jul. 7, 2017. The entire disclosure of each of these patent applications is incorporated by reference herein.

In some embodiments, timeseries service 1316 aggregates predefined intervals of the raw timeseries data (e.g., quarter-hourly intervals, hourly intervals, daily intervals, monthly intervals, etc.) to generate new derived timeseries of the aggregated values. These derived timeseries can be referred to as "data rollups" since they are condensed versions of the raw timeseries data. The data rollups generated by timeseries service 1316 provide an efficient mechanism for cloud applications 1028 to query the timeseries data. For example, cloud applications 1028 can construct visualizations of the timeseries data (e.g., charts, graphs, etc.) using the pre-aggregated data rollups instead of the raw timeseries data. This allows cloud applications 1028 to simply retrieve and present the pre-aggregated data rollups without requiring cloud applications 1028 to perform an aggregation in response to the query. Since the data rollups are pre-aggregated, cloud applications 1028 can present the data rollups quickly and efficiently without requiring additional processing at query time to generate aggregated timeseries values.

In some embodiments, timeseries service 1316 calculates virtual points based on the raw timeseries data and/or the derived timeseries data. Virtual points can be calculated by applying any of a variety of mathematical operations (e.g., addition, subtraction, multiplication, division, etc.) or functions (e.g., average value, maximum value, minimum value, thermodynamic functions, linear functions, nonlinear functions, etc.) to the actual data points represented by the timeseries data. For example, timeseries service 1316 can calculate a virtual data point ($pointID_3$) by adding two or more actual data points ($pointID_1$ and $pointID_2$) (e.g., $pointID_3 = pointID_1 + pointID_2$). As another example, timeseries service 1316 can calculate an enthalpy data point ($pointID_4$) based on a measured temperature data point ($pointID_5$) and a measured pressure data point ($pointID_6$) (e.g., $pointID_4 = pointID_5 + pointID_6$). The virtual data points can be stored as derived timeseries data.

Command service 1318 can be configured to perform a variety of command and control operations. In some embodiments, command service 1318 is configured to send commands and control signals to system manager 302. The commands and control signals can then be used by system manager 302 to control equipment 1002 of BMS 900. In some embodiments, command service 1318 sends command messages as strings, gets response messages as strings, and stores the responses.

In some embodiments, command service 1318 allows a user to command and control the equipment 1002 of BMS 900 by writing data values to system manager 302. It should be noted that a local user of system manager 302 can command and control BMS 900 via a local user interface generated by system manager 302. However, remote users (e.g., technical support, a store manager, an enterprise user, etc.) and cloud applications 1028 can command and control BMS 900 via an enterprise UI via command service 1318. Command service 1318 can be configured to change any data values including setpoints, configuration parameters, schedules, and other types of data used by system manager 302 and/or equipment 1002. For example, cloud applications 1028 can use command service 1318 to change the value of any property that is defined as writable in the equipment's equipment model template.

In some embodiments, data platform 1030 includes an asset service. The asset service can be configured to store equipment (i.e., asset) information for various systems and devices in BMS 900. Information stored by the asset service may include, for example, an asset ID (i.e., a unique ID for the asset), an entity ID (e.g., a system ID to map to source system), a serial number of the asset, an asset name (e.g., Chiller 1, Chiller 2, Heat Pump 1, Heat Pump 2, etc.), an asset description, an asset type (e.g., HVAC Chiller, VAV box, etc.), an asset category (e.g., vapor compression chiller, electric chiller, etc.), an asset make or manufacturer, an asset model ID, an asset model name, an asset source system ID, an asset status (e.g., active or inactive), a customer ID, an asset installed date, an asset manufacture date, and/or other types of information describing equipment in BMS 900. In some embodiments, the asset service stores warranty information for various assets. A single asset can have different warranties from different warranty providers. Warranty information stored by the asset service may include a warranty ID, a warranty company, a warranty type, a warranty start date, a warranty expiration date, a warranty status, a contact name, and/or a contact phone number.

In some embodiments, data platform 1030 includes an entity service. The entity service can be configured to assign entity information to various timeseries or data points to associate the timeseries or data points with a particular system, device, or space. The entity service can be configured to traverse an entity tree or diagram (e.g., data model 1100) to identify relationships between various types of entities. Entities can include, for example, devices, systems, spaces, assets, schedules, warranties, users, groups of users, buildings, or other representations of equipment, spaces, or users.

In some embodiments, data platform 1030 includes a weather service. The weather service can be configured to communicate with external weather providers (e.g., Aeris Weather, Open Weather Map, etc.) to obtain and store weather data as timeseries. In some embodiments, the weather service runs to collect current weather-related data from a service provider and store it in timeseries service 1316 so that weather data can be queried like any other timeseries data. The weather service can retrieve historical weather data, current weather data, and/or forecast weather data.

In some embodiments, data platform 1030 is configured to generate and maintain a "shadow" for each system manager 302 that sends data to data platform 1030. The shadow may be similar to an IoT hub's device twin and may function as a virtual service-side representation of a physical system manager 302. For example, the shadow for a given system manager 302 may be a data object (e.g., a JSON object) that contains attributes indicating the state of system manager 302. An example of a shadow for a system manager 302 is as follows:

```
{
    "Reported": [ ],
    "Bound": [ ],
    "Revision": "1",
    "Hash": "abc"
}
```

System manager 302 can be configured to fill in the "Reported" field of the shadow with information describing system manager 302 (e.g., BAS units, time zone, etc.). It should be noted that the "Reported" field is different from the reported network tree, which is a separate file. An example of the information which can be specified in the "Reported" field is as follows:

```
"SBH Settings": {
    "BAS Units Setting": "IP",
    "Time Zone Setting": "Central"
    "Heartbeat Time Series ID": "HB-TS"
    "Software Version": 3.0
}
```

The "Bound" field of the shadow can be filled in by a cloud application 1028 to indicate the properties for which the cloud application 1028 wants timeseries data. The "Bound" field can include the following information:

Bound: [FQR ID, Time Series ID]

Organization ID where the organization ID is used by cloud applications 1028 to identify the customer associated with system manager 302. An example of a bound list is provided in Appendix B. If certain points in the "Bound: field are not physically present, the system manager 302 can send the "Non-Existent" points list data adaptor 1026, which can delete the non-existent points from the shadow.

The "Revision" field of the shadow may be incremented each time the shadow is modified by either cloud application 1028 or by system manager 302. Both system manager 302 and cloud application 1028 can update the "Revision" field of the shadow each time a change is made. Both system manager 302 and cloud application 1028 can also synchronize with the shadow to ensure that each has the most recent version of the information provided by the shadow. For example, system manager 302 and cloud application 1028 can periodically read the shadow and copy the information contained in the shadow if the version of the shadow is more recent than the local version of the information.

In some embodiments, data platform 1030 is configured to maintain a manifest for each instance of system manager 302 that sends data to data platform 1030. The manifest may indicate the most recent available version of software for system manager 302, the installed version of software for system manager 302, a retrieval URL for the most recent version of software for system manager 302, and a list of endpoint URLs that define the location of data platform 1030. The endpoint URLs may be helpful in the event that system manager 302 is deployed in a country that requires data to be kept within the country for legal reasons. Accordingly, the URL may be different for each country. If the endpoint URL is left empty, system manager 302 may not send data to data platform 1030. In some embodiments, the manifest also include licensing information for cloud applications 1028 associated with system manager 302.

Data platform 1030 may use a variety of endpoints for communicating with services 1310-1318 and other components of cloud platform 901. Each endpoint may function as a virtual IP address for system manager 302 to communicate with services 1310-1318. For example, data platform 1030 may use a timeseries endpoint for system manager 302 to communicate with timeseries service 1316. Similarly, data platform 1030 may use a security endpoint for system manager 302 to communicate with security service 1312, an entity endpoint for system manager 302 to communicate with an entity service, and an IMS endpoint for system manager 302 to communicate with identity service 1310.

Timeseries Process

Figure 15:
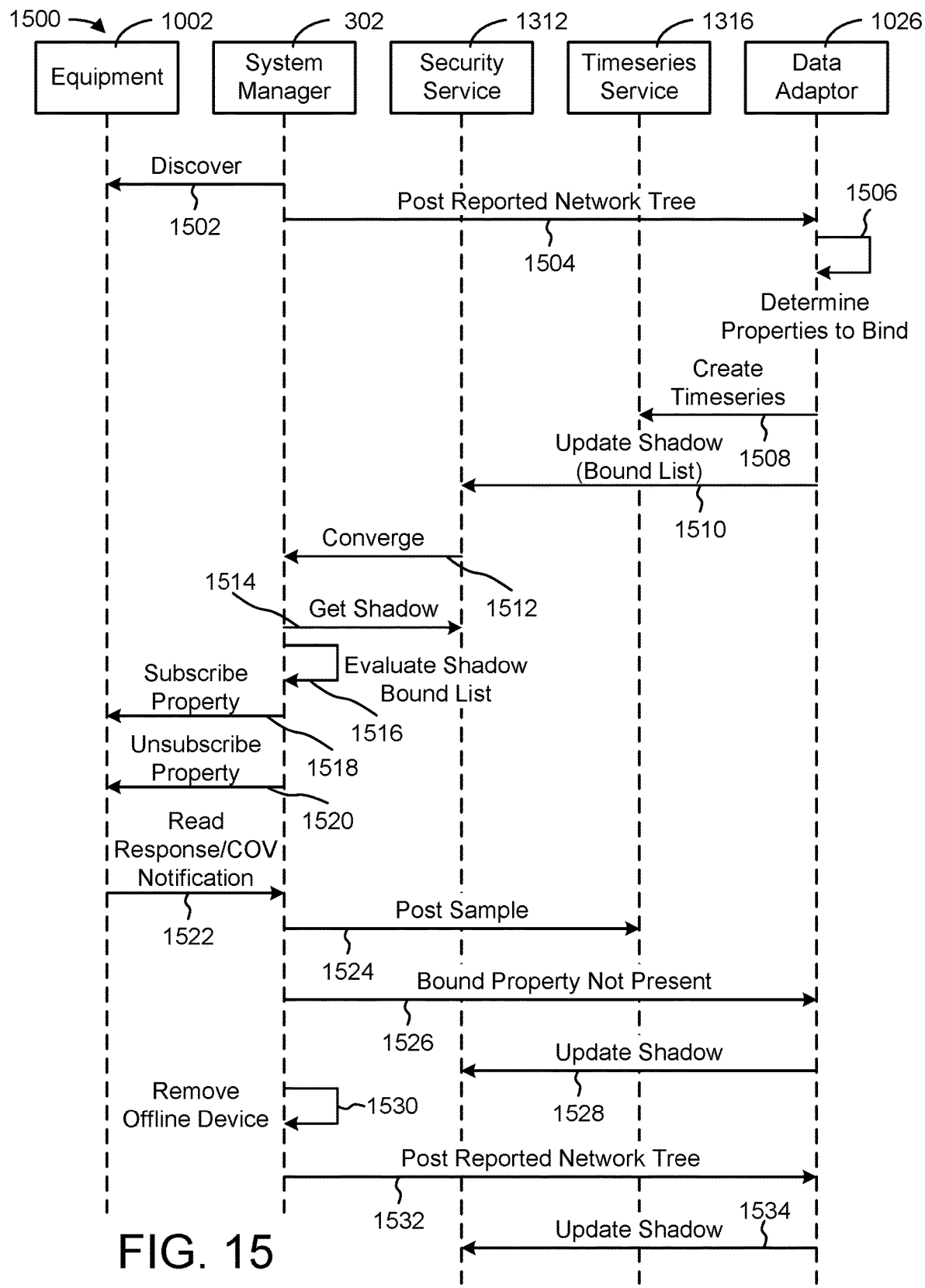
FIG. 15 is a sequence diagram illustrating a timeseries processing process which can be performed by the BMS of FIG. 9, according to some embodiments.

Referring now to FIG. 15, a sequence diagram illustrating a timeseries processing process 1500 is shown, according to an exemplary embodiment. Process 1500 can be performed by one or more components of BMS 900 to collect and send timeseries data to cloud platform 901. For example, process 1500 can be performed by equipment 1002, system manager 302, and/or various components of cloud platform 901 (e.g., security service 1312, timeseries service 1316, data adaptor 1026, etc.).

Process 1500 is shown to include system manager 302 discovering equipment 1002 (step 1502) and posting a reported network tree to data adaptor 1026 (step 1504). The reported network tree may identify all of the equipment 1002 connected with system manager 302, either directly or indirectly. Data adaptor 1026 can use the reported network tree in combination with equipment model templates for the identified equipment 1002 to determine which properties (i.e., data points, attributes, etc.) of equipment to bind (step 1506). Data adaptor 1026 can then create timeseries for the identified properties with timeseries service 1316 (step 1508) and update the shadow bound list with security service 1312 (step 1510). The timeseries may initially be empty, but can be updated as data samples are collected from system manager 302 and/or equipment 1002. In some embodiments, data adaptor 1026 updates the shadow bound list to identify all of the properties that data adaptor 1026 is interested in receiving change-of-value (COV) updates from system manager 302 and/or equipment 1002.

Security service 1312 can converge with system manager 302 (step 1512) and system manager 302 can get the shadow from security service 1312 (step 1514). System manager 302 can evaluate the shadow bound list (step 1516) to identify one or more properties specified by the shadow. System manager 302 can then subscribe to COV updates for any properties specified by the shadow (step 1518) and unsubscribe from COB updates for any properties not specified by the shadow (step 1520). When a COV for a subscribed property occurs, equipment 1002 can send a COV notification to system manager 302 (step 1522). The COV notification may identify the property for which a COV has occurred and may include the current value of the property.

In some embodiments, equipment 1002 provides system manager 302 with a response that indicates whether a given subscribed property is present in equipment 1002 (i.e., whether equipment 1002 has that data point) and/or whether that property is reliable (e.g., whether equipment 1002 is online or offline). If a subscribed property is present and reliable, system manager 302 may post a sample of the property to timeseries service 1316 (step 1524). However, if a subscribed property is not present in equipment 1002, system manager 302 can notify data adaptor 1026 that the bound property is not present (step 1526). Data adaptor 1026 can then update the shadow with security service 1312 (step 1528) to remove the property that is not present. If a subscribed property is not reliable (e.g., equipment 1002 is offline), system manager 302 can remove the offline device from the reported network tree (step 1530) and post the updated reported network tree to data adaptor 1026 (step 1532). Data adaptor 1026 can then update the shadow with security service 1312 (step 1534) to remove any properties associated with the offline device.

Alarm Process

Figure 16:
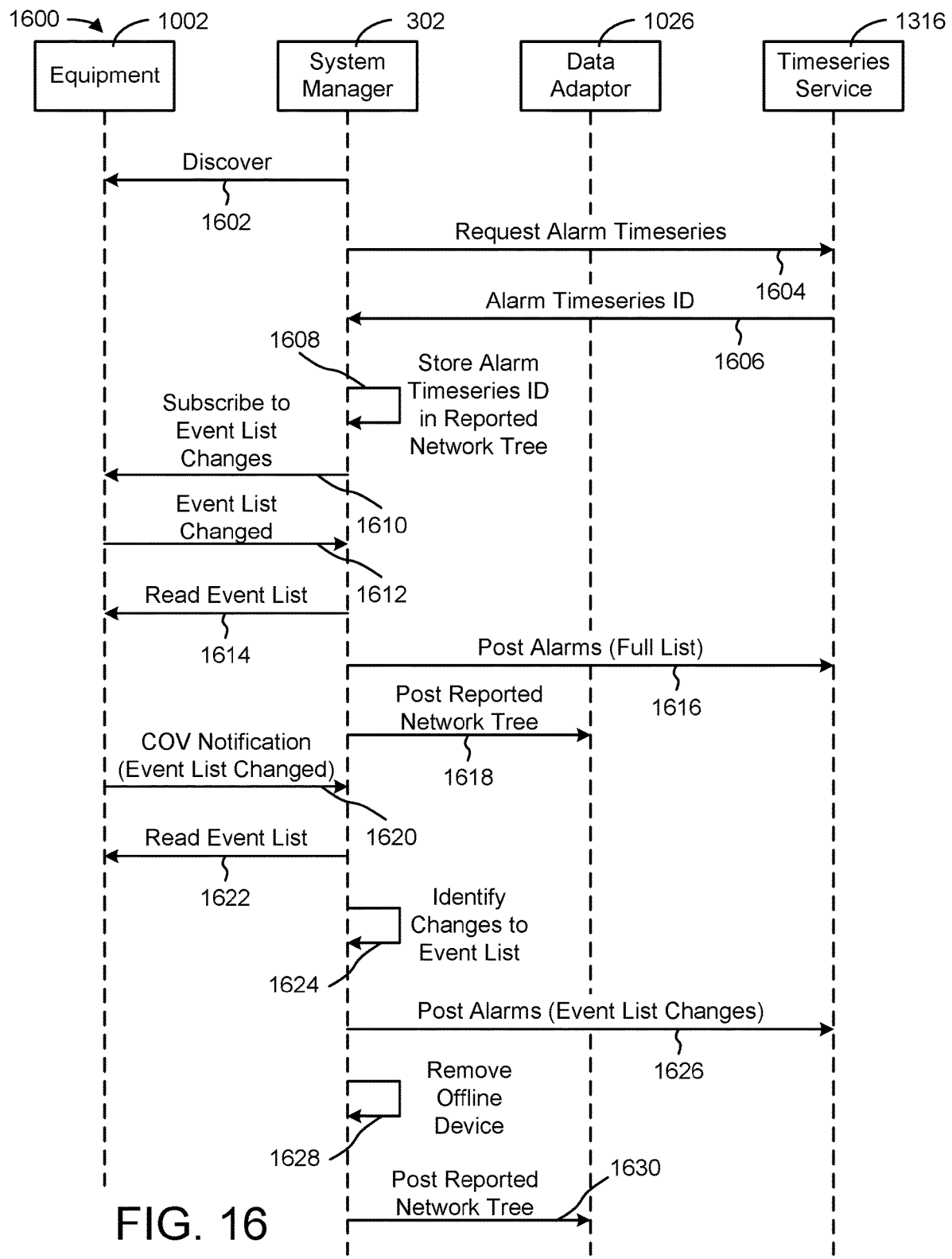
FIG. 16 is a sequence diagram illustrating an alarm process which can be performed by the BMS of FIG. 9, according to some embodiments.

Referring now to FIG. 16, a sequence diagram illustrating an alarm process 1600 is shown, according to an exemplary embodiment. Process 1600 can be performed by one or more components of BMS 900 to generate alarms when a problem or event occurs within a piece of equipment. For example, process 1600 can be performed by equipment 1002, system manager 302, and/or various components of cloud platform 901 (e.g., timeseries service 1316, data adaptor 1026, etc.). An alarm may include an indication of whether the alarm is active (e.g., true/false), a time at which the alarm became active, a time at which the alarm became inactive, and/or an indication or alarm severity (e.g., critical, service priority, service, etc.). An alarm may include an alarm active name (e.g., an enumerated set and ID translated to a string) and an alarm inactive name (e.g., an enumerated set and ID translated to a string). In some embodiments, an alarm includes alarm text.

Equipment 1002 may store a list of currently active alarms and a log of historical alarms. System manager 302 can provide a full list of the currently active alarms in the system when system manager 302 starts up. After startup, system manager 302 can send alarm list updates for new alarms on a continuous basis for all equipment 1002 within the system. In some embodiments, cloud platform 901 does not need to initiate alarm notification and does not need to select equipment. System manager 302 can send alarms to timeseries service 1316. When new equipment is discovered, system manager 302 can create a timeseries for the equipment and can add an alarm timeseries ID to the reported network tree sent to data adaptor 1026.

Process 1600 is shown to include system manager 302 discovering equipment 1002 (step 1602). System manager 302 can request an alarm timeseries from timeseries service 1316 for the discovered equipment (step 1604). Timeseries service 1316 may reply to system manager 302 with the timeseries ID for the alarm timeseries associated with each piece of equipment 1002 (step 1606). System manager 302 can then store the alarm timeseries ID in the reported network tree (step 1608).

System manager 302 can subscribe to event list changes with equipment 1002 (step 1610) and can be notified by equipment 1002 when the event list has changed (step 1612). In some embodiments, the event list identifies a set of events that have been recorded by equipment 1002, including fault events and/or alarm events. In response to a notification that the event list has changed, system manager 302 can read the event list (step 1614) and can post the full list of alarms to timeseries service 1316 (step 1616). System manager 302 can also post the reported network tree, including the alarm timeseries ID, to data adaptor 1026 (step 1618).

In some embodiments, system manager 302 receives a COV notification from equipment 1002 indicating that the event list has changed (step 1620). In response to the COV notification, system manager 302 can read the event list (step 1622) and identify any changes to the event list (step 1624).

System manager 302 can post any alarms in the event list changes to timeseries service 1316 (step 1626). In some embodiments, system manager 302 removes any offline devices from the reported network tree (step 1628) and posts the updated reported network tree to timeseries service 1316 (step 1630).

Command Process

Figure 17:
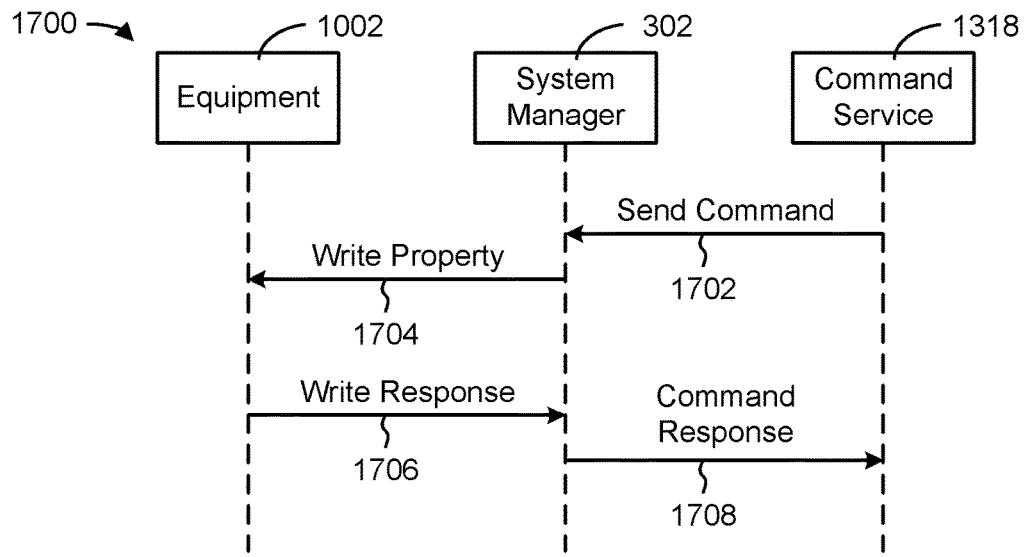
FIG. 17 is a sequence diagram illustrating a command process which can be performed by the BMS of FIG. 9, according to some embodiments.

Referring now to FIG. 17, a sequence diagram illustrating a command process 1700 is shown, according to an exemplary embodiment. Process 1700 can be performed by one or more components of BMS 900 to command and control equipment 1002 of BMS 900. For example, process 1700 can be performed by equipment 1002, system manager 302, and/or various components of cloud platform 901 (e.g., command service 1318, etc.). Command service 1318 can be configured to change any data values including setpoints, configuration parameters, schedules, and other types of data used by system manager 302 and/or equipment 1002. For example, cloud applications 1028 can use command service 1318 to change the value of any property that is defined as writable in the equipment's equipment model template.

Process 1700 is shown to include command service 1318 sending a command to system manager 302 (step 1702). The command may be provided by a remote user of data platform 1030, cloud applications 1028, or any other system or device. In response to the command, system manager 302 can write the value of a property to equipment 1002 (step 1704). Writing the value of a property may include updating a setpoint, updating a control signal, changing a configuration parameter, changing a schedule, or changing another parameter used by equipment 1002. Equipment 1002 can write a response to the command back to system manager 302 (step 1706). System manager 302 can then send a command response to command service 1318 (step 1708). The command response may include a unique message ID, a response (e.g., complete), and a command result (e.g., write successful). Several examples of commands are provided in Appendix D.

In some embodiments, command service 1318 is configured to provide read property commands to system manager 302. A read property command can be used to retrieve point names for IOM-200 devices. This command may also be used to retrieve the value of other properties in the future. The read property command may follow the same pattern as the write property command described with reference to FIG. 17. However, the value parameter of a read property command may be included in the response instead of the request.

Schedule Synchronization and Configuration

Figure 18:
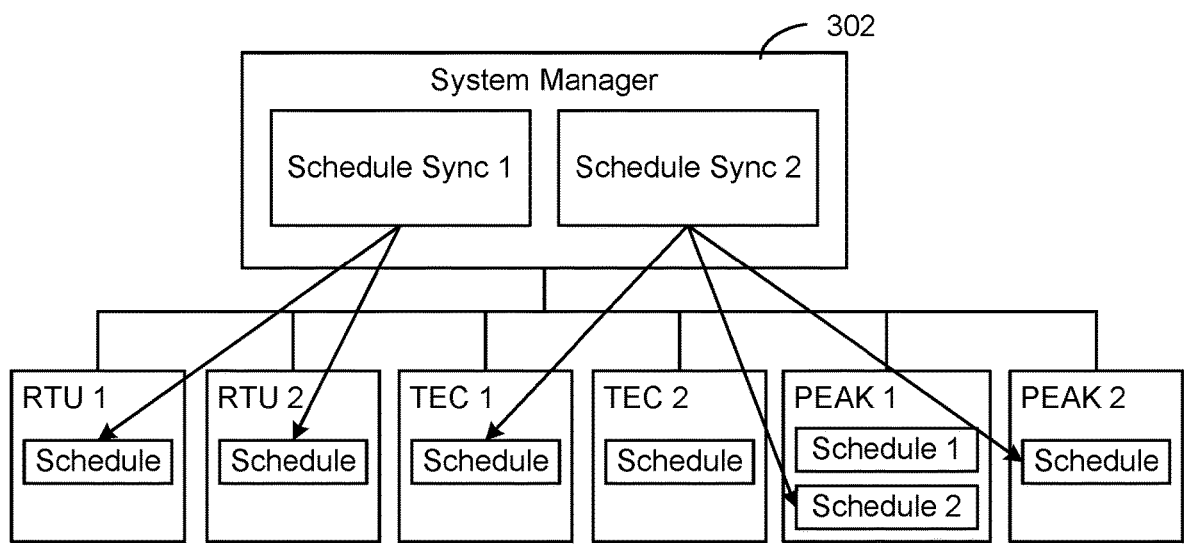
FIG. 18 is a block diagram illustrating a schedule synchronization process which can be performed by the BMS of FIG. 9, according to some embodiments.

Referring now to FIG. 18, a block diagram illustrating a schedule synchronization operation which can be performed by BMS 900 is shown, according to an exemplary embodiment. System manager 302 can contain equipment schedules and sync/global schedules. Equipment schedules may reside in the equipment, whereas sync schedules may reside in system manager 302 and can be used to synchronize their configuration with multiple equipment schedules. This allows multiple equipment schedules to be configured simultaneously. Global schedules may reside in system manager 302 and can send commands to the list of property references.

In some embodiments, schedule logic is executed within equipment 1002. For example, equipment 1002 can evaluate the schedule for a day periodically, and issue a write to the scheduled properties according to daily schedule. Equipment schedules can be synchronized with a schedule configuration in system manager 302. FIG. 18 shows that the configuration for sync schedule 1 is pushed down to the schedule in RTU1 and RTU2. Sync schedule 1's configuration overwrites any configuration of RTU1's schedule and RTU2's schedule. Accordingly, cloud applications 1028 can edit sync schedule 1 to affect the schedule in RTU1 and RTU2, rather than editing RTU1's schedule or RTU2's schedule directly.

In some embodiments, system manager 302 lists each schedule on the site, along with a reference to its schedule configuration in the reported network tree. The schedule configuration can define the type of schedule (e.g., global, sync, equipment, etc.). Weekly schedules may contain seven entries, one for each day of the week. Each entry may contain a list of the times and corresponding values for the schedule to write to the scheduled properties. Exceptions to the weekly schedule may override the times in this weekly schedule. The schedule configuration may define the scheduled properties (i.e., a list of properties to be written at the scheduled times), synchronized devices (i.e., a list of devices that share a schedule configuration with the sync schedule), and exceptions to the weekly schedule. Each schedule object may include its own schedule configuration file in data adaptor 1026. An example of a schedule configuration is provided in Appendix E.

Figure 19:
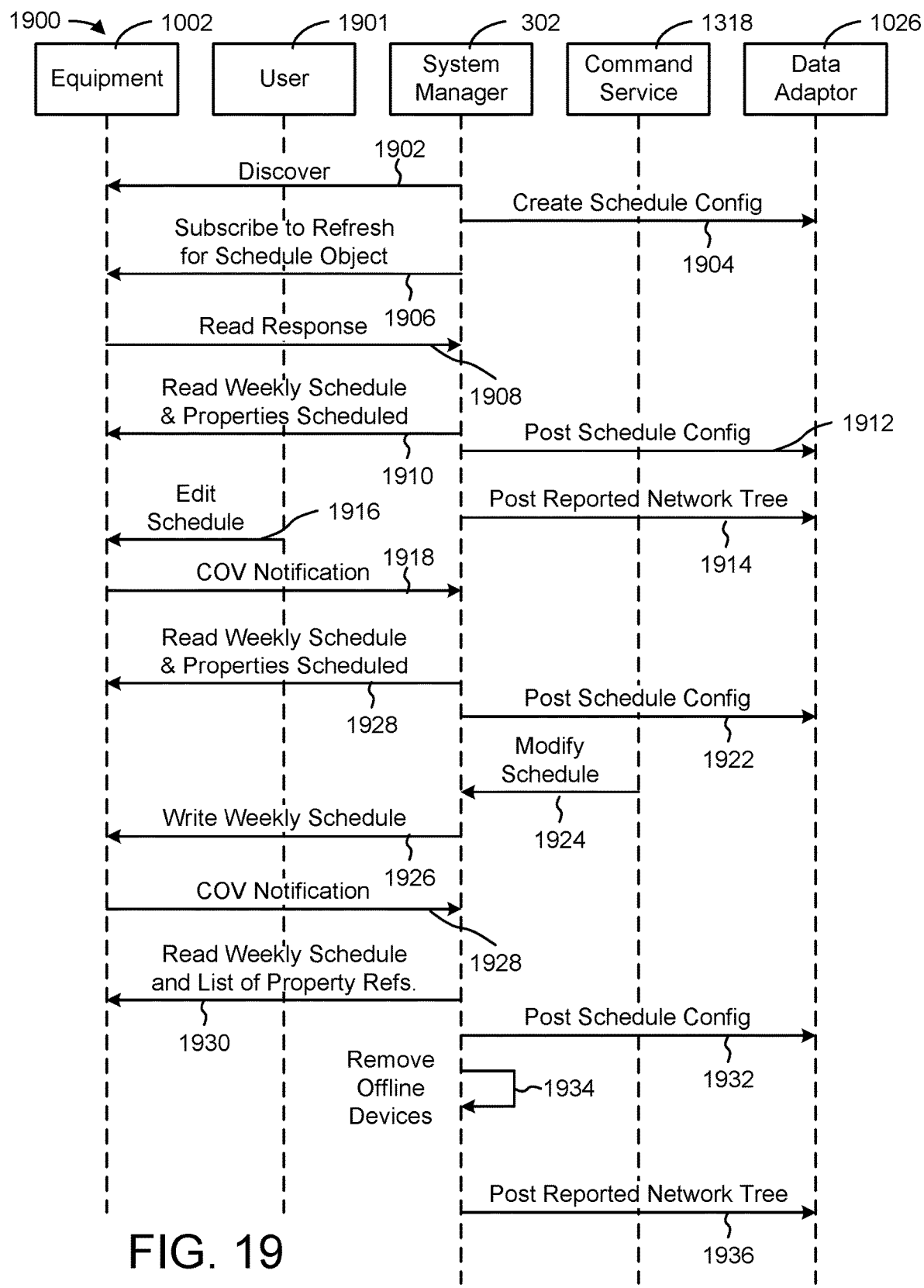
FIG. 19 is a sequence diagram illustrating a schedule configuration process for equipment schedules in the BMS of FIG. 9, according to some embodiments.

Referring now to FIG. 19, a sequence diagram illustrating a schedule configuration process 1900 for equipment schedules is shown, according to an exemplary embodiment. Process 1900 can be performed by one or more components of BMS 900 to configure and synchronize schedules for equipment 1002. For example, process 1900 can be performed by equipment 1002, system manager 302, a user 1901, and/or various components of cloud platform 901 (e.g., command service 1318, data adaptor 1026 etc.).

Process 1900 is shown to include system manager 302 discovering equipment 1002 (step 1902) and creating a schedule configuration for the discovered equipment 1002 (step 1904). System manager 302 can subscribe to a refresh for one or more schedule objects associated with equipment 1002 (step 1906) and can read a response from equipment 1002 indicating a schedule refresh (step 1908). In response to being notified that the schedule object has refreshed, system manager 302 can read the weekly schedule and properties scheduled for equipment 1002 (step 1910) and can post the schedule configuration to data adaptor 1026 (step 1912). System manager 302 can also post the reported network tree to data adaptor 1026 (step 1914).

A user 1902 can edit the schedule for equipment 1002 (step 1916). In response, equipment 1002 may provide a COV notification to system manager 302 (step 1918). Upon receiving the COV notification, system manager 302 can read the weekly schedule and properties scheduled for equipment 1002 (step 1928) and can post the schedule configuration to data adaptor 1026 (step 1922).

Command service 1318 can also modify the schedule for equipment 1002 (step 1924). In response, system manager 302 may write the weekly schedule, including the modified properties, to equipment 1002 (step 1926). System manager 302 may receive a COV notification from equipment 1002 indicating a change to the schedule (step 1928). In response to receiving the COV notification, system manager 302 can read the weekly schedule for equipment 1002 and the list of property references (step 1930) and can post the schedule configuration to data adaptor 1026 (step 1932). In some embodiments, system manager 302 removes offline devices from the reported network tree (step 1934) and posts the reported network tree to data adaptor 1026 (step 1936).

Figure 20:
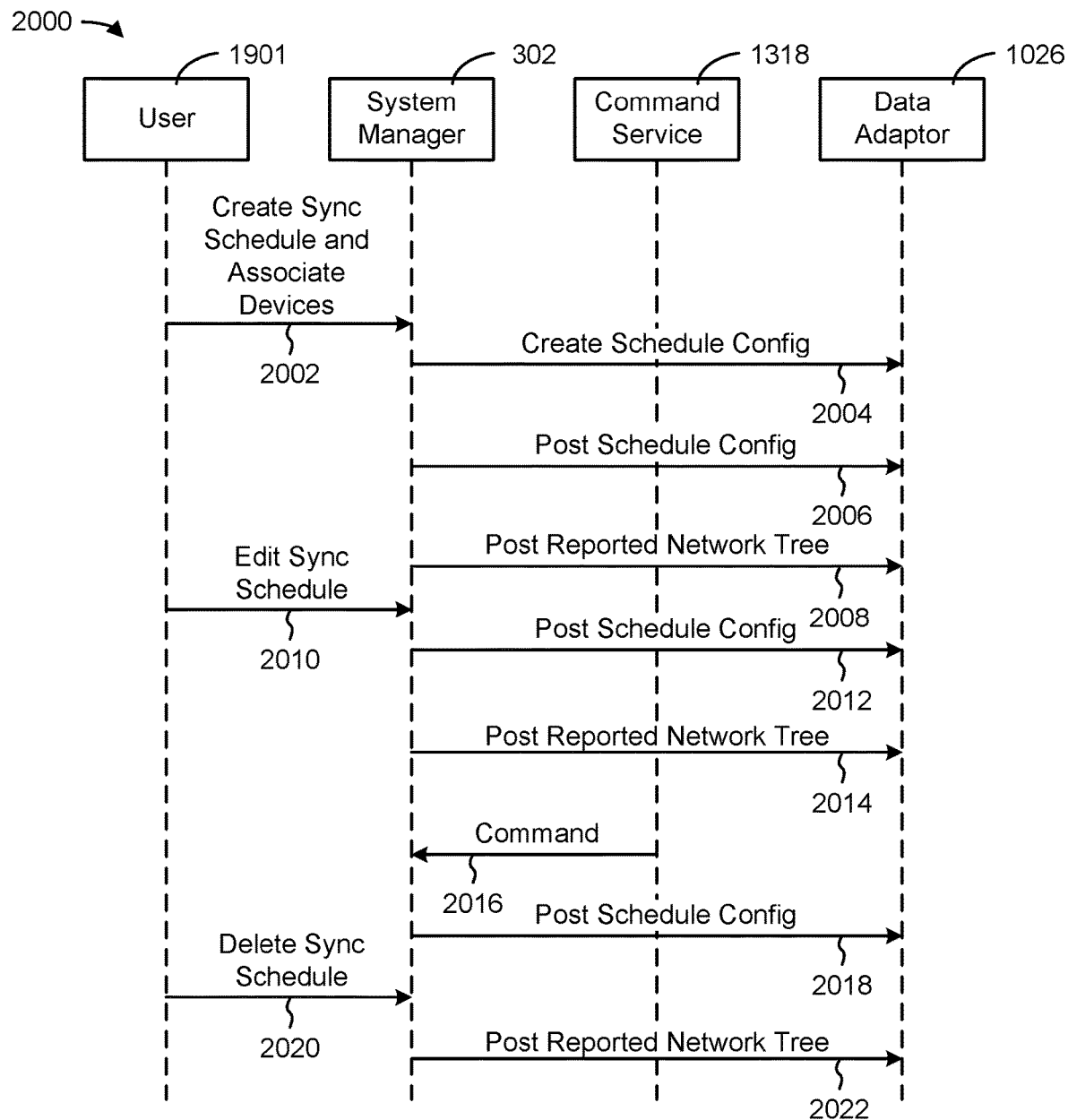
FIG. 20 is a sequence diagram illustrating a schedule configuration process for a sync schedule in the BMS of FIG. 9, according to some embodiments.

Referring now to FIG. 20, a sequence diagram illustrating a schedule configuration process 2000 for a sync schedule is shown, according to an exemplary embodiment. Process 2000 can be performed by one or more components of BMS 900 to configure and synchronize schedules for equipment 1002. For example, process 2000 can be performed by a user 1902, system manager 302, and/or various components of cloud platform 901 (e.g., command service 1318, data adaptor 1026 etc.).

Process 2000 is shown to include a user 1901 creating a sync schedule and associating devices with the sync schedule (step 2002). In some embodiments, step 2002 is performed via a local user interface of system manager 302. In response to user 1901 creating the sync schedule, system manager 302 can create a schedule configuration (step 2004) and post the schedule configuration to data adaptor 1026 (step 2006). System manager 302 can also post the reported network tree to data adaptor 1026 (step 2008).

The sync schedule can be edited by a user 1901 (step 2010) via a local user interface of system manager 302. In response to user 1901 editing the sync schedule, system manager 302 can post the schedule configuration to data adaptor 1026 (step 2012). System manager 302 can also post the reported network tree to data adaptor 1026 (step 2014). If the sync schedule is deleted by a user (step 2020), system manager 302 can report the network tree to data adaptor 1026 (step 2022).

The sync schedule can be modified by command service 1318 by sending a modify schedule command to system manager 302 (step 2016). The modify schedule command may include a command ID (e.g., modify schedule), and a command parameter (e.g., the schedules FQR ID, a schedule configuration, etc.). In response to command service 1318 modifying the sync schedule, system manager 302 can post the schedule configuration to data adaptor 1026 (step 2018).

System Manager Life Cycle

Figure 21:
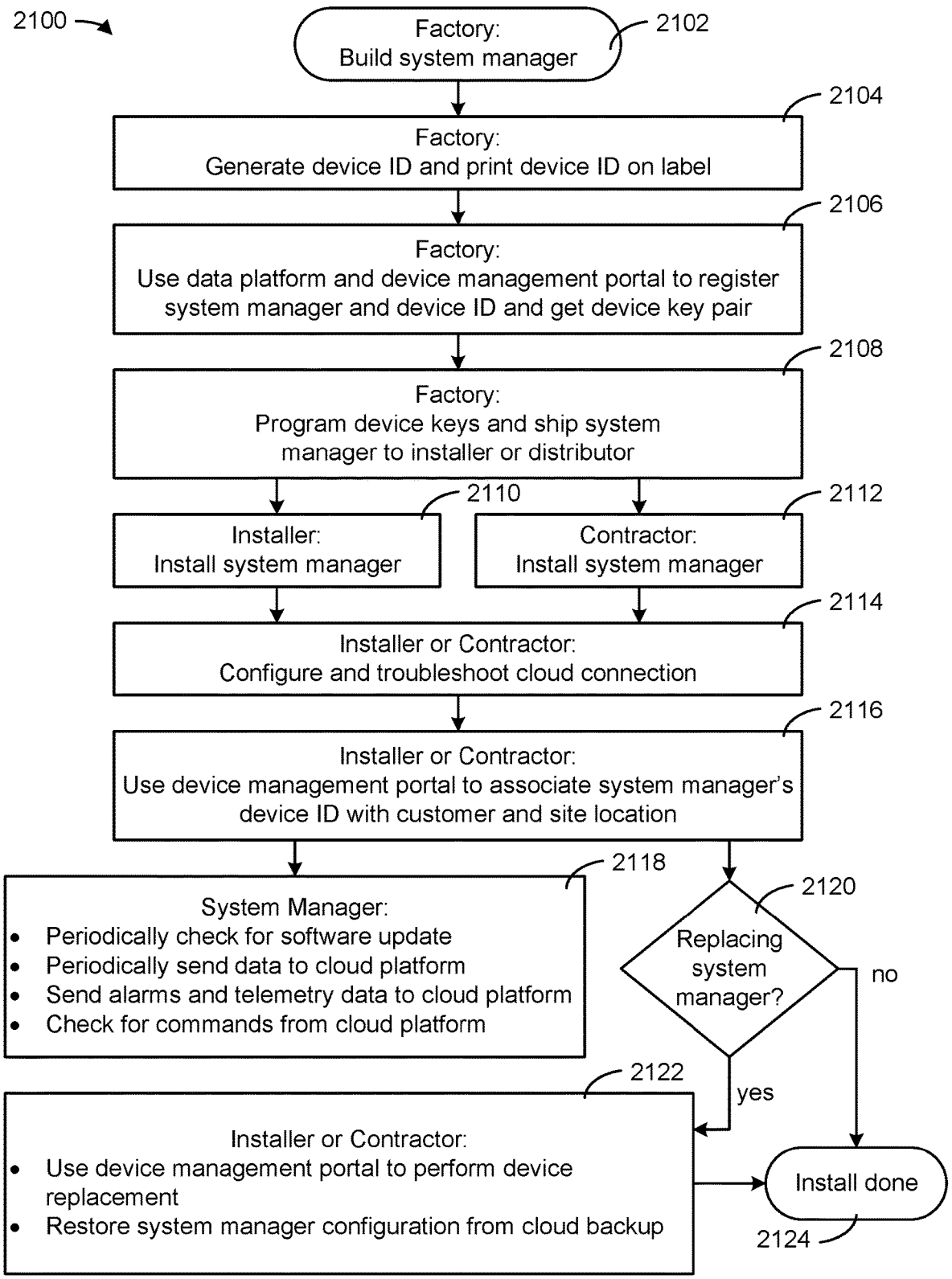
FIG. 21 is a flowchart of a process illustrating the life cycle of the system manager of FIG. 9, according to some embodiments.

Referring now to FIG. 21, a flowchart of a process 2100 illustrating the life cycle of system manager 302 is shown, according to an exemplary embodiment. Process 2100 can be performed by the factory that builds system manager 302, by the installer or contractor that installs system manager 302, and/or by one or more components of system manager 302.

Process 2100 is shown to include the factory building system manager 302 (step 2102). The factory can generate a device ID for system manager 302 and print the device ID on the label for system manager 302 (step 2104). The factory can use data platform 1030 and a device management portal to register system manager 302 using the device ID and get a device key pair (step 2106). The factory can then program the device keys into system manager 302 and ship system manager 302 to an installer or distributor (step 2108). The distributor may distribute system manager 302 to a contractor for installation.

The installer or contractor can install system manager 302 (steps 2110 and 2112) and configure and troubleshoot the connection between system manager 302 and cloud platform 901 (step 2114). In some embodiments, the human interaction needed for cloud connectivity includes accepting the end user license agreement (EULA), entering the network information needed for an internet connection via the UI of system manager 302 (customer-specific information), setting the time zone and opting in to send data to cloud platform 901 via the UI of system manager 302, logging in to the device management portal to report that system manager 302 is installed at a customer site (the web site URL may be provided via the UI of system manager 302), and initiating the restore of a replacement system manager's configuration via the UI of system manager 302. All other configuration may be automatic. The contractor or installer may use the device management portal to associate the device ID of system manager 302 with a particular customer and site location (step 2116).

System manager 302 may begin sending data to cloud platform 901 as soon as the cloud connection has been established (if the customer opts in to sending data to cloud platform 901). Cloud platform 901 can associate any existing data with a customer/site when the customer is associated with system manager 302. System manager 302 can periodically check for software updates, periodically send data to cloud platform 901, send alarms and telemetry data to cloud platform 901, and check for commands from cloud platform 901 (step 2118).

If system manager 302 is not being replaced (i.e., the result of step 2120 is "no"), the installation of system manager 302 is complete (step 2124). If system manager 302 is being replaced (i.e., the result of step 2120 is "yes"), the installer or contractor can use the device management portal to perform device replacement. The configuration of system manager 302 can be restored to the new system manager 302 from a backup store at cloud platform 901 (step 2122) and the installation of system manager 302 is complete (step 2124).

Startup Process

Figure 22:
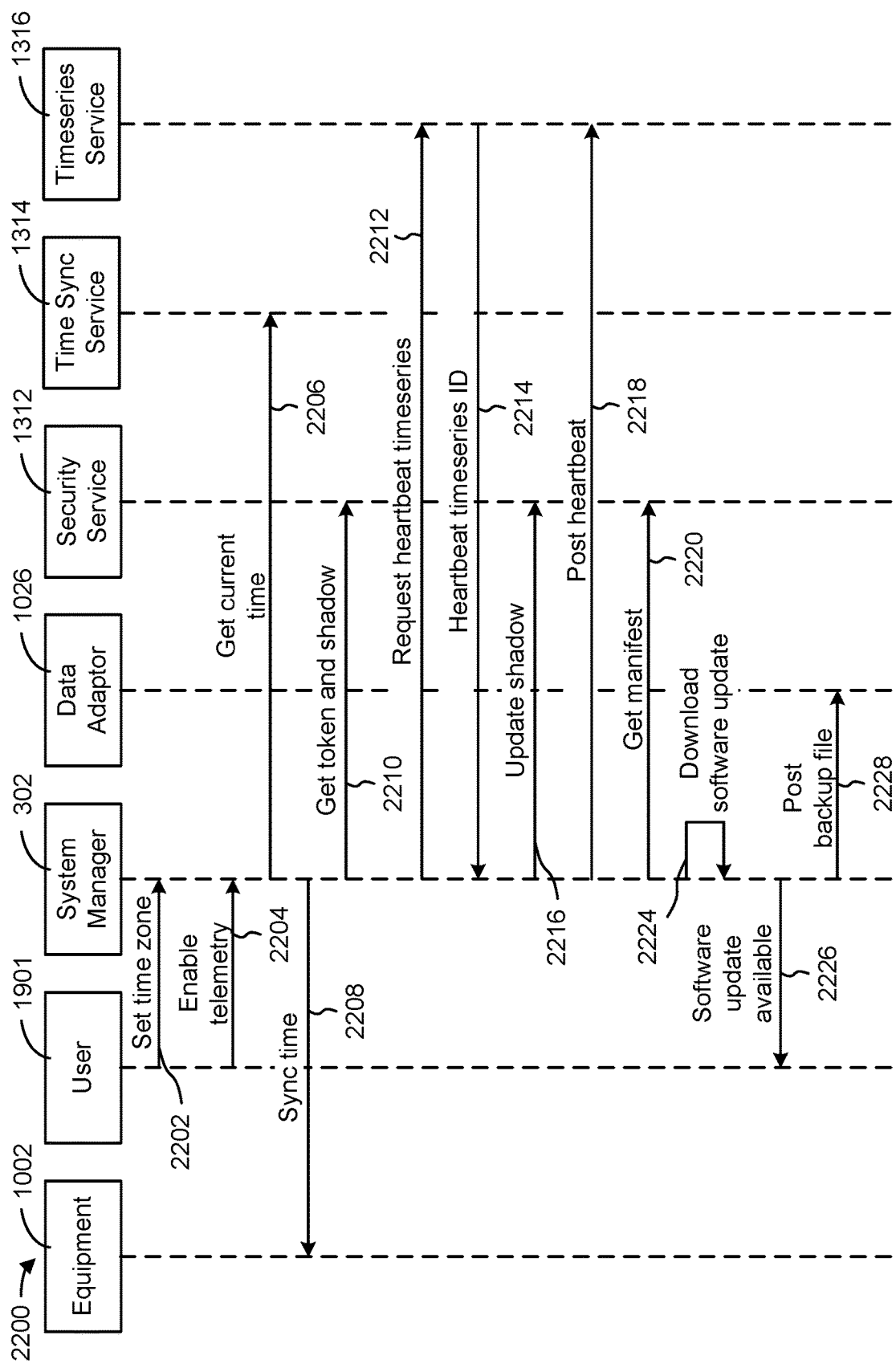
FIG. 22 is a sequence diagram illustrating a startup process for the system manager of FIG. 9, according to some embodiments.

Referring now to FIG. 22, a sequence diagram illustrating a startup process 2200 for system manager 302 is shown, according to an exemplary embodiment. Process 2200 can be performed by one or more components of BMS 900. For example, process 2200 can be performed by equipment 1002, system manager 302, a user 1901, and/or various components of cloud platform 901 (e.g., security service 1312, timeseries service 1316, time sync service 1314, data adaptor 1026, etc.).

Process 2200 is shown to include a user 1901 setting a time zone with system manager 302 (step 2202) and setting system manager 302 to send data to cloud platform 901 (step 2204). System manager 302 can get the current time from time sync service 1314 (step 2206) and can synchronize the time with equipment 1002 (step 2208). In some embodiments, system manager 302 sets a timer to synchronize the time periodically. System manager 302 can get a token and shadow from security service 1312 (step 2210) and can store a local copy of the shadow within system manager 302. System manager 302 can use the bound list of the shadow to determine which properties to send to cloud platform 901. If the settings of system manager 302 are different from the shadow obtained from security service 1312, system manager 302 can update the shadow (step 2216).

In some embodiments, system manager 302 requests a heartbeat timeseries from timeseries service 1316 (step 2212). Timeseries service 1316 may reply with a heartbeat timeseries ID (step 2214). System manager 302 can use the heartbeat timeseries ID to post a heartbeat to timeseries service 1316 (step 2218). In some embodiments, system manager 302 sets a timer to periodically post a heartbeat to timeseries service 1316 at regular intervals.

System manager 302 may obtain a manifest from security service 1312 (step 2220). In some embodiments, system manager 302 sets a timer to obtain the manifest from security service 1312 periodically (e.g., every 24 hours). In some embodiments, the manifest contains the URL of a software repository that stores software for system manager 302. System manager 302 can check whether the installed version of software on system manager 302 is different from the most recent version stored at the software repository. If an updated version of software is available at the software repository, system manager 302 can download a software update from the software repository (step 2224) and notify user 1901 that a software update is available (step 2226).

In some embodiments, system manager 302 posts a backup file to data adaptor 1026 (step 2228). System manager 302 can set a timer to post a backup file to data adaptor 1026 periodically, according to a configurable backup frequency (e.g., every 24 hours, once per week, once per month, etc.).

In some embodiments, system manager 302 is configured to perform a discovery process at startup. After discovering all of the equipment connected with system manager 302, system manager 302 can generate a reported network tree which identifies all of the discovered equipment. System manager 302 can sent the reported network tree to data adaptor 1026. In some embodiments, the reported network tree identifies a equipment model template for each item of equipment in the reported network tree. The equipment model template may define all of the points associated with the corresponding item of equipment. If data platform 1030 does not yet have the identified equipment model templates, data platform 1030 may send a command/request for the missing equipment model templates to system manager 302. In response to the command, system manager 302 may post the requested equipment model templates to data adaptor 1026. An example of a command which can be used is provided in Appendix D.

At startup, system manager 302 may send an updated reported network tree to data adaptor 1026 when new device is detected on system bus 926, a device is removed from system bus 926, a sync schedule is created or deleted within system manager 302, and/or a device on system bus 926 is rediscovered due to changes that affect the reported network tree. In some embodiments, system manager 302 includes a data model manager that provides a list of devices and each device's equipment to data platform 1030. Schedule information can also be retrieved and added to the reported network tree. Adding schedule information may include getting a device list, getting top level equipment objects, reading the view definition and inserting the schedules, getting a schedule sync summary, and updating the schedules if needed.

Device Management Portal

Figure 23:
FIGS. 23-24 are user interfaces illustrating a device management portal which can be used by the BMS of FIG. 9, according to some embodiments.
Figure 24:

Referring now to FIGS. 23-24, user interfaces 2300 and 2400 illustrating a device management portal are shown, according to an exemplary embodiment. In some embodiments, the device management portal is generated by data platform 1030 and presented to a user via a web interface. The device management portal may allow a customer to create a user and may allow contractors to log in to the portal. The device management portal can be used to associate device IDs to a particular customer and facilitate replacement of system manager 302 (i.e., replace an old system manager 302 having a device ID with a new system manager 302 having a different device ID).

Interface 2300 is an interface for adding devices. When a device ID is added in the "Enter Device ID" field, data platform 1030 may validate that the device ID is available in the database and is not associated with any customers. If the device ID is not already in use, data platform 1030 may associate the device ID with the customer.

Figure 25:
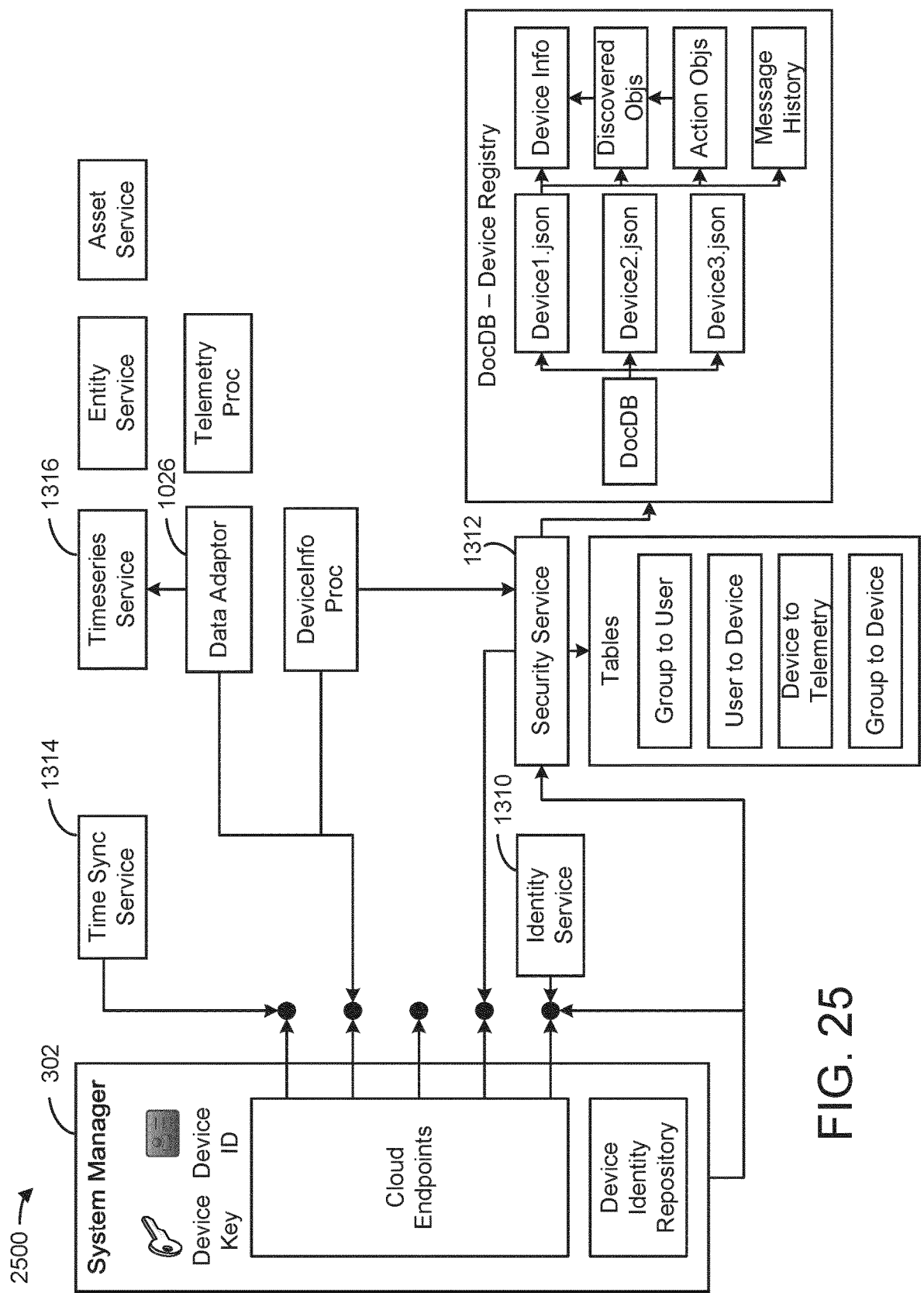
FIGS. 25-26 are block diagrams illustrating a high level process flow performed by the BMS of FIG. 9, according to some embodiments.
Figure 26:
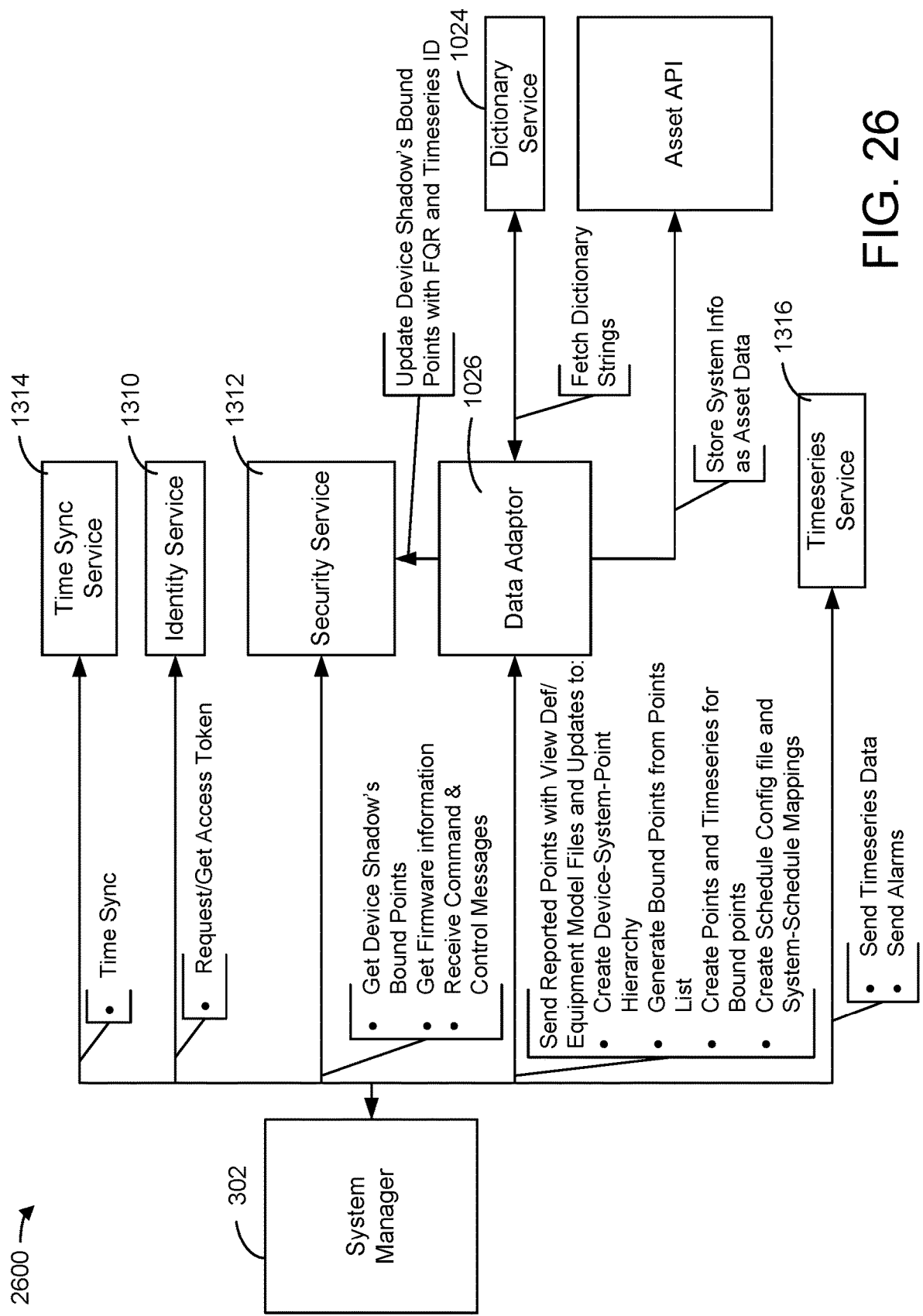

Interface 2400 is an interface for replacing an old device with a new device. When an old device ID is Entered in the "Enter Old Device" field, data platform 1030 may validate the device ID to ensure it is a live system. When a new device is entered in the "Enter New Device" field, data platform 1030 may validate that the device is available in the database and is not associated with any customers. When the save button is selected, the shadow of the old device may be copied into the new device ID shadow so that the shadow becomes the new device's shadow. The device backup file from the old device may also be copied into the backup file in the cloud and can be used as the backup file for the new device. All systems and points attached to the old device can be moved to the new device ID. The device management portal may be configurable to update data adaptor 1026 and send update messages to other applications High Level Process Flow Referring now to FIGS. 25-26, block diagrams 2500 and 2600 illustrating a high level process flow performed by BMS 900 is shown, according to an exemplary embodiment. A manufacturer can log into a manufacturer portal and enter the device ID and get a device key auto-generated from the portal. Once a device ID is created, a device shadow gets automatically be created in cloud platform 901 with blank reported and bound points and with a version 0. The manufacturer can embed the device ID and device key into system manager 302 and can ship system manager 302 to a customer or supplier. The customer admin can log into an enterprise application (e.g., one of cloud applications 1028) and create a user with the role of installation technician. The customer admin can provide credentials to an installation technician to allow the installation technician to install system manager 302 at the customer site. To install system manager 302, the installation technician can log into the enterprise application and adds the device ID to the customer record. The installation technician can then log into the UI of system manager 302 and setup the local time zone for system manager 302.

Once connected to the internet, system manager 302 may initiate a time synchronization with time sync service to get the current time in UTC Format and will store it. All future data transmissions will be based on the time and the time zone of system manager 302. System manager 302 can get the shadow version from cloud platform 901 and store it locally. System manager 302 may request a timeseries ID for device status/heartbeat messages from timeseries service 1316. The timeseries ID can be stored locally in system manager 302 and in the shadow for system manager 302. System manager 302 can be configured to send out "status" messages at a regular frequency (e.g., every 15 mins) to timeseries service 1316 using the status/heartbeat timeseries ID. These messages can be stored for device connection status monitoring and for audit purposes.

System manager 302 can discover the system and equipment connected to it. System manager 302 can request and create timeseries containers from timeseries service 1316 for alarms for the individual connected system/equipment. System manager 302 can store the alarm timeseries IDs locally. System manager 302 can generate a reported network tree from the discovered systems along with the alarm timeseries ID of each system. System manager 302 can sent the reported network tree to data adaptor 1026.

Data adaptor 1026 can use equipment model files and the reported network tree to create a reported points list. Data adaptor 1026 can create a device-system-point hierarchy and store the hierarchy in cloud platform 901. Data adaptor 1026 can generate a list of bound points from a default bound list for each system/equipment. For the bound points, timeseries service 1316 can create timeseries IDs. The point ID to timeseries ID mapping can be stored in cloud platform 901. The bound points along with their timeseries IDs can also be stored in the devices cloud shadow and can be updated when changes of value occur. System manager 302 can synchronize with the shadow by downloading and storing a list of the bound points in local memory. System manager 302 may transmit timeseries data for only the points listed in the bound points list.

When additional systems/equipment are connected to system manager 302, system manager 302 can discover the new systems/equipment and can update the reported network tree. System manager 302 can send the updated reported network tree to data adaptor 1026. Data adaptor 1026 can use the updated reported network tree to generate an updated reported points list. Data adaptor 1026 can generate bound point and timeseries IDs for any new points and can update the device's shadow to be synchronized by system manager 302.

System manager 302 can be configured to transmit telemetry/timeseries data for the points identified in the bound points list. Such data can be sent to timeseries service 1316 along with the timestamp. If the telemetry data contains an enumerated set and an enumerated value, system manager 302 can store the enumerated values as JSON formatted data strings and pass the strings to timeseries service 1316 with the timestamp.

System manager 302 can generate alarm notifications and send the alarm notifications to designated recipients. The alarm notifications can be stored in cloud platform 901 for audit purposes. Alarm messages sent from equipment/systems can be sent to timeseries service 1316. The alarm messages can be stored as JSON formatted enumerated set and enumerated values as string messages. In some embodiments, cloud applications 1028 can send notifications based on the alarm messages to enterprise users.

Command and control messages can be initiated from an enterprise portal and routed to system manager 302 by data platform 1030. At a scheduled time, system manager 302 can log into cloud platform 901 and get the latest firmware information for system manager 302. If the latest firmware information doesn't match the installed firmware version at system manager 302, system manager 302 can download the latest firmware from the URL available in the message.

Personnel can log into the enterprise portal and manually enter the serial number of systems and/or equipment. For some equipment, cloud platform 901 can automatically fetch warranty information from a web service and update the warranty information stored in data platform 1030. Equipment schedules can be pushed by system manager 302 and stored in cloud platform 901. The schedules can be updated in the cloud via the enterprise portal and pushed back to system manager 302. Setpoint changes for the system's bound points can be initiated from the enterprise portal. When a user makes a setpoint change to an item of equipment, the information can be directed to system manager 302 and a response can be stored in cloud platform 901.

In some embodiments, system manager 302 includes a device ID and a hashed key for secure communication. The device ID, key, and/or other password can be encoded to generate a SAS token, which can be transmitted over the network during communications with data platform 1030. For example, the SAS token can be transmitted during timeseries data transmission, equipment alarms transmission, schedule synchronization between system manager 302 and cloud platform 901, and/or modifying setpoints and configuration parameters.

New Device Initial Provisioning

Figure 27:
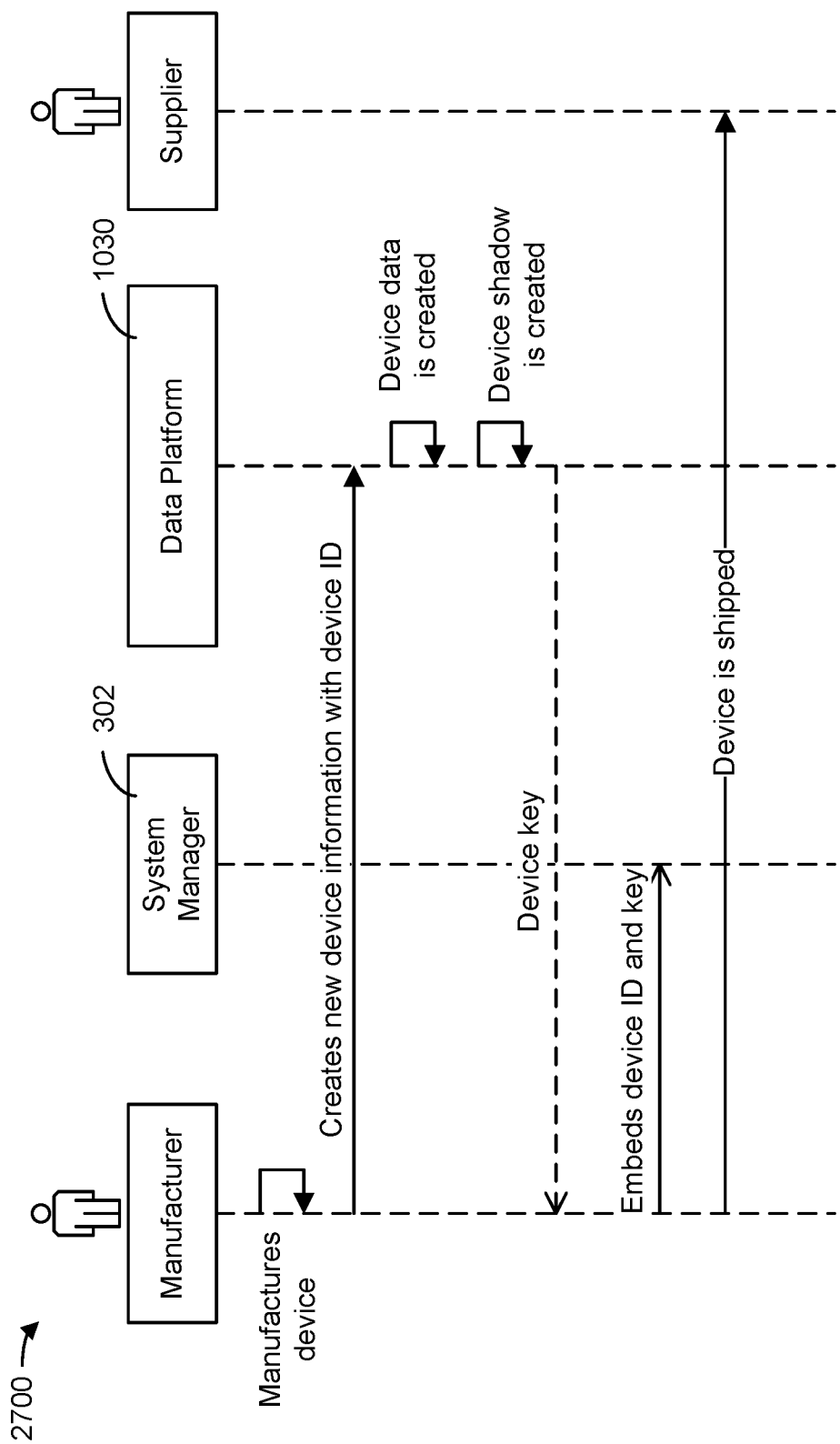
FIG. 27 is a sequence diagram illustrating an initial provisioning process which can be performed by the BMS of FIG. 9, according to some embodiments.

Referring now to FIG. 27, a sequence diagram illustrating an initial provisioning process 2700 is shown, according to an exemplary embodiment. Process 2700 can be performed by a manufacturer, a supplier, and/or one or more components of BMS 900 (e.g., system manager 302, data platform 1030, etc.) to provision system manager 302.

In some embodiments, process 2700 includes device registration. Device registration may include entering the device ID of system manager 302 using a configuration application. The device ID may include a serial number of system manager 302. Data platform 1030 registers the new device with the device ID and generates a key pair. A device shadow can be automatically created in data platform 1030 for system manager 302 (by device ID).

Process 2700 may include device provisioning by a manufacturer. The manufacturer can embed the device key into system manager 302. In data platform 1030, system manager 302 then shows up as manufactured but not associated with a customer. The device ID may be equivalent to the serial ID and may function as a unique identifier that will identify a particular instance of system manager 302. Data platform 1030 can create a device shadow for system manager 302 and store the device shadow in data platform 1030. System manager 302 can then be shipped to a supplier.

At the customer site, the customer logs into cloud applications 1028 and creates a user account for the installation technician. The technician installs system manager 302 device at the site. The technician logs into cloud applications 1028 with the customer provided credential, enters the device ID of system manager 302, and saves the record. This associates system manager 302 with the customer. The installation technician can log into a user interface provided by system manager 302 to setup the device time zone.

New Device Initiation

Figure 28A:
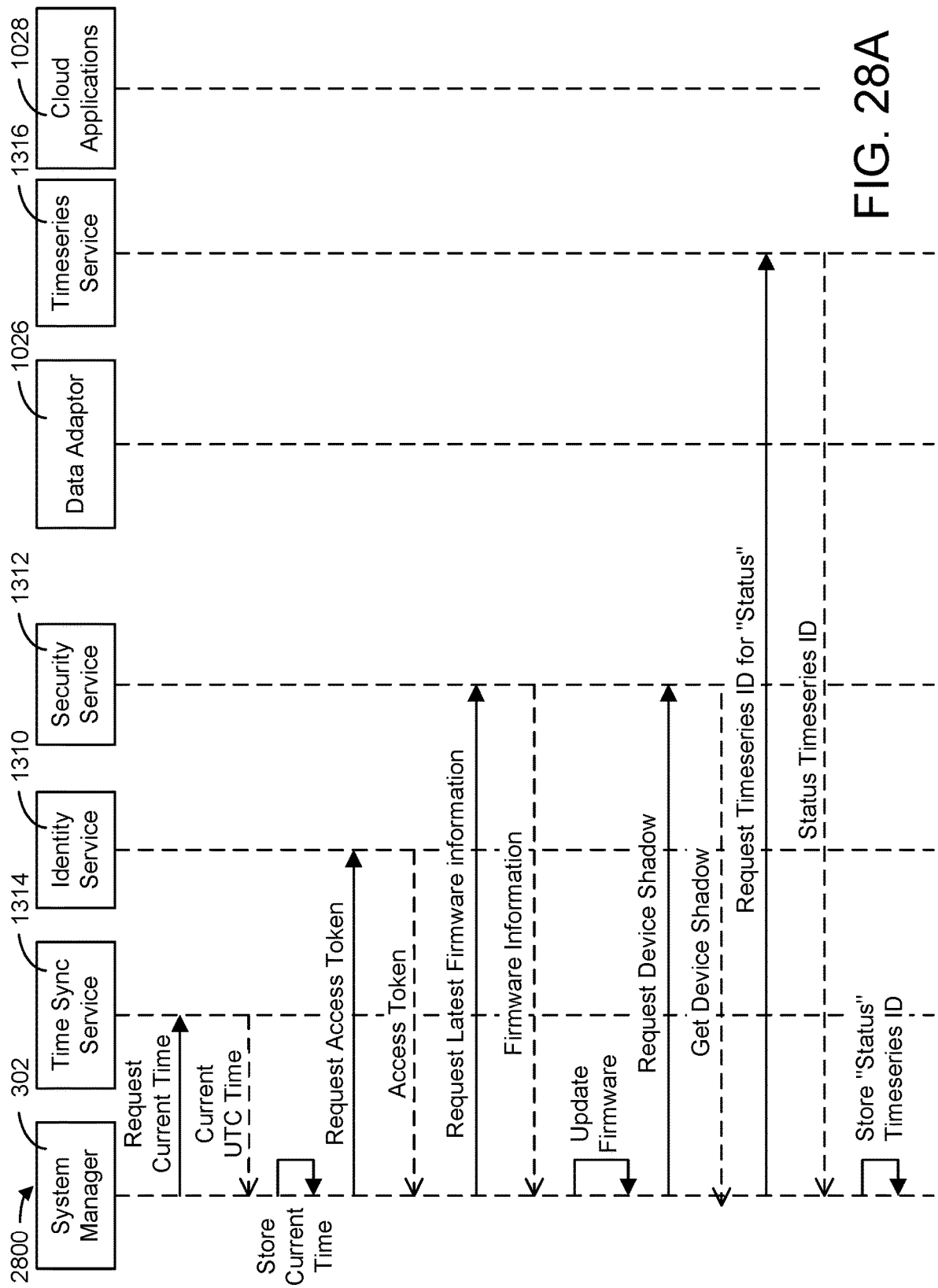
FIGS. 28A-28C are a sequence diagram illustrating a new device initiation process which can be performed by the BMS of FIG. 9, according to some embodiments.
Figure 28B:
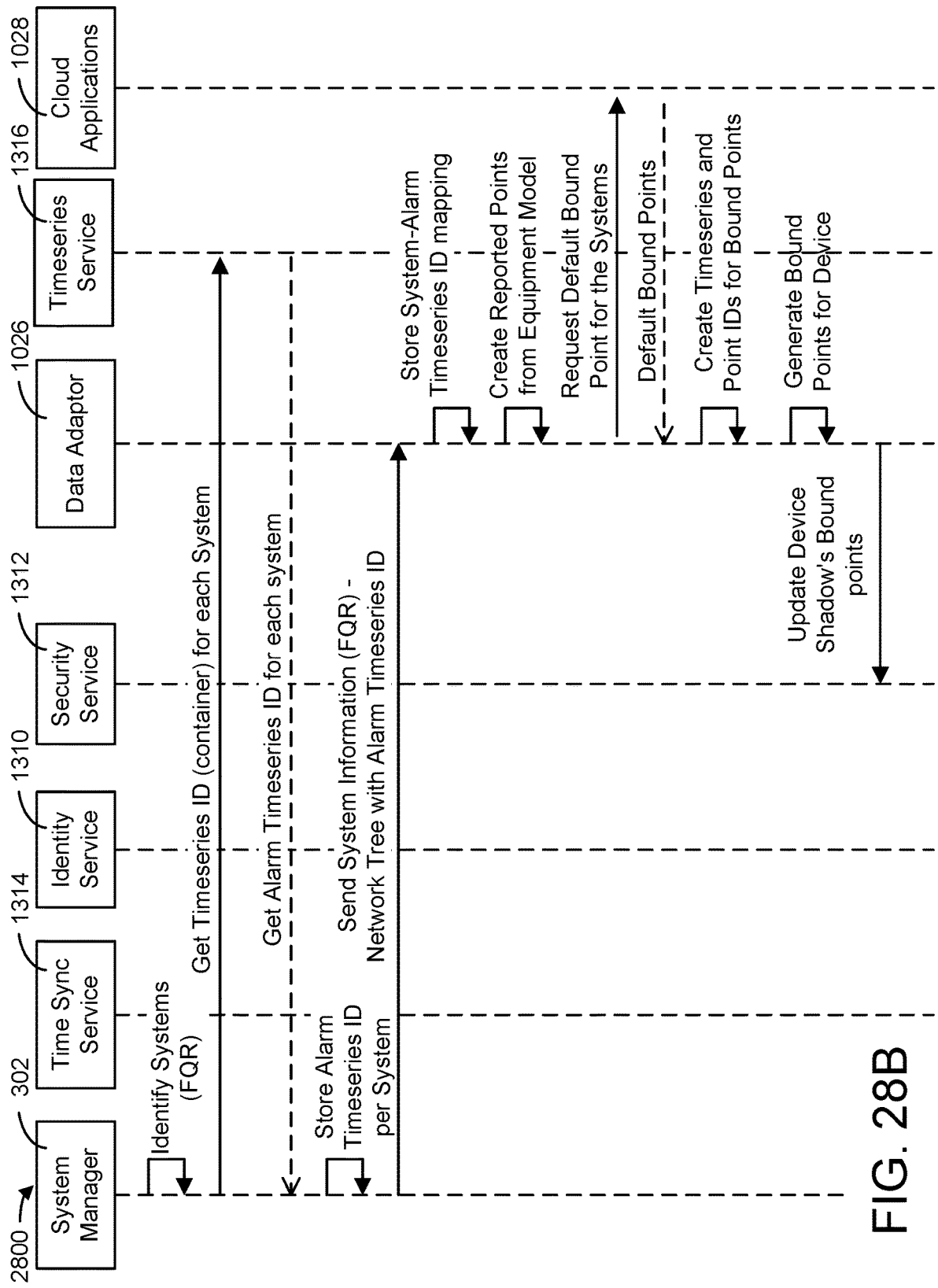
Figure 28C:
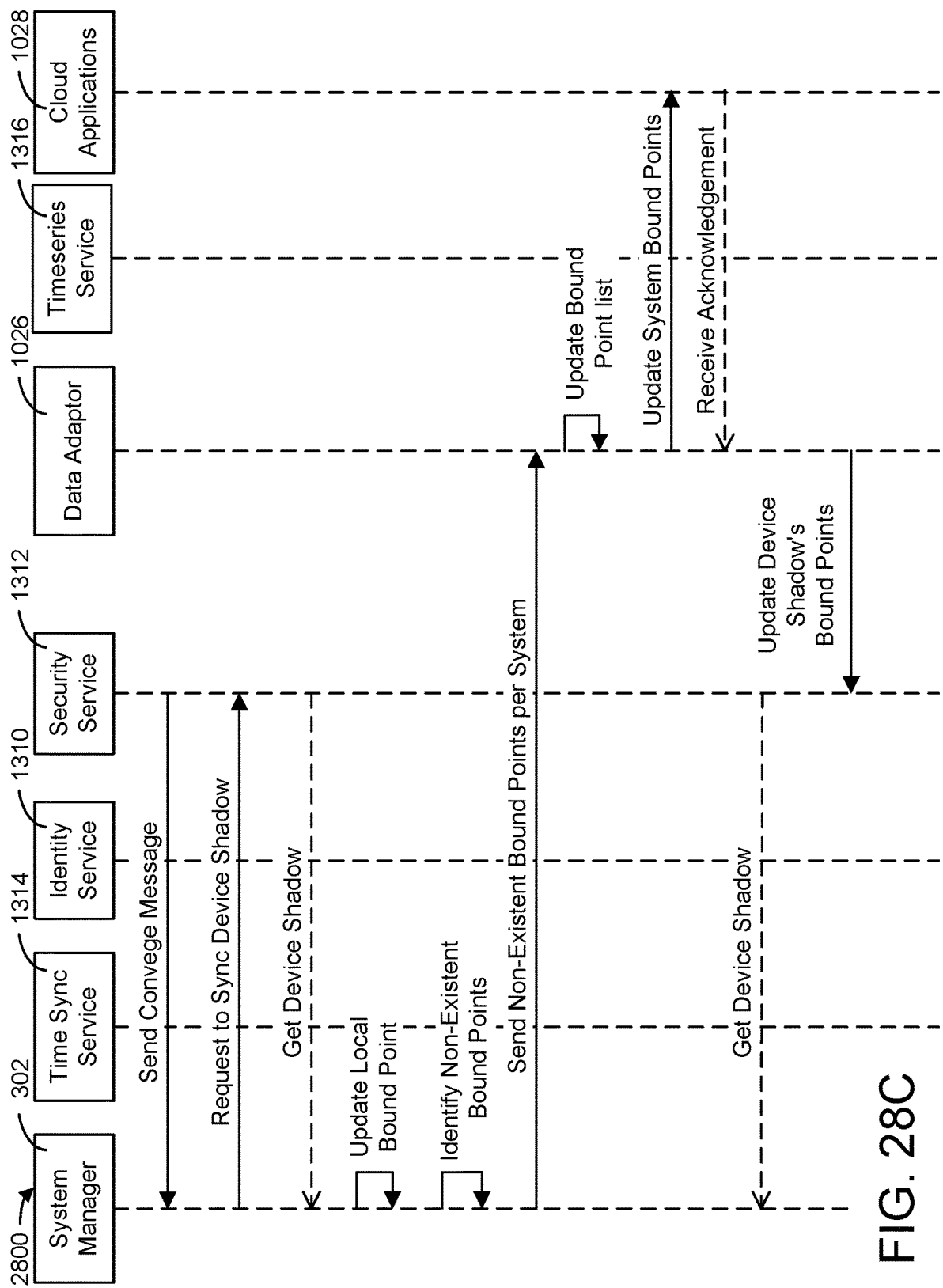

Referring now to FIGS. 28A-28C, a sequence diagram illustrating a new device initiation process 2800 is shown, according to an exemplary embodiment. Process 2800 can be performed by one or more components of BMS 900 (e.g., system manager 302, time sync service 1314, identity service 1310, security service 1312, data adaptor 1026, timeseries service 1316, cloud applications 1028, etc.) to initiate system manager 302 and begin reporting data to cloud platform 901.

Once system manager 302 is installed on a new customer site and connected to the Internet, system manager 302 will request and get the current time from time sync service 1314 and store the time. The time may be returned in ISO 8901 time format. System manager 302 can get an access token using the device ID and device key from identity service 1310. System manager 302 can request and get the latest firmware information from security service 1312. If a later version is available, system manager 302 can download the firmware and install it. System manager 302 can request and sync the latest version of the device shadow from security service 1312.

System manager 302 can request a timeseries ID for a status message from timeseries service 1316. Timeseries service 1316 may return a timeseries ID. The timeseries ID can be stored locally on system manager 302 to send a status timeseries. System manager 302 can update the device shadow with the status timeseries ID. When system manager 302 sends status messages to timeseries service 1316, it sends the timeseries data to the above timeseries IDs In some embodiments, process 2800 includes reported point generation and mapping. Equipment can have thousands of points (i.e., reported points) but cloud applications 1028 may only need a portion of the points (i.e., bound points) for data collection and reporting to cloud platform 901. Once system manager 302 identifies all the systems connected to it, system manager 302 can request timeseries containers for each system for reporting alarms and can store the timeseries ID per system locally. System manager 302 can generate a reported network tree with the status ID for each device and alarm IDs per system. The reported network tree can then be sent to data adaptor 1026.

Once data adaptor 1026 receives the reported network tree with FQR and relevant data, data adaptor 1026 can create system information with system ID, timeseries ID and system FQR. Data adaptor 1026 can create reported points with point ID and point FQRs from the system's equipment model. Data adaptor 1026 can map the alarm timeseries IDs per system and store them in cloud platform 901. Data adaptor 1026 can also create and store a device-system-point hierarchy in cloud platform 901.

In some embodiments, process 2800 includes bound points creation. Once all the reported network tree values are sent to data adaptor 1026, data adaptor 1026 can create bound points for the systems and equipment identified in the reported network tree. Data adaptor 1026 can create timeseries IDs for the bound points and can update the bound points in the device's cloud shadow with the point FQRs and timeseries IDs. System manager 302 can find that there is a more recent version of the shadow in cloud platform 901 and can download the bound points to update its memory.

In some embodiments, process 2800 includes removal of non-existent bound points. Once a system/equipment is live, there will be some points that are assigned as default bound points but are not used in the system. The points not used in the system can be removed so that they do not show up as missing data. To remove non-existent bound points, system manager 302 can get a list of all non-existent bound points. System manager 302 can get an access token from identity service 1310 and send the list of non-existent bound points to data adaptor 1026. In some embodiments, system manager 302 sends data adaptor 1026 the point ID, point FQR, system ID, and/or device ID for any non-existent bound points. Data adaptor 1026 can update the bound point list in cloud applications 1028 by removing the non-existent bound points. Data adaptor 1026 can store the updated bound point list by system and device. Data adaptor 1026 can also update the device's shadow with the updated bound point list. The updated bound point list can then be downloaded by system manager 302 from the device shadow and stored locally.

Timeseries Data Process

Figure 29:
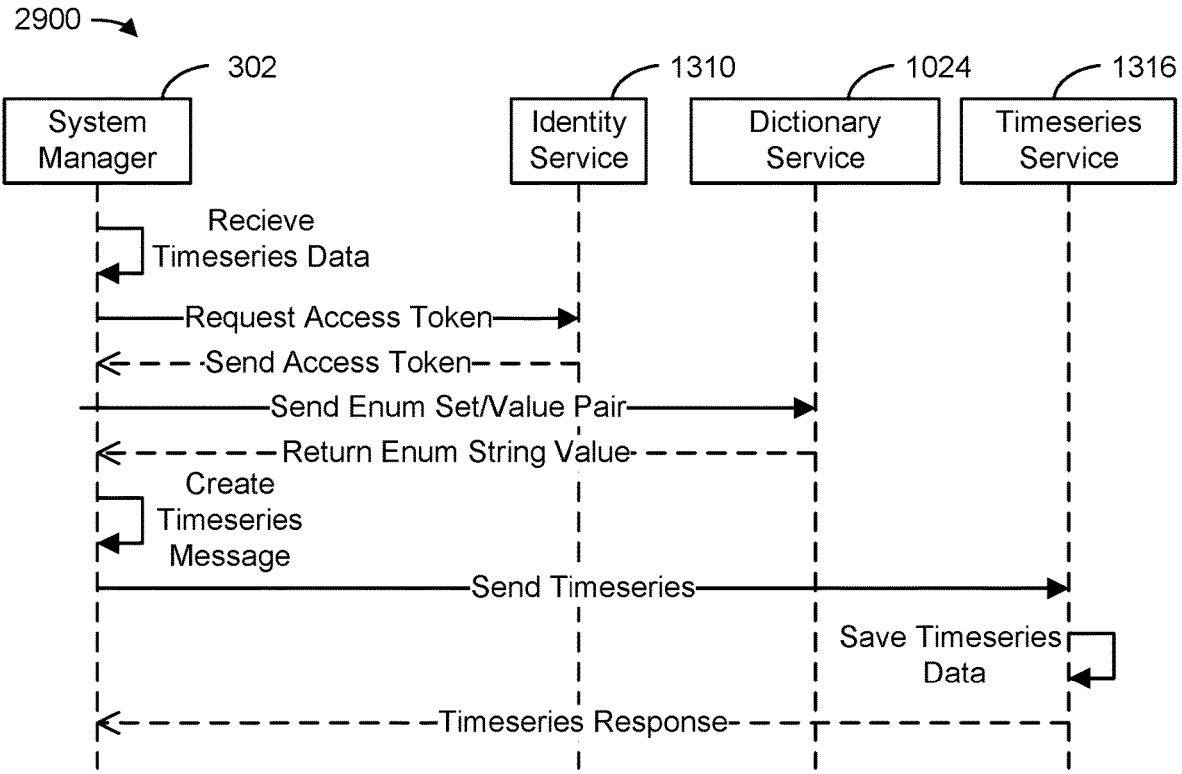
FIG. 29 is a sequence diagram illustrating a timeseries data process which can be performed by the BMS of FIG. 9, according to some embodiments.

Referring now to FIG. 29, a sequence diagram illustrating a timeseries data process 2900 is shown, according to an exemplary embodiment. Process 2900 can be performed by one or more components of BMS 900 to collect and send timeseries data to cloud platform 901. For example, process 2900 can be performed by system manager 302, and/or various components of cloud platform 901 (e.g., identity service 1310, dictionary service 1024, timeseries service 1316, etc.).

When a point in the bound point list generates telemetry data, system manager 302 can receive the timeseries data and send a request for an access token to identity service 1310. System manager 302 can send timeseries service a timeseries ID, the value of the bound point, and a timestamp. Telemetry data can include an enumerated set and an enumerated value pair (e.g., strings). System manager 302 can send the enumerated set and enumerated value dictionary service 1024. Dictionary service 1024 may respond with an enumerated string value. System manager 302 can then send the timeseries data to timeseries service 1316. The timeseries data may include a timeseries ID, a value as a string (e.g., the enumerated string), and a timestamp. Timeseries service 1316 may respond to system manager 302 acknowledging receipt of the timeseries data.

In some embodiments, system manager 302 sends a heartbeat timeseries message to timeseries service 1316 every 15 minutes along with the timestamp. System manager 302 may obtain an access token from identity service 1310 and may send a timeseries message to timeseries service 1316. The timeseries message may include a timestamp, a value, and a status timeseries ID. Timeseries service 1316 may respond with an acknowledgement. The heartbeat timeseries message can be stored as a separate timeseries (i.e., a status timeseries) and can be used to determine whether system manager 302 is online. In some embodiments, cloud applications 1028 use the status timeseries to identify system manager 302 is properly connected to cloud platform 901.

Alarm Process

Figure 30:
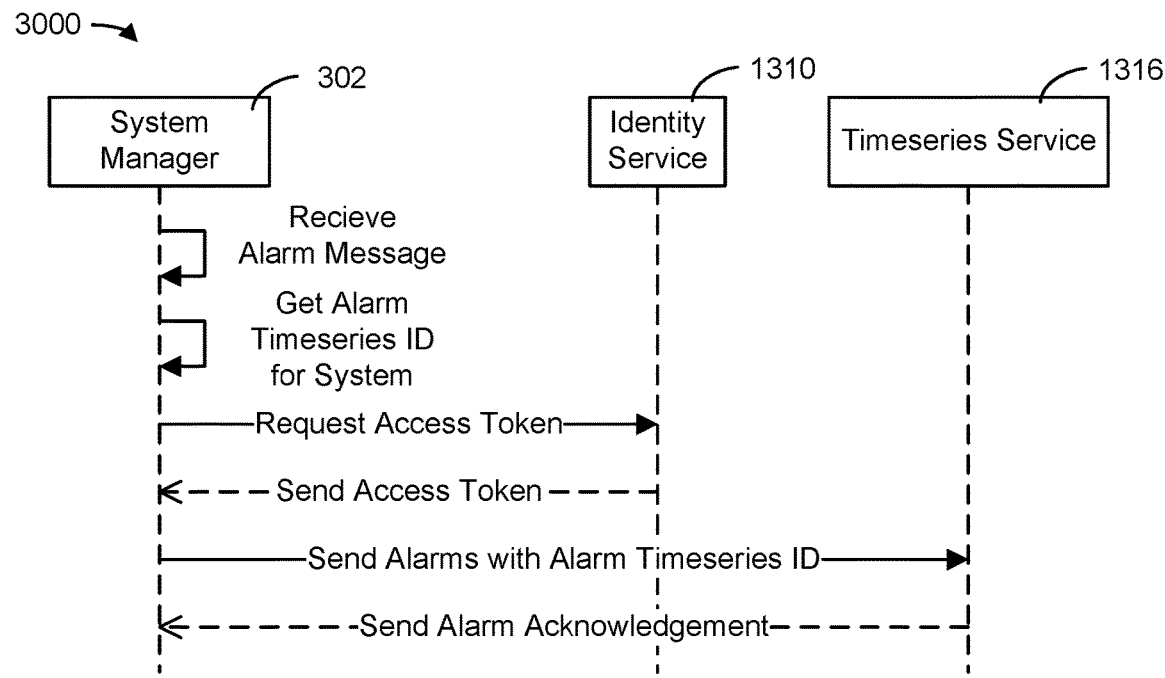
FIG. 30 is a sequence diagram illustrating an alarm process which can be performed by the BMS of FIG. 9, according to some embodiments.

Referring now to FIG. 30, a sequence diagram illustrating an alarm process 3000 is shown, according to an exemplary embodiment. Process 3000 can be performed by one or more components of BMS 900 to provide alarms to cloud platform 901 when a problem or event occurs within a piece of equipment.

A system or equipment can generate alarm data that is sent to system manager 302. When an alarm is triggered by a system/equipment, system manager 302 can send an alarm notification to the customer as configured in system manager 302. System manager 302 can get an alarm timeseries ID for the system/equipment and can obtain an access token from identity service 1310. System manager 302 can send the alarm to timeseries service 1316 along with the alarm timeseries ID and attributes of the alarm. Such attributes may include, for example, alarm priority (e.g., critical, service, service-priority), an enumerated set and enumerated value from dictionary service 1024, and a timestamp. The alarm can be stored as timeseries data by timeseries service 1316. In some embodiments, timeseries service 1316 responds to the alarm message by acknowledging receipt. The alarm data can be viewed by cloud applications 1028.

Warranty Process

Figure 31:
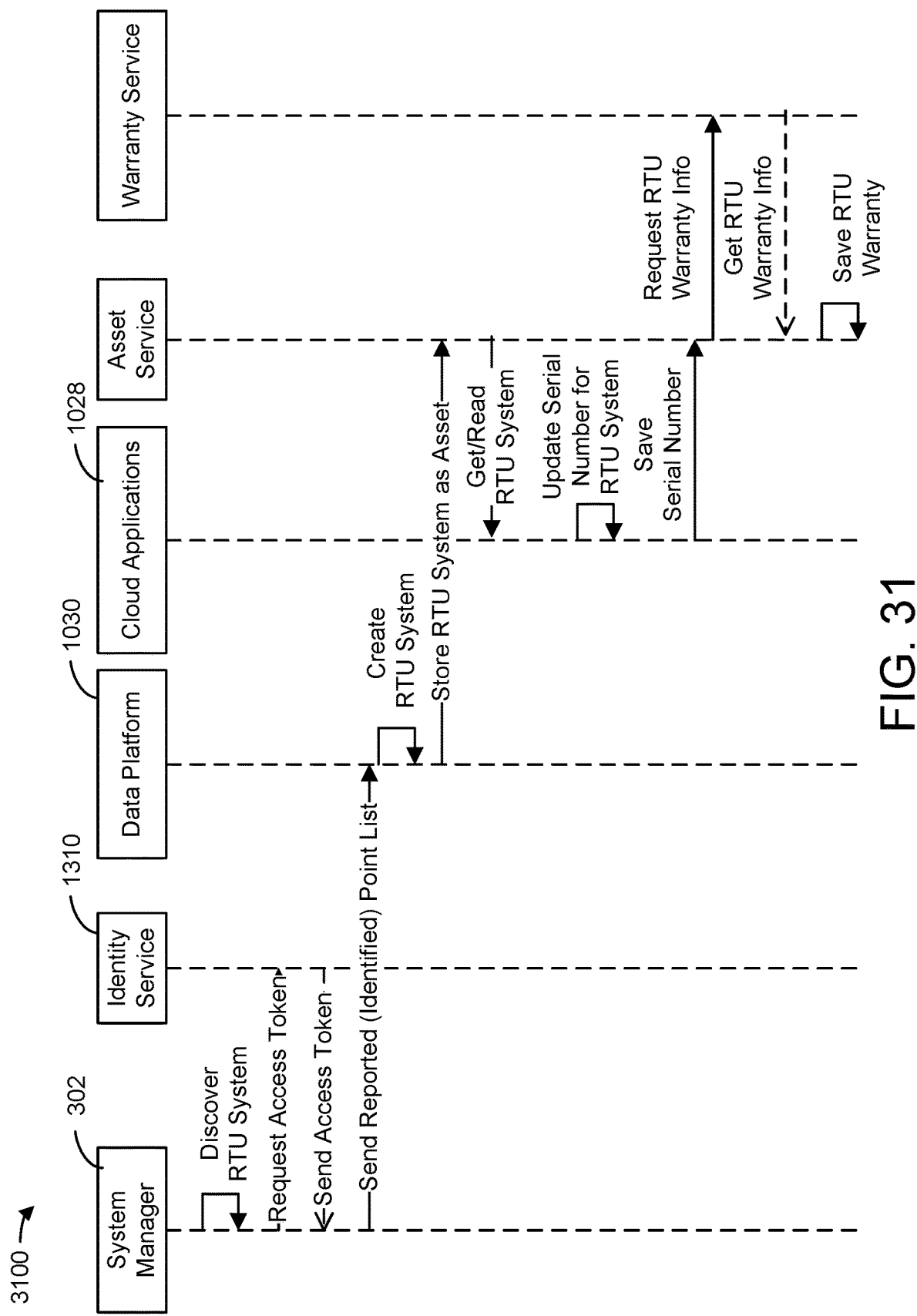
FIG. 31 is a sequence diagram illustrating a warranty process which can be performed by the BMS of FIG. 9, according to some embodiments.

Referring now to FIG. 31, a sequence diagram illustrating a warranty process 3100 is shown, according to an exemplary embodiment. Process 3100 can be performed by one or more components of BMS 900 to obtain warranty information for equipment in BMS 900. For example, process 3100 can be performed by system manager 302, identity service 1310, data platform 1030, cloud applications 1028, an asset service, and/or a warranty service.

When equipment (e.g., a RTU) is connected to system manager 302, a user can log into cloud applications 1028, select the RTU system, and enter a serial number of the RTU. Once a new serial number is saved, data adaptor 1026 can send the system/equipment information to the asset service. At a set schedule (e.g., once per day), the asset service can look for any RTUs from no warranty information. If any records are found, the asset service can connect to a warranty service and retrieve the asset and warranty information of the RTU. The warranty information is then stored in cloud platform 901.

Adding New Systems/Equipment

Figure 32:
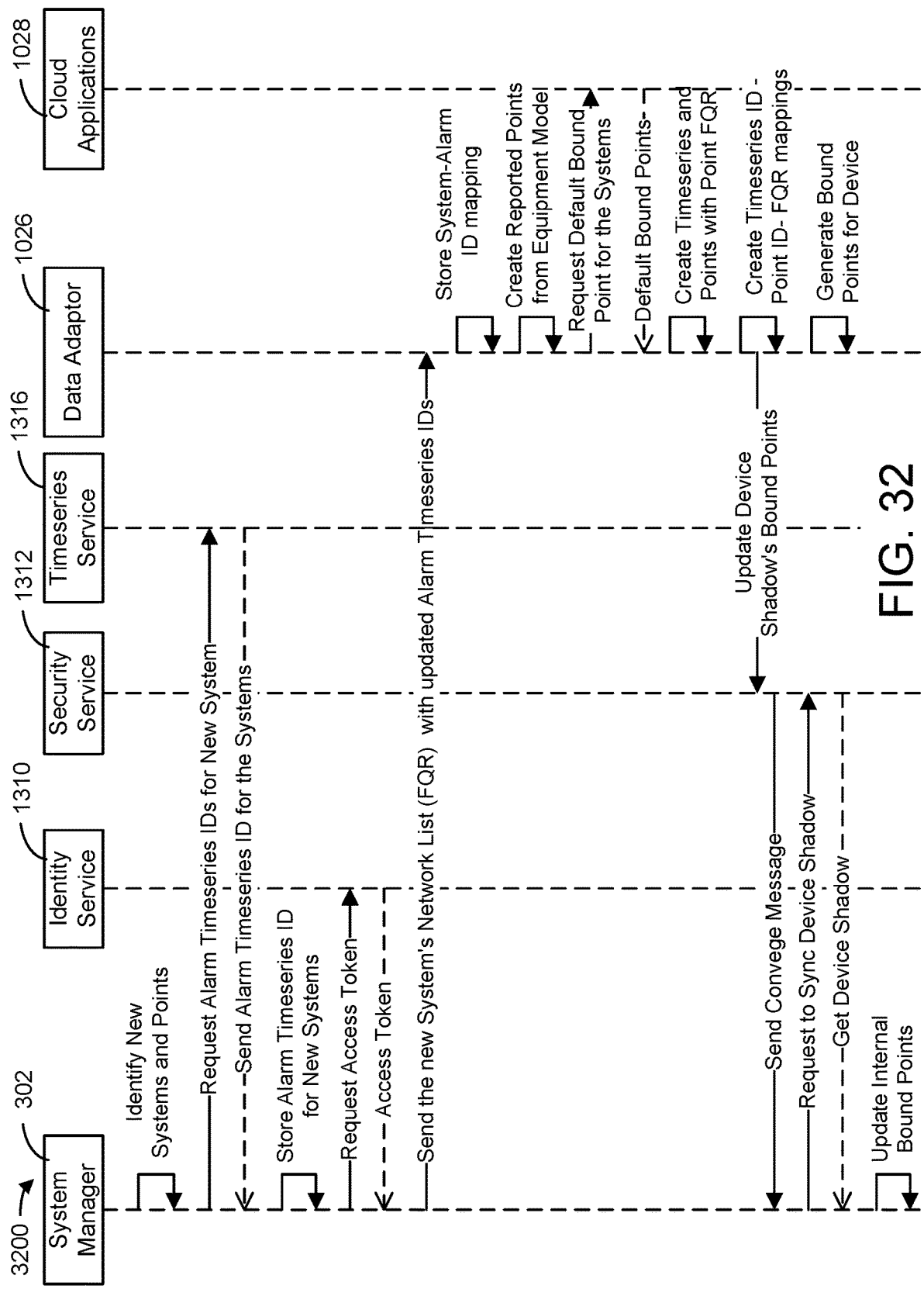
FIG. 32 is a sequence diagram illustrating a process for adding new systems/equipment to the BMS of FIG. 9, according to some embodiments.

Referring now to FIG. 32, a sequence diagram illustrating a process 3200 for adding new systems/equipment to BMS 900 is shown, according to an exemplary embodiment. Process 3200 can be performed by one or more components of BMS 900. For example, process 3200 can be performed by system manager 302, identity service 1310, security service 1312, timeseries service 1316, data adaptor 1026, and/or cloud applications 1028.

When new systems/equipment are connected to system manager 302, system manager 302 can discover the newly added systems/equipment. System manager 302 can get a timeseries (container) ID for the newly added systems/equipment to send alarms and can store the system-alarm timeseries ID locally. System manager 302 can obtain an access token from identity service 1310 and can send the newly discovered system/equipment information to data adaptor 1026 (e.g., as an updated reported network tree).

From the equipment model for the newly added system/equipment, data adaptor 1026 can create a set of reported points for the newly added system/equipment. Data adaptor 1026 can update the device-system-point hierarchy and store it locally. Data adaptor 1026 can then obtain the relevant bound points for the new system/equipment from cloud applications 1028. Data adaptor 1026 can create the necessary points and timeseries data for the bound point list and can generate a timeseries ID-point ID-FQR mapping for any new bound points. Data adaptor 1026 can update the shadow in cloud platform 901 with point FQRs and timeseries ID mapping. System manager 302 can be notified of the updated shadow and can download the latest shadow from security service 1312. System manager 302 can then update the local set of bound points to configure which points are sent to timeseries service 1316.

Setpoint Change Command Process

Figure 33:
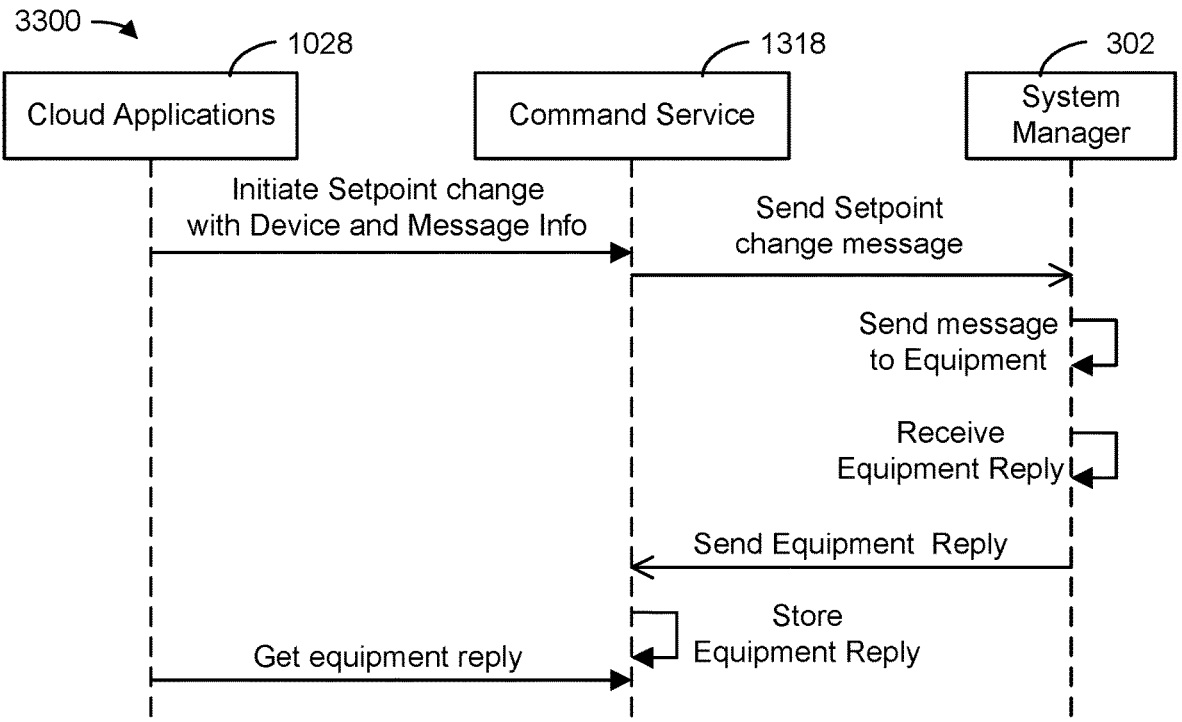
FIG. 33 is a sequence diagram illustrating a process for changing a setpoint in the BMS of FIG. 9, according to some embodiments.

Referring now to FIG. 33, a sequence diagram illustrating a process 3300 for changing a setpoint in BMS 900 is shown, according to an exemplary embodiment. Process 3300 can be performed by one or more components of BMS 900. For example, process 3300 can be performed by cloud applications 1028, command service 1318, and/or system manager 302.

When a setpoint change is initiated by cloud applications 1028, cloud applications 1028 can create a command string message. In some embodiments, the message is formatted in JSON data format. The message may contain a unique ID for the message, a FQR of equipment/point to which the setpoint change is intended, a unit for the setpoint change, and the changed setpoint value. Cloud applications 1028 can send the command message along with the device ID to command service 1318. Command service 1318 can forward the command message to system manager 302 based on the device ID.

System manager 302 can download the message, parse the information, and send it to the appropriate equipment using the FQR. System manager 302 can respond to command service 1318 with a "complete," "reject," or "abandon" message along with a reply message. The response message may include the unique ID, the response (e.g., complete, reject, abandon, etc.), and a status message. Command service 1318 can store the reply message, which indicates the status of the command. Cloud applications 1028 can read the reply message to determine whether the command was successful.

Request Information Command Process

Figure 34:
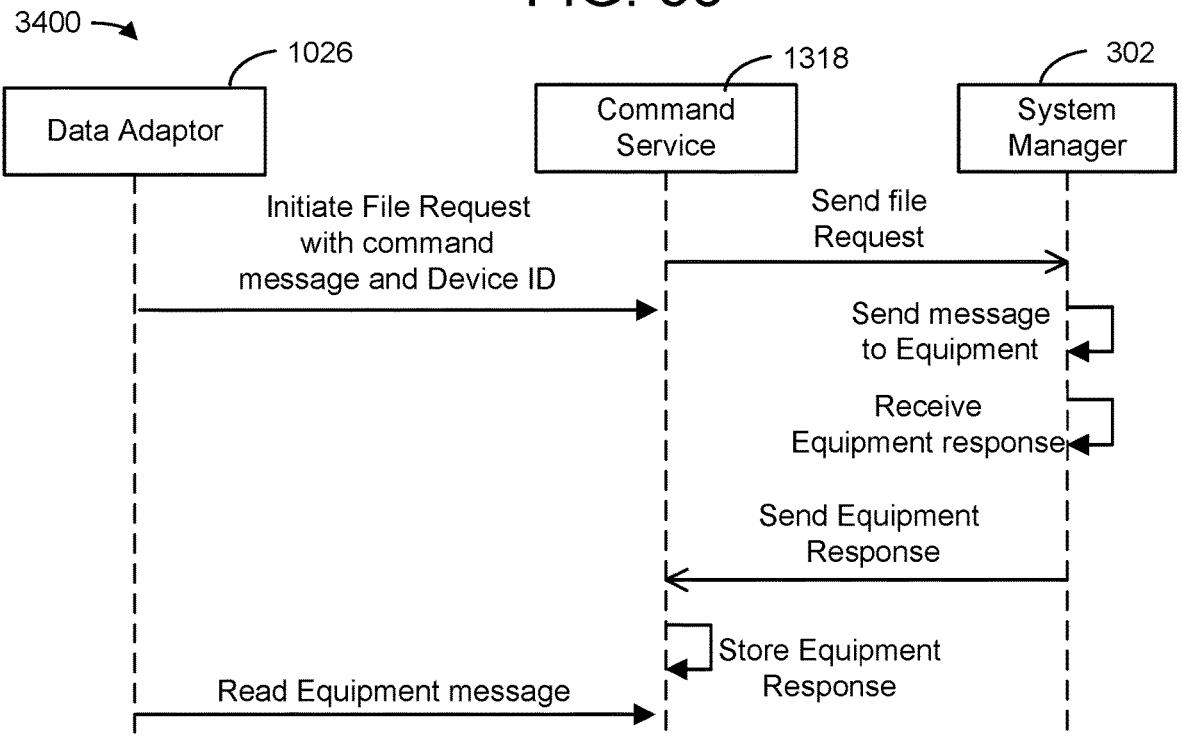
FIG. 34 is a sequence diagram illustrating a process for requesting information in the BMS of FIG. 9, according to some embodiments.

Referring now to FIG. 34, a sequence diagram illustrating a process 3400 for requesting information in BMS 900 is shown, according to an exemplary embodiment. Process 3400 can be performed by one or more components of BMS 900. For example, process 3400 can be performed by data adaptor 1026, command service 1318, and/or system manager 302. In some embodiments, process 3400 is performed when data platform 1030 needs an equipment template that does not already exist in data adaptor 1026.

Data adaptor 1026 can create a command message to get information from system manager 302. The command message may contain a unique ID, a request command message, and a system to which the message is intended (e.g., a FQR). Data adaptor 1026 can send the command message to command service 1318 along with the device ID. System manager 302 can receive the message, parse the message to identify the equipment information requested, and send the message to the appropriate equipment. System manager 302 can respond to command service 1318 with a "complete," "reject," or "abandon" message along with a reply message. Command service 1318 can store the reply message. In some embodiments, the reply message includes the equipment template in JSON format.

Update Bound Points Process

Referring now to FIG. 35, a sequence diagram illustrating a process 3500 for updating bound points in BMS 900 is shown, according to an exemplary embodiment. Process 3500 can be performed by one or more components of BMS 900. For example, process 3500 can be performed by an enterprise user, cloud applications 1028, security service 1312, and/or system manager 302.

When system manager 302 sends a reported network tree to data adaptor 1026, data adaptor 1026 can store the reported points and generate a list of bound points based on a predetermined (e.g., default) set of bound points per system/equipment. The bound points define the set of points for which system manager 302 will transmit timeseries data to cloud platform 901. A user can log into cloud applications 1028, select the system, and update the default bound points for a given system/equipment.

As shown in FIG. 35, an enterprise user logs into cloud applications 1028 and selects the system to view the list of reported points and bound points. The enterprise user can change the bound points list. If the bound points selected do not exist in the database, new points and timeseries can be created for new bound points. For bound points that are unselected, timeseries data may be retained (i.e., not deleted) in cloud platform 901. Cloud applications 1028 can update the bound points in the shadow of system manager 302 stored within security service 1312. The shadow version gets updated and a converge message is sent to system manager 302. System manager 302 downloads the updated shadow and updates the local list of bound points to match the bound point list in the shadow.

Referring now to FIG. 36, an example of a user interface 3600 for selecting bound points is shown, according to an exemplary embodiment. The enterprise user can select and deselect points via user interface 3600 to define which points are included in the bound point list. The selections made via user interface 3600 can be sent to security service 1312 to update the shadow for system manager 302.

Software Update Process

Referring now to FIG. 37, a sequence diagram illustrating a process 3700 for updating the software or firmware of system manager 302 is shown, according to an exemplary embodiment. Process 3700 can be performed by one or more components of BMS 900. For example, process 3700 can be performed by system manager 302 and/or security service 1312.

To check for the latest firmware, system manager 302 can obtain an access token from identity service 1310. In some embodiments, the access token is obtained at a preset schedule. System manager 302 can obtain the latest firmware/software version information from security service 1312. If the most recent firmware/software version does not match the version installed on system manager 302, system manager 302 can download the firmware/software file from a URL specified by security service 1312 and can install it. System manager 302 can then update the internal firmware/software version number to match the installed version.

Schedule Synchronization Process

Figure 38:
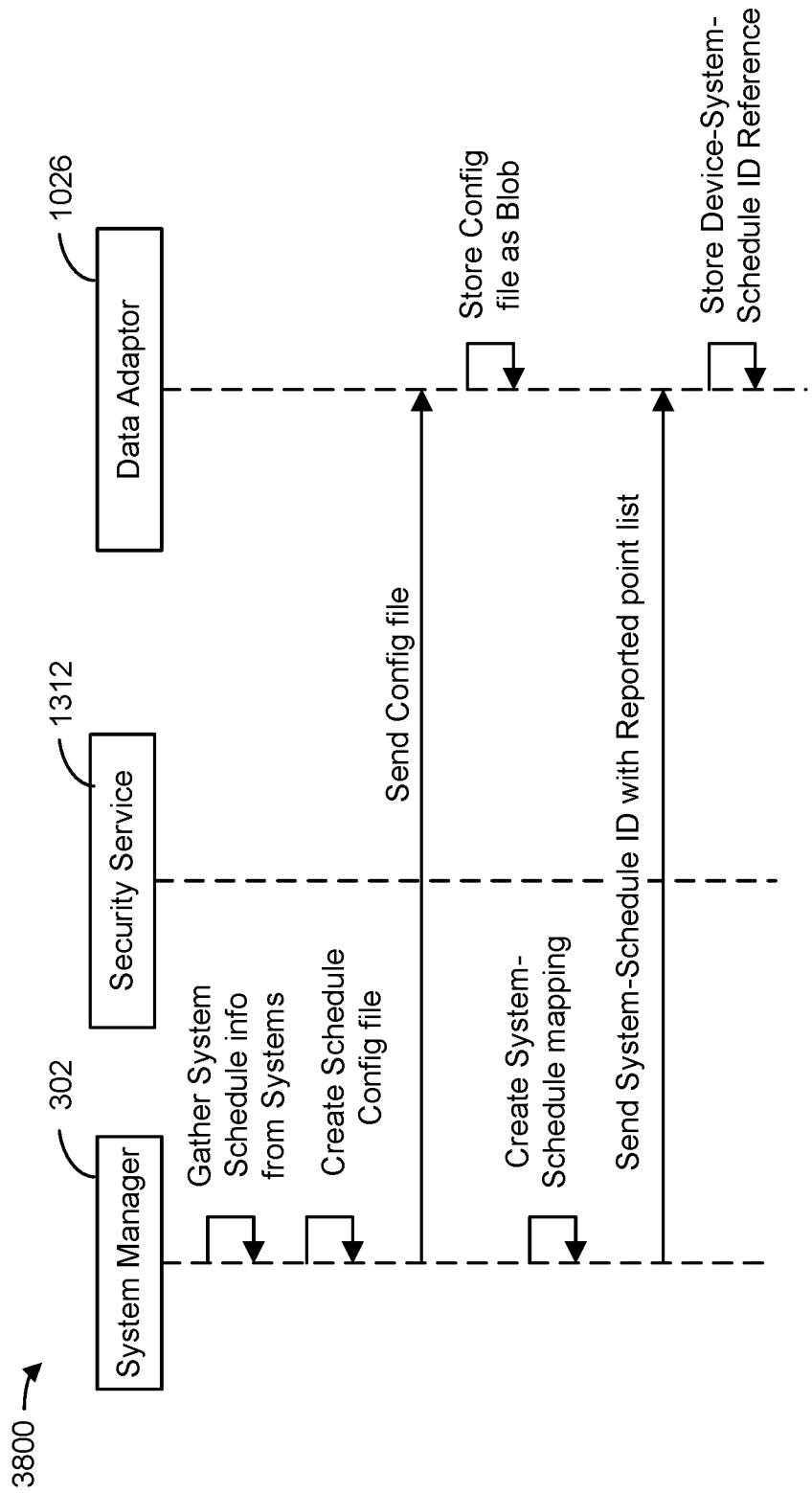
FIG. 38 is a sequence diagram illustrating a process for synchronizing schedules in the BMS of FIG. 9, according to some embodiments.

Referring now to FIG. 38, a sequence diagram illustrating a process 3800 for synchronizing schedules in BMS 900 is shown, according to an exemplary embodiment. Process 3800 can be performed by one or more components of BMS 900. For example, process 3800 can be performed by system manager 302, security service 1312, and or data adaptor 1026.

System manager 302 can obtain schedule information from all attached systems/equipment that contains a synchronized schedule and can store the schedule information in a configuration file. Each schedule in the schedule configuration is identified by a schedule ID. The schedule configuration file can be sent to data adaptor 1026. Data adaptor 1026 can store the schedule configuration file in a blob and update the device shadow's reported section with a timestamp.

System manager 302 can create a system-schedule ID mapping and can create or update a reported point list containing a schedule reference ID (e.g., "Synced with schedule ID: 3"). The reported point list generated by system manager 302 can be sent to data adaptor 1026. Data adaptor 1026 can use the reported point list's schedule ID to map device, system, point, and schedule ID and can store the mapping locally.

Device Schedule Update Process

Figure 39:
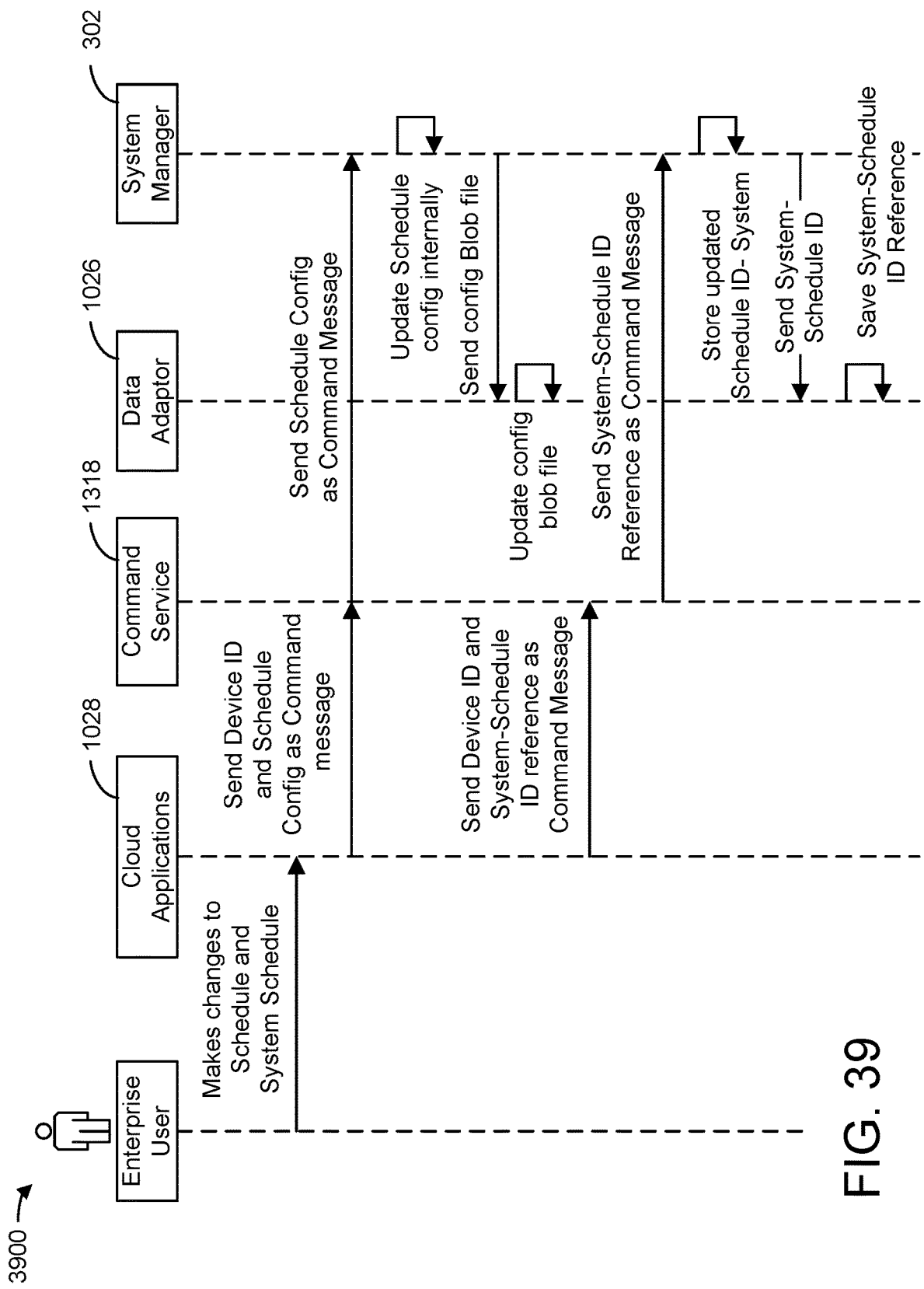
FIG. 39 is a sequence diagram illustrating a process for updating a device schedule via cloud applications in the BMS of FIG. 9, according to some embodiments.

Referring now to FIG. 39, a sequence diagram illustrating a process 3900 for updating a device schedule via cloud applications 1028 is shown, according to an exemplary embodiment. Process 3900 can be performed by one or more components of BMS 900. For example, process 3900 can be performed by an enterprise user, cloud applications 1028, command service 1318, data adaptor 1026, and/or system manager 302.

When an enterprise user logs into cloud applications 1028 and pulls up the system/equipment per site, the user will be able to view the schedule. The schedule may be generated by the system's schedule ID and the schedule configuration information. When a schedule gets updated by a user via cloud applications 1028, cloud applications 1028 may create a schedule configuration file and send the schedule configuration file to command service 1318 as a command message along with the device ID. Command service 1318 can send the command message to system manager 302 based on the device ID. System manager 302 can store the schedule configuration file internally and send the schedule configuration file to data adaptor 1026. Data adaptor 1026 can store the schedule configuration file in cloud platform 901 and can update the cloud shadow's configuration file reference.

When the system-schedule ID reference is modified via cloud applications 1028, a command message can be created by cloud applications 1028 with the schedule ID and system information. The command message can be sent to command service 1318 along with the device ID. System manager 302 can store and process the updated schedule ID-system information. System manager 302 can send an updated reported point list with the new system-schedule ID mapping to data adaptor 1026. Data adaptor 1026 can then update system manager 302 with its new system-schedule ID mappings.

Device Backup and Restore Process

Figure 40:
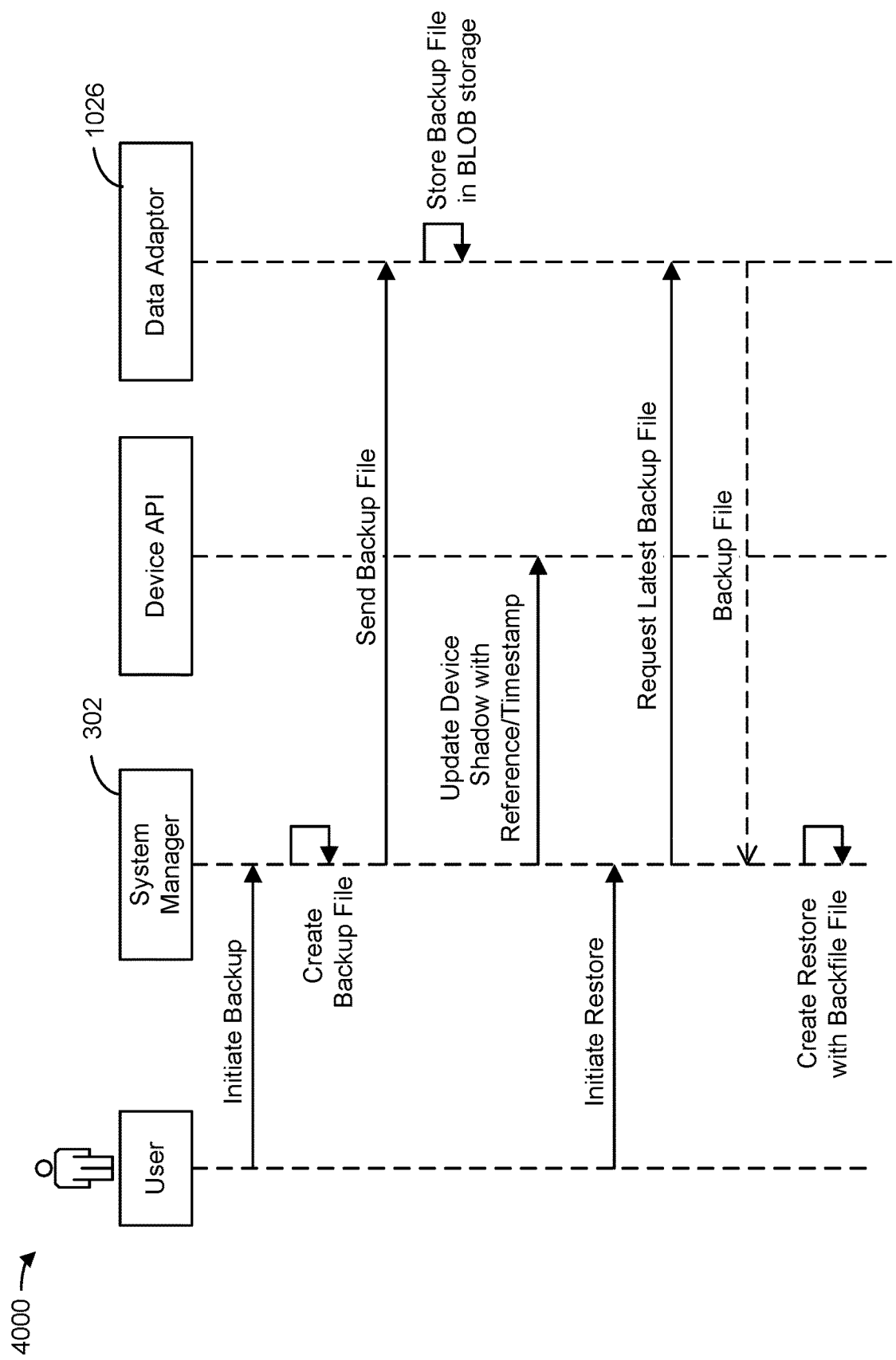
FIG. 40 is a sequence diagram illustrating a process for backing up and restoring the configuration of the system manager of FIG. 9, according to some embodiments.

Referring now to FIG. 40, a sequence diagram illustrating a process 4000 for backing up and restoring the configuration of system manager 302 is shown, according to an exemplary embodiment. A user can create a device backup for system manager 302 and store it in cloud platform 901. The cloud backup can then be used to restore the configuration of system manager 302 when needed. Process 4000 can be performed by one or more components of BMS 900. For example, process 4000 can be performed by system manager 302, a device API, and data adaptor 1026.

A user can initiate a backup of system manager 302, which causes system manager 302 to create a backup file. System manager 302 can send the backup file to data adaptor 1026. Data adaptor 1026 then stores the backup file and updates the device shadow with a reference timestamp. When the user initiates a restoration of system manager 302, system manager 302 downloads the latest backup file from data adaptor 1026 and installs the backup.

APPENDIX A

Reported Network Tree Example

```
{
  "Reported Network Tree": {
    "Sync Schedules": [{
      "Sync Schedule Name": "Office Schedule",
      "Sync Schedule FQR ID": "SyncSched7",
      "Schedule Config Ref": "SchedConfig1"
    }, {
      "Sync Schedule Name": "Common Area Schedule",
      "Sync Schedule FQR ID": "SyncSched3",
      "Schedule Config Ref": "SchedConfig2"
    }],
    "Network Tree": [{
      "Network FQR ID": "Local MSTP Field Bus",
      "Devices": [{
        "Device Name": "Office Zoning System",
        "Device FQR ID": "Local MSTP Field Bus.JCI-5",
        "Device Model": "VZC100",
        "Equipment and Control Systems": [{
          "Control System Name": "Verasys Zoning System",
          "Control System FQR ID": "Local MSTP Field Bus.JCI-5.Verasys Zone Coordinator",
          "Control System Template": "Equipment_Verasys_Zone_Coordinator_v1_1.0.0.1003",
          "Control System Alarm TS ID": "Alarm-TS-1",
          "Schedules": [{
            "Schedule FQR ID": "Local MSTP Field Bus.JCI-5.Schedule",
            "Schedule Config Ref": "SchedConfig1"
```

APPENDIX A-continued

Reported Network Tree Example

```
}] },
{
 "Equipment Name": "Sheldons Office",
 "Equipment FQR ID": "Local MSTP Field Bus.JCI-5.Zone-1",
 "Equipment Template": "Equipment_Verasys_Zone_v1_1.0.0.4023",
 "Equipment Alarm TS ID": "Alarm-TS-2"
}, {
 "Equipment Name": "Office Area RTU",
 "Equipment FQR ID": "Local MSTP Field Bus.JCI-5.York RTU",
 "Equipment Template": "Equipment_York_RTU_v1_2.0.0.2042",
 "Equipment Alarm TS ID": "Alarm-TS-3"
}, {
 "Equipment Name": "Pennys Office",
 "Equipment FQR ID": "Local MSTP Field Bus.JCI-5.Zone-2",
 "Equipment Template": "Equipment_Verasys_Zone_v1_1.0.0.4023",
 "Equipment Alarm TS ID": "Alarm-TS-4"
} ] }, {
"Device Name": "Conference Room Zoning System",
"Device FQR ID": "Local MSTP Field Bus.JCI-6",
"Device Model": "VZC100",
"Equipment and Control Systems": [{
 "Control System Name": "Verasys Zoning System",
 "Control System FQR ID": "Local MSTP Field Bus.JCI-6.Verasys Zone Coordinator",
 "Control System Template": "Equipment_Verasys_Zone_Coordinator_v1_1.0.0.1003",
 "Control System Alarm TS ID": "Alarm-TS-5",
 "Schedules": [{
  "Schedule FQR ID": "Local MSTP Field Bus.JCI-6.Schedule",
  "Schedule Config Ref": "SchedConfig3"
 }] }, {
 "Equipment Name": "B7F3 N Conf",
 "Equipment FQR ID": "Local MSTP Field Bus.JCI-6.Zone-1",
 "Equipment Template": "Equipment_Verasys_Zone_v1_1.0.0.4023",
 "Equipment Alarm TS ID": "Alarm-TS-6"
}, {
 "Equipment Name": "B7F4 N Conf",
 "Equipment FQR ID": "Local MSTP Field Bus.JCI-6.Zone-2",
 "Equipment Template": "Equipment_Verasys_Zone_v1_1.0.0.4023",
 "Equipment Alarm TS ID": "Alarm-TS-7"
}, {
 "Equipment Name": "Conference Room RTU",
 "Equipment FQR ID": "Local MSTP Field Bus.JCI-6.York RTU",
 "Equipment Template": "Equipment_York_RTU_v1_2.0.0.2042",
 "Equipment Alarm TS ID": "Alarm-TS-8"
}]
}, {
"Device Name": "Gym",
"Device FQR ID": "Local MSTP Field Bus.JCI-8",
"Device Model": "SE_SPU1001",
"Equipment and Control Systems": [{
 "Equipment Name": "Gym RTU",
 "Equipment FQR ID": "Local MSTP Field Bus.JCI-8.York RTU",
 "Equipment Template": "Equipment_York_RTU_v1_2.0.0.2042",
 "Equipment Alarm TS ID": "Alarm-TS-9",
 "Schedules": [{
  "Schedule FQR ID": "Local MSTP Field Bus.JCI-8.Schedule",
  "Schedule Config Ref": "SchedConfig1"
 }] }] }, {
"Device Name": "Lobby",
"Device FQR ID": "Local MSTP Field Bus.JCI-9",
"Device Model": "PEAK18",
"Equipment and Control Systems": [{
 "Equipment Name": "Lobby Occupied Lighting",
 "Equipment FQR ID": "Local MSTP Field Bus.JCI-9.Lighting Zone 1",
 "Equipment Template": "Equipment_Lighting_Controller_v1_1.0.0.1073",
 "Equipment Alarm TS ID": "Alarm-TS-10",
 "Schedules": [{
  "Schedule FQR ID": "Local MSTP Field Bus.JCI-9.Schedule 1",
  "Schedule Config Ref": "SchedConfig2"
 }, {
  "Schedule FQR ID": "Local MSTP Field Bus.JCI-9.Schedule 2",
  "Schedule Config Ref": "SchedConfig4"
 }] }, {
 "Equipment Name": "Lobby After Hours Lighting",
 "Equipment FQR ID": "Local MSTP Field Bus.JCI-9.Lighting Zone 2",
 "Equipment Template": "Equipment_Lighting_Controller_v1_1.0.0.1073"
 "Equipment Alarm TS ID": "Alarm-TS-11"
}, {
 "Equipment Name": "Lobby Weekend Lighting",
```

APPENDIX A-continued

Reported Network Tree Example

```
 "Equipment FQR ID": "Local MSTP Field Bus.JCI-9.Lighting Zone 3",
 "Equipment Template": "Equipment_Lighting_Controller_v1_1.0.0.1073"
 "Equipment Alarm TS ID": "Alarm-TS-12"
}] }, {
"Device Name": "Showcase",
"Device FQR ID": "Local MSTP Field Bus.JCI-10",
"Device Model": "SE-TEC3000-0",
"Equipment and Control Systems": [{
  "Equipment Name": "Showcase Thermostat",
  "Equipment FQR ID": "Local MSTP Field Bus.JCI-10.TEC",
  "Equipment Template": "Equipment_Advanced_Control_Status_v1_3.0.0.1017_TEC",
  "Equipment Alarm TS ID": "Alarm-TS-13",
  "Schedules": [{
    "Schedule FQR ID": "Local MSTP Field Bus.JCI-10.Schedule",
    "Schedule Config Ref": "SchedConfig2"
}] }] }] } }
```

APPENDIX B

Bound List Example

```
{
  "Bound": [
     {"FQR ID": "Local MSTP Field Bus.JCI-5.Zone-1:7021", "Time Series ID": "Bound-TS-1"},
     {"FQR ID ": "Local MSTP Field Bus.JCI-5.Zone-2:7021", "Time Series ID": "Bound-TS-2"},
     {"FQR ID ": "Local MSTP Field Bus.JCI-8.York RTU.HVAC Zone:8888", "Time Series ID": "Bound-TS-3"}
  ]
}
```

APPENDIX C

Equipment Model Template Example

```
{
  "Version": "3.0.0.1017_TEC",
  "Template": [
    {
      "-type": 0,
      "-subtype": 38,
      "-dictionary": "1.0.0.1664",
      "-name": "Advanced Control Status",
      "-description": "Advanced Control Status Template",
      "-ID": "Equipment_Advanced_Control_Status_v1",
      "-presentValueAttributeId": 7000,
      "-PropertyList": {
        "-Property": [
          {
            "-ID": 7000,
            "-Required": 1,
            "-WritableFlag": 0,
            "-Name": {
              "-setId": 1675,
              "-value": 574
            },
            "-DataType": 4,
            "-IPUnits": {
              "-setId": 507,
              "-value": 98
            },
            "-SIUnits": {
              "-setId": 507,
              "-value": 98
            },
            "-IPDisplayPrecision": 6,
            "-SIDisplayPrecision": 6
          },
          {
            "-ID": 7004,
            "-Required": 1,
            "-WritableFlag": 0,
```

APPENDIX C-continued

Equipment Model Template Example

```
            "-Name": {
              "-setId": 1675,
              "-value": 582
            },
            "-DataType": 9,
            "-StringsetId": 854
          },
          ...
```

Below is a portion of a equipment model template for a thermostat controller. Property 7000 is of Float data type, and Property 7004 is of Enum data type.

APPENDIX D

Command Example

```
Write Property Command - Float Data Type
{
  "commandRef": <someUniqueMessageId>,
  "commandName": "writeProperty",
  "commandParameters": {
    "propertyToWrite": {
      "networkReference": "LocalFieldBus",
      "deviceReference": "JCI-12",
      "objectReference": "TEC.Setpoints",
      "propertyId": 7000 },
    "valueToWrite": 73.3,
    "dataType": 4,
    "units": 64
  }
}
Write Property Command—Enum Data Type
{
  "commandRef": <someUniqueMessageId>,
  "commandName": "writeProperty",
  "commandParameters": {
    "propertyToWrite": {
      "networkReference": "LocalFieldBus",
      "deviceReference": "JCI-17",
      "objectReference": "TEC.Equipment Setup",
      "propertyId": 8012 },
    "valueToWrite": 1,
    "dataType": 9,
    "enumSet": 1684
  }
}
Get Equipment Model Template Command
{
  "commandRef": <someUniqueMessageId>,
  "commandName": "getDataModelTemplate",
  "commandParameters": { "TemplateID":
  "Equipment_York_RTU_v1_2.0.0.2042" }
```

APPENDIX D-continued

Command Example

```
}
Schedule Config Change Command
{
"commandRef": <someUniqueMessageId>,
 "commandName": "scheduleConfigChange",
 "commandParameters": {
  "scheduleConfigRef": <someGUID>,
  "weeklySchedule": { <weekly schedule in same json schema as
  schedule config> }
 }
}
```

APPENDIX D

Schedule Configuration Example

```
Sync Schedule
{
 "type": "Sync",
 "synchronized schedules": [
  { "networkReference": "LocalFieldBus",
   "deviceReference": "JCI-4",
   "objectReference": "Schedule 1" } ],
 "weekly schedule": {
  { "sunday": [
   { "time": {"hour": 8, "minute": 0}, "value": 0 },
   { "time": {"hour": 12, "minute": 0}, "value": 1 },
   { "time": {"hour": 13, "minute": 0}, "value": 0 },
   { "time": {"hour": 17, "minute": 0}, "value": 1 }
  ] },
  { "monday": [
   { "time": {"hour": 8, "minute": 0}, "value": 0 },
   { "time": {"hour": 17, "minute": 0}, "value": 1 }
  ] },
  { "tuesday": [
   { "time": {"hour": 8, "minute": 0}, "value": 0 },
   { "time": {"hour": 17, "minute": 0}, "value": 1 }
  ] },
  { "wednesday": [
   { "time": {"hour": 8, "minute": 0}, "value": 0 },
   { "time": {"hour": 17, "minute": 0}, "value": 1 }
  ] },
  { "thursday": [
   { "time": {"hour": 8, "minute": 0}, "value": 0 },
   { "time": {"hour": 17, "minute": 0}, "value": 1 }
  ] },
  { "friday": [
   { "time": {"hour": 8, "minute": 0}, "value": 0 },
   { "time": {"hour": 17, "minute": 0}, "value": 1 }
  ] },
  { "saturday": [
   { "time": {"hour": 10, "minute": 0}, "value": 0 },
   { "time": {"hour": 15, "minute": 0}, "value": 1 }
  ] }
 }
}
Equipment Schedule
{
 "type": "Equipment",
 "properties scheduled": [
  { "networkReference": "LocalFieldBus",
   "deviceReference": "JCI-4",
   "objectReference": "York RTU.HVAC Zone",
   "propertyId": 7001 } ],
 "weekly schedule": {
  { "sunday": [
   { "time": {"hour": 8, "minute": 0}, "value": 0 },
   { "time": {"hour": 12, "minute": 0}, "value": 1 },
   { "time": {"hour": 13, "minute": 0}, "value": 0 },
   { "time": {"hour": 17, "minute": 0}, "value": 1 }
  ] },
  { "monday": [
   { "time": {"hour": 8, "minute": 0}, "value": 0 },
   { "time": {"hour": 17, "minute": 0}, "value": 1 }
  ] },
```

APPENDIX D-continued

Schedule Configuration Example

```
  { "tuesday": [
   { "time": {"hour": 8, "minute": 0}, "value": 0 },
   { "time": {"hour": 17, "minute": 0}, "value": 1 }
  ] },
  { "wednesday": [
   { "time": {"hour": 8, "minute": 0}, "value": 0 },
   { "time": {"hour": 17, "minute": 0}, "value": 1 }
  ] },
  { "thursday": [
   { "time": {"hour": 8, "minute": 0}, "value": 0 },
   { "time": {"hour": 17, "minute": 0}, "value": 1 }
  ] },
  { "friday": [
   { "time": {"hour": 8, "minute": 0}, "value": 0 },
   { "time": {"hour": 17, "minute": 0}, "value": 1 }
  ] },
  { "saturday": [
   { "time": {"hour": 10, "minute": 0}, "value": 0 },
   { "time": {"hour": 15, "minute": 0}, "value": 1 }
  ] }
 }
}
```

The first schedule configuration is for a sync schedule, and the second schedule configuration is for an equipment schedule (i.e., schedule that resides in equipment 1002 and is not synchronized with the schedule sync of system manager 302).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

A portion of the disclosure of this patent document (including the Appendices) contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A building management system comprising:
   building equipment operable to affect a physical state or condition of a building;
   a system manager coupled to the building equipment via a system bus, the system manager configured to identify the building equipment and generate a reported network tree listing the identified building equipment; and
   a cloud-based data platform configured to:
      receive the reported network tree from the system manager;
      identify an equipment model template for the building equipment listed in the reported network tree;
      identify a set of points defined by the equipment model template;
      generate a list of reported points for the building equipment based on the set of points defined by the equipment model template;
      identify a subset of the reported points as bound points; and
      update the bound points in a device shadow;
      wherein the system manager is configured to:
         read the bound points in the device shadow and create a list of bound points based on the device shadow; and
         send updates to the cloud-based data platform for only a first subset of points of the reported points listed as bound points and not for a second subset of the reported points not listed as bound points.

2. The building management system of claim 1, wherein the cloud-based data platform is configured to:
   receive a device identifier of the system manager via a device registration portal; and
   automatically create the device shadow for the system manager in response to receiving the device identifier via the device registration portal.

3. The building management system of claim 1, wherein the system manager is configured to use the list of bound points to determine whether to send updates to the cloud-based data platform for each of the reported points.

4. The building management system of claim 1, wherein the system manager is configured to:
   receive a change of value (COV) notification from the building equipment for one of the reported points;
   use the list of bound points to determine whether the point associated with the COV notification is listed as a bound point; and
   send a timeseries data sample comprising an updated value of the point associated with the COV notification to the cloud-based data platform in response to a determination that the point associated with the COV notification is listed as a bound point.

5. The building management system of claim 1, wherein the system manager is configured to:
   receive a change of value (COV) notification from the building equipment for one of the reported points;
   use the list of bound points to determine whether the point associated with the COV notification is listed as a bound point; and
   determine that an updated value of the point associated with the COV notification will not be sent to the cloud-based data platform in response to a determination that the point associated with the COV notification is not listed as a bound point.

6. The building management system of claim 1, wherein the system manager is configured to:
   determine whether any of the points listed as bound points do not exist in the building equipment; and
   send a list of non-existent points to the cloud-based data platform, the list of non-existent points identifying the points listed as bound points that do not exist in the building equipment.

7. The building management system of claim 6, wherein the cloud-based data platform is configured to remove any points identified as non-existent points from the device shadow.

8. A method for monitoring and controlling building equipment in a building management system, the method comprising:
   operating building equipment to affect a physical state or condition of a building;
   identifying the building equipment at a system manager coupled to the building equipment via a system bus;
   generating a reported network tree listing the building equipment identified at the system manager;
   at a cloud-based data platform communicably coupled to the system manager:
      receiving the reported network tree from the system manager;
      identifying an equipment model template for the building equipment listed in the reported network tree;
      identifying a set of points defined by the equipment model template; and
      generating a list of reported points for the building equipment based on the set of points defined by the equipment model template;
      identifying a subset of the reported points as bound points; and
      updating the bound points in a device shadow;
   wherein the system manager is configured to:
      read the bound points in the device shadow and create a list of bound points based on the device shadow; and
      send updates to the cloud-based data platform for only a first subset of points of the reported points listed as bound points and not for a second subset of the reported points not listed as bound points.

9. The method of claim 8, further comprising:
receiving a device identifier of the system manager via a device registration portal of the at the cloud-based data platform; and
automatically creating the device shadow for the system manager in response to receiving the device identifier via the device registration portal.

10. The method of claim 8, further comprising using the list of bound points at the system manager to determine whether to send updates to the cloud-based data platform for each of the reported points.

11. The method of claim 8, further comprising the system manager:
receiving a change of value (COV) notification from the building equipment for one of the reported points;
using the list of bound points to determine whether the point associated with the COV notification is listed as a bound point; and
sending a timeseries data sample comprising an updated value of the point associated with the COV notification to the cloud-based data platform in response to a determination that the point associated with the COV notification is listed as a bound point.

12. The method of claim 8, further comprising the system manager:
receiving a change of value (COV) notification from the building equipment for one of the reported points;
using the list of bound points to determine whether the point associated with the COV notification is listed as a bound point; and
determining that an updated value of the point associated with the COV notification will not be sent to the cloud-based data platform in response to a determination that the point associated with the COV notification is not listed as a bound point.

13. The method of claim 8, further comprising the system manager:
determining whether any of the points listed as bound points do not exist in the building equipment;
sending a list of non-existent points to the cloud-based data platform, the list of non-existent points identifying the points listed as bound points that do not exist in the building equipment; and
removing, by the cloud-based data platform, any points identified as non-existent points from the device shadow.

14. A cloud-based data platform for a building management system comprising building equipment operable to affect a physical state or condition of a building and a system manager coupled to the building equipment via a system bus, the system manager configured to identify the building equipment and generate a reported network tree listing the identified building equipment, the cloud-based data platform, configured to:
receive the reported network tree from the system manager;
identify an equipment model template for the building equipment listed in the reported network tree;
identify a set of points defined by the equipment model template; and
generate a list of reported points for the building equipment based on the set of points defined by the equipment model template;
identify a subset of the reported points as bound points; and
update the bound points in a device shadow;
wherein the system manager is configured to:
read the bound points in the device shadow and create a list of bound points based on the device shadow; and
send updates to the cloud-based data platform for only a first subset of points of the reported points listed as bound points and not for a second subset of the reported points not listed as bound points.

15. The building management system of claim 14, wherein the cloud-based data platform is configured to:
receive a device identifier of the system manager via a device registration portal; and
automatically create the device shadow for the system manager in response to receiving the device identifier via the device registration portal.

16. The building management system of claim 14, wherein the system manager is configured to use the list of bound points to determine whether to send updates to the cloud-based data platform for each of the reported points.

17. The building management system of claim 14, wherein the system manager is configured to:
receive a change of value (COV) notification from the building equipment for one of the reported points;
use the list of bound points to determine whether the point associated with the COV notification is listed as a bound point; and
send a timeseries data sample comprising an updated value of the point associated with the COV notification to the cloud-based data platform in response to a determination that the point associated with the COV notification is listed as a bound point.

18. The building management system of claim 14, wherein the system manager is configured to:
receive a change of value (COV) notification from the building equipment for one of the reported points;
use the list of bound points to determine whether the point associated with the COV notification is listed as a bound point; and
determine that an updated value of the point associated with the COV notification will not be sent to the cloud-based data platform in response to a determination that the point associated with the COV notification is not listed as a bound point.

19. The building management system of claim 14, wherein the system manager is configured to:
determine whether any of the points listed as bound points do not exist in the building equipment; and
send a list of non-existent points to the cloud-based data platform, the list of non-existent points identifying the points listed as bound points that do not exist in the building equipment.

20. The building management system of claim 19, wherein the cloud-based data platform is configured to remove any points identified as non-existent points from the device shadow.

* * * * *